US012675223B2

(12) United States Patent
Park et al.

(10) Patent No.: US 12,675,223 B2
(45) Date of Patent: Jul. 7, 2026

(54) NONVOLATILE MEMORY

(71) Applicant: **SAMSUNG ELECTRONICS CO.,
LTD.**, Suwon-si (KR)

(72) Inventors: Sangsoo Park, Suwon-si (KR);
Jinyoung Kim, Suwon-si (KR);
Sehwan Park, Suwon-si (KR); **Jisang
Lee**, Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 135 days.

(21) Appl. No.: 18/587,279

(22) Filed: Feb. 26, 2024

(65) Prior Publication Data

US 2025/0053312 A1 Feb. 13, 2025

(30) Foreign Application Priority Data

Aug. 10, 2023 (KR) ........................ 10-2023-0104814
Aug. 29, 2023 (KR) ........................ 10-2023-0113278

(51) Int. Cl.
*G06F 3/06* (2006.01)
*G06F 11/10* (2006.01)

(52) U.S. Cl.
CPC .......... *G06F 3/0619* (2013.01); *G06F 3/0656*
(2013.01); *G06F 3/0659* (2013.01); *G06F
3/0679* (2013.01); *G06F 11/1044* (2013.01)

(58) Field of Classification Search
CPC . G11C 11/5642; G11C 16/0483; G11C 16/08;
G11C 16/26; G11C 2211/563; G11C
16/24; G11C 16/30

USPC ...................................................... 365/185.21
See application file for complete search history.

(56) References Cited

U.S. PATENT DOCUMENTS

| | | | |
|---|---|---|---|
| 7,684,237 B2 | 3/2010 | Moschiano et al. | |
| 8,576,622 B2 | 11/2013 | Yoon et al. | |
| 8,811,088 B2 * | 8/2014 | Joo ..................... | G11C 16/0483 |
| | | | 365/185.21 |
| 9,495,518 B2 | 11/2016 | Kim et al. | |
| 9,977,713 B2 | 5/2018 | Kang et al. | |
| 10,445,175 B2 | 10/2019 | Ha et al. | |
| 11,025,281 B2 | 6/2021 | Kifune et al. | |
| 11,675,530 B2 | 6/2023 | Lee et al. | |
| 2017/0097868 A1 | 4/2017 | Kim et al. | |

* cited by examiner

*Primary Examiner* — Amir Zarabian
(74) *Attorney, Agent, or Firm* — Fish & Richardson P.C.

(57) ABSTRACT

A nonvolatile memory device includes a memory block, a
page buffer circuit and a control circuit. The page buffer
circuit is connected to the cell strings through bit-lines. The
control circuit controls a read operation by: latching a first
sensing data and a second sensing data in the page buffer
circuit by performing a first read operation on a selected
word-line designated by an access address based on a read
voltage set; latching a third sensing data in the page buffer
circuit by performing a second read operation on an aggres-
sor word-line adjacent to the selected word-line, based on at
least one adjacent read voltage; selecting one of the first
sensing data and the second sensing data as a hard decision
data based on a program state of the third sensing data; and
generating a soft decision data by using the first sensing data
and the second sensing data.

20 Claims, 34 Drawing Sheets

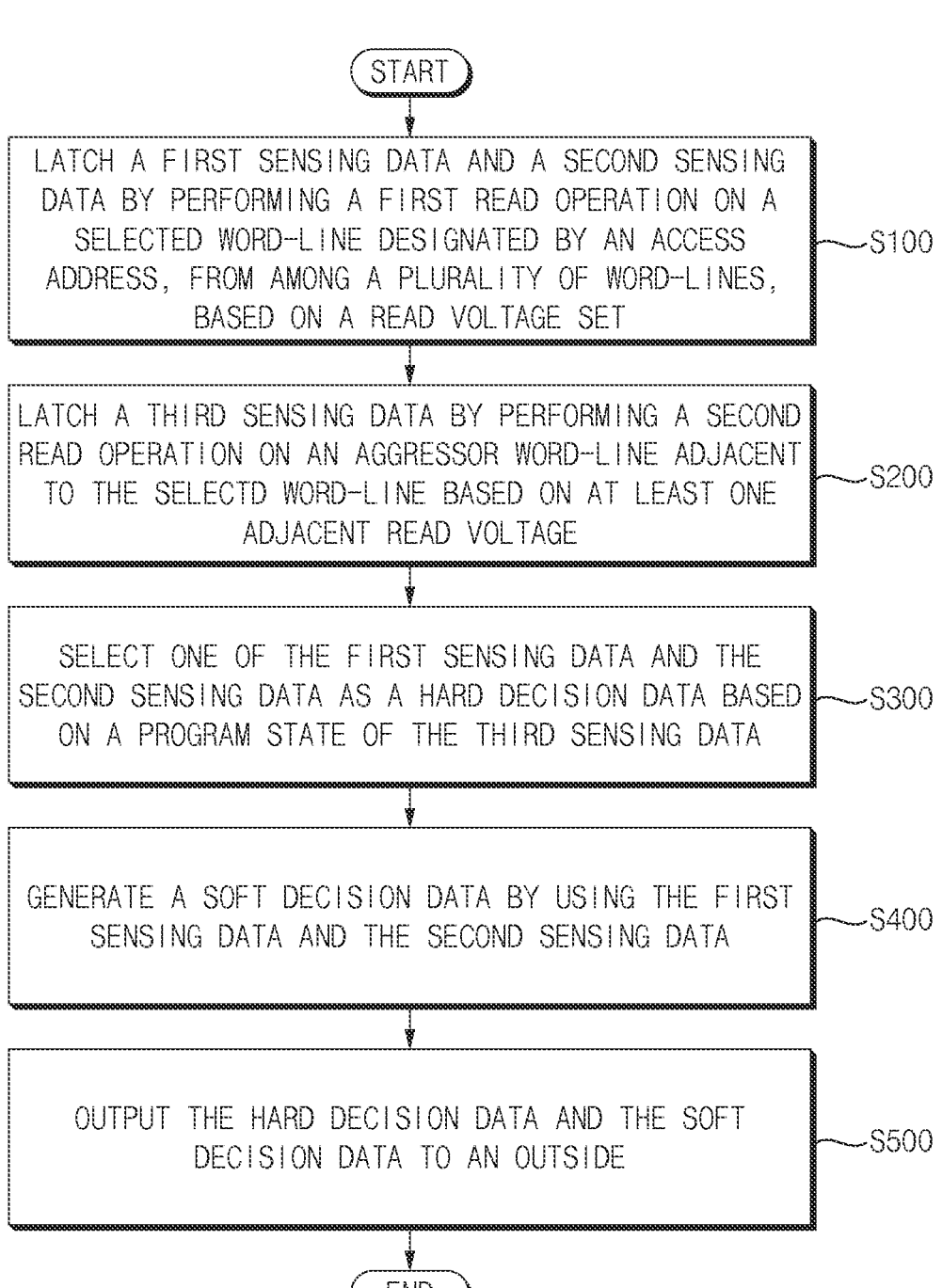

START

LATCH A FIRST SENSING DATA AND A SECOND SENSING DATA BY PERFORMING A FIRST READ OPERATION ON A SELECTED WORD-LINE DESIGNATED BY AN ACCESS ADDRESS, FROM AMONG A PLURALITY OF WORD-LINES, BASED ON A READ VOLTAGE SET —S100

LATCH A THIRD SENSING DATA BY PERFORMING A SECOND READ OPERATION ON AN AGGRESSOR WORD-LINE ADJACENT TO THE SELECTD WORD-LINE BASED ON AT LEAST ONE ADJACENT READ VOLTAGE —S200

SELECT ONE OF THE FIRST SENSING DATA AND THE SECOND SENSING DATA AS A HARD DECISION DATA BASED ON A PROGRAM STATE OF THE THIRD SENSING DATA —S300

GENERATE A SOFT DECISION DATA BY USING THE FIRST SENSING DATA AND THE SECOND SENSING DATA —S400

OUTPUT THE HARD DECISION DATA AND THE SOFT DECISION DATA TO AN OUTSIDE —S500

END

S300

S310

AGGRESSOR CELL?

NO

YES

S330

SELECT THE FIRST SENSING DATA AS THE HARD DECISION DATA

S350

SELECT THE SECOND SENSING DATA AS THE HARD DECISION DATA

TO S400

TO S400

S400a

PERFORM AN EXCLUSIVE NOR OPERATION ON THE FIRST SENSING DATA AND THE SECOND SENSING DATA

S410a

FIG. 4
S400b
PERFORM AN EXCLUSIVE OR OPERATION ON THE FIRST
SENSING DATA AND THE SECOND SENSING DATA ~S410b
FIG. 5
S500a
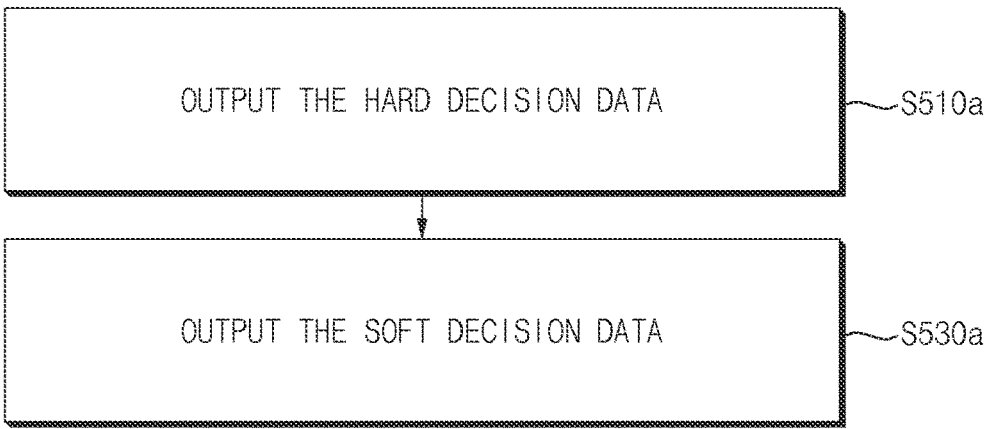
OUTPUT THE HARD DECISION DATA ~S510a
OUTPUT THE SOFT DECISION DATA ~S530a
FIG. 6
S500b
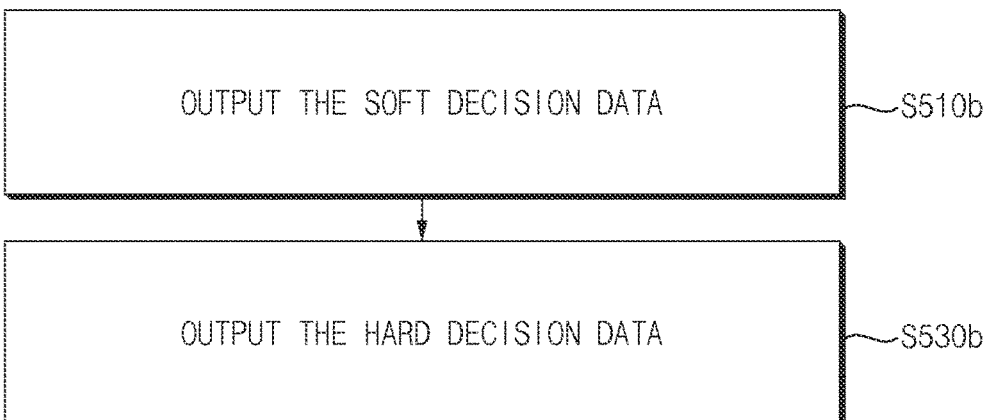
OUTPUT THE SOFT DECISION DATA ~S510b
OUTPUT THE HARD DECISION DATA ~S530b

Figure 28A:
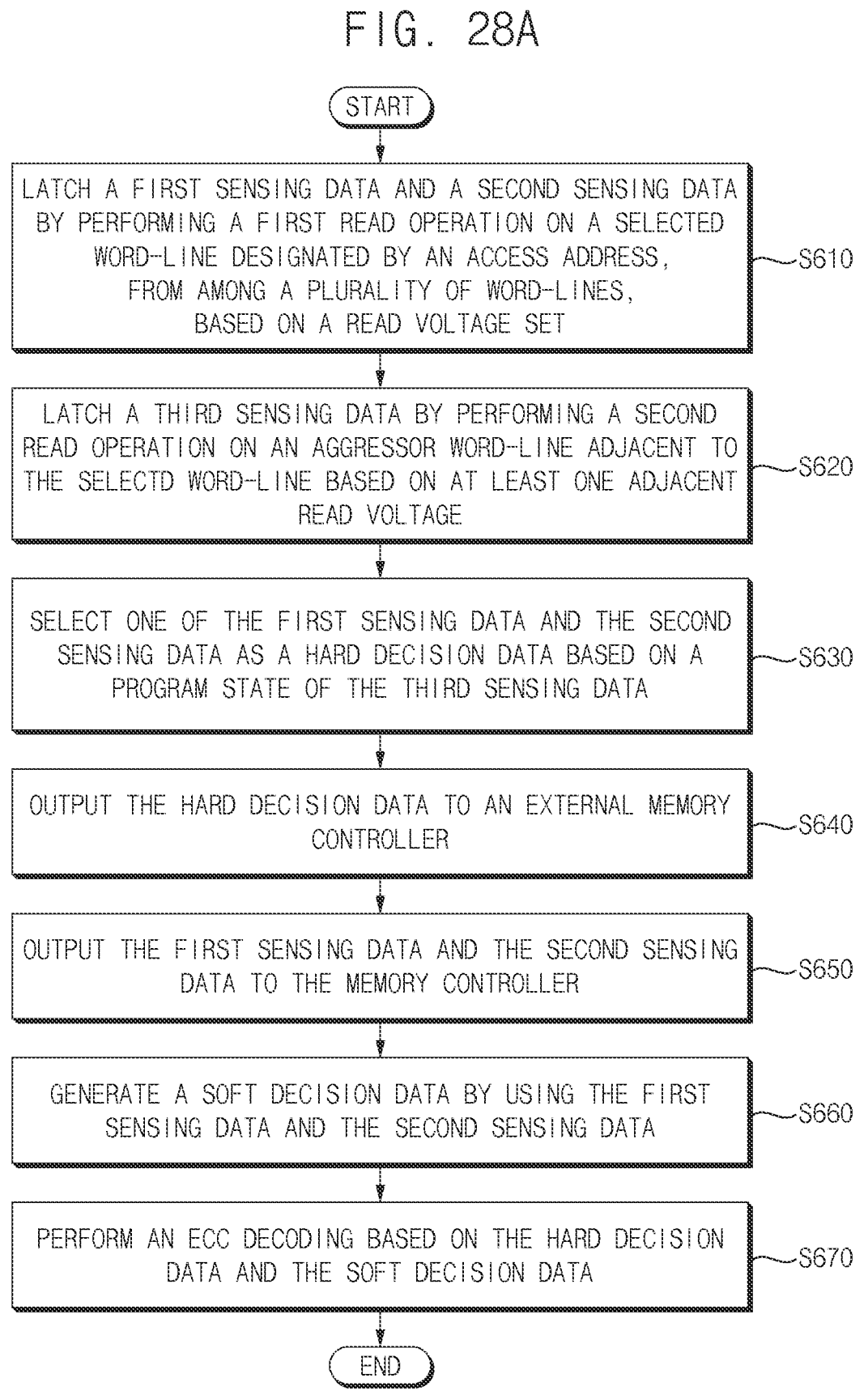

```
                          ( START )
                              │
                              ▼
┌─────────────────────────────────────────────────────┐
│ LATCH A FIRST SENSING DATA AND A SECOND SENSING DATA  │
│  BY PERFORMING A FIRST READ OPERATION ON A SELECTED   │
│     WORD-LINE DESIGNATED BY AN ACCESS ADDRESS,        │──S610
│          FROM AMONG A PLURALITY OF WORD-LINES,        │
│              BASED ON A READ VOLTAGE SET              │
└─────────────────────────────────────────────────────┘
                              │
                              ▼
┌─────────────────────────────────────────────────────┐
│  LATCH A THIRD SENSING DATA BY PERFORMING A SECOND    │
│ READ OPERATION ON AN AGGRESSOR WORD-LINE ADJACENT TO  │──S620
│ THE SELECTD WORD-LINE BASED ON AT LEAST ONE ADJACENT  │
│                   READ VOLTAGE                        │
└─────────────────────────────────────────────────────┘
                              │
                              ▼
┌─────────────────────────────────────────────────────┐
│  SELECT ONE OF THE FIRST SENSING DATA AND THE SECOND  │
│   SENSING DATA AS A HARD DECISION DATA BASED ON A     │──S630
│     PROGRAM STATE OF THE THIRD SENSING DATA           │
└─────────────────────────────────────────────────────┘
                              │
                              ▼
┌─────────────────────────────────────────────────────┐
│ OUTPUT THE HARD DECISION DATA TO AN EXTERNAL MEMORY   │──S640
│                   CONTROLLER                          │
└─────────────────────────────────────────────────────┘
                              │
                              ▼
┌─────────────────────────────────────────────────────┐
│ OUTPUT THE FIRST SENSING DATA AND THE SECOND SENSING  │──S650
│           DATA TO THE MEMORY CONTROLLER               │
└─────────────────────────────────────────────────────┘
                              │
                              ▼
┌─────────────────────────────────────────────────────┐
│  GENERATE A SOFT DECISION DATA BY USING THE FIRST     │──S660
│    SENSING DATA AND THE SECOND SENSING DATA           │
└─────────────────────────────────────────────────────┘
                              │
                              ▼
┌─────────────────────────────────────────────────────┐
│ PERFORM AN ECC DECODING BASED ON THE HARD DECISION    │──S670
│         DATA AND THE SOFT DECISION DATA               │
└─────────────────────────────────────────────────────┘
                              │
                              ▼
                          (  END  )
```

FIG. 28B

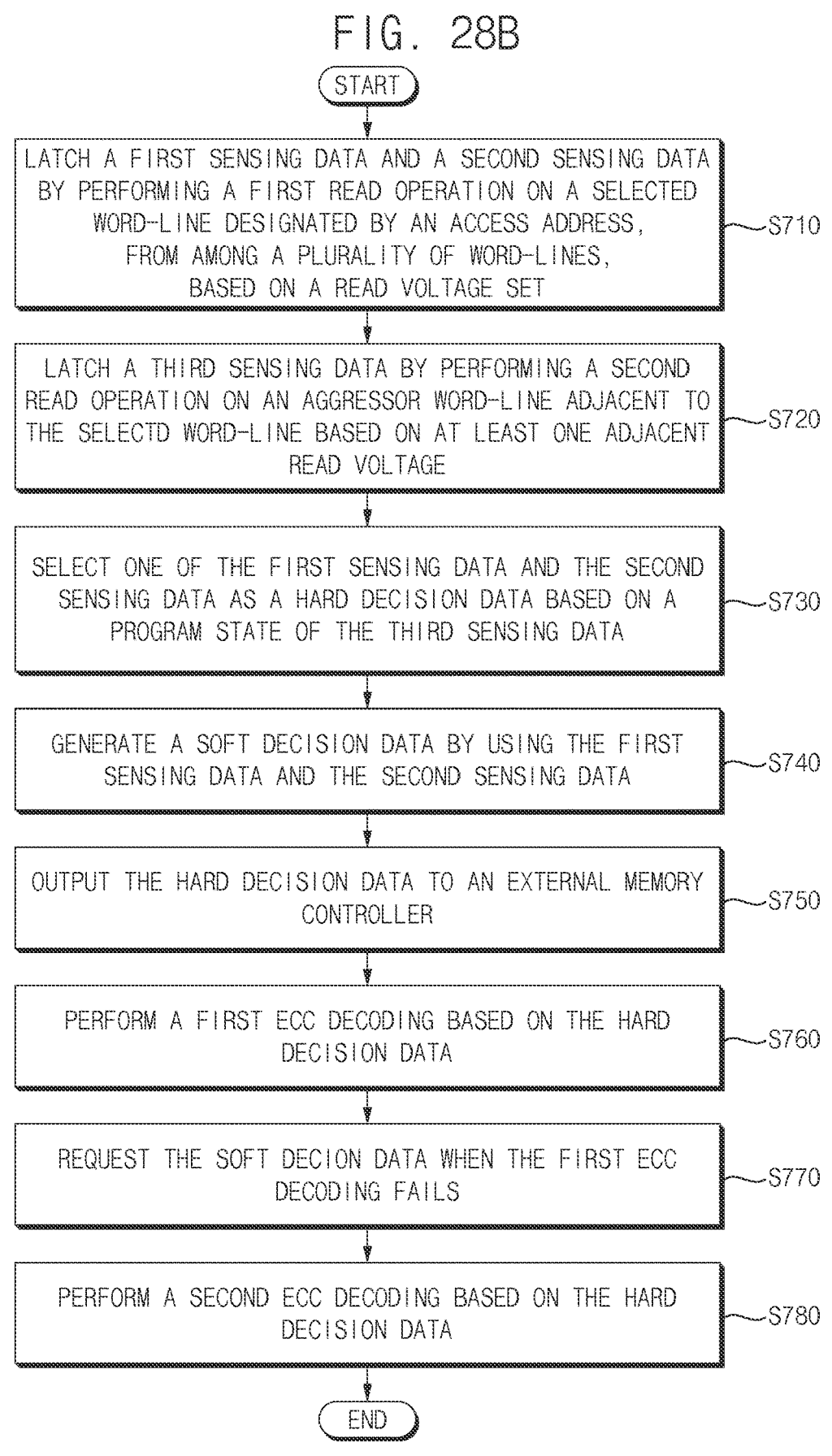

START

LATCH A FIRST SENSING DATA AND A SECOND SENSING DATA BY PERFORMING A FIRST READ OPERATION ON A SELECTED WORD-LINE DESIGNATED BY AN ACCESS ADDRESS, FROM AMONG A PLURALITY OF WORD-LINES, BASED ON A READ VOLTAGE SET ——S710

LATCH A THIRD SENSING DATA BY PERFORMING A SECOND READ OPERATION ON AN AGGRESSOR WORD-LINE ADJACENT TO THE SELECTD WORD-LINE BASED ON AT LEAST ONE ADJACENT READ VOLTAGE ——S720

SELECT ONE OF THE FIRST SENSING DATA AND THE SECOND SENSING DATA AS A HARD DECISION DATA BASED ON A PROGRAM STATE OF THE THIRD SENSING DATA ——S730

GENERATE A SOFT DECISION DATA BY USING THE FIRST SENSING DATA AND THE SECOND SENSING DATA ——S740

OUTPUT THE HARD DECISION DATA TO AN EXTERNAL MEMORY CONTROLLER ——S750

PERFORM A FIRST ECC DECODING BASED ON THE HARD DECISION DATA ——S760

REQUEST THE SOFT DECION DATA WHEN THE FIRST ECC DECODING FAILS ——S770

PERFORM A SECOND ECC DECODING BASED ON THE HARD DECISION DATA ——S780

END

Figure 30:
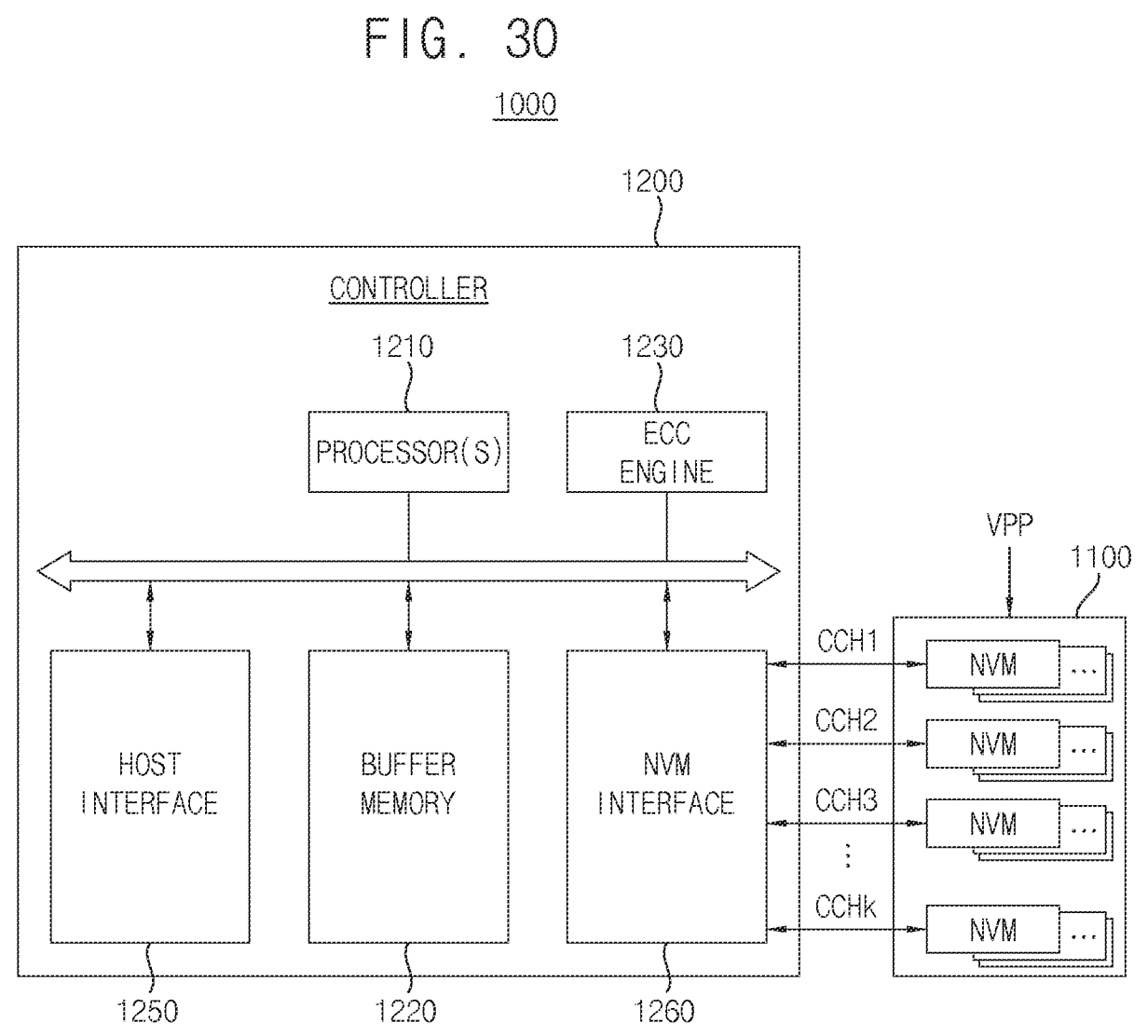

CONTROLLER 1200

PROCESSOR(S) 1210

ECC ENGINE 1230

HOST INTERFACE 1250

BUFFER MEMORY 1220

NVM INTERFACE 1260

CCH1

CCH2

CCH3

CCHk

VPP

1100

NVM

NVM

NVM

NVM

FIG. 32

NONVOLATILE MEMORY

CROSS-REFERENCE TO RELATED APPLICATIONS

This US application claims priority under 35 USC § 119 to Korean Patent Application No. 10-2023-0104814, filed on Aug. 10, 2023, and to Korean Patent Application No. 10-2023-0113278, filed on Aug. 29, 2023, in the Korean Intellectual Property Office (KIPO), the disclosures of which are incorporated herein by references in their entirety.

BACKGROUND

A flash memory device, a resistive memory device, etc., can store data in accordance with a plurality of threshold voltage distributions or a plurality of resistance distributions, where each respective distribution is assigned to a corresponding logic state for stored data. The data stored by a memory cell may be read by determining whether the memory cell is turned ON/OFF when a predetermined read voltage is applied. During (and/or following) the programming of a memory cell, the intended distribution of the memory cell may be undesirably distorted due to a number of events or conditions, including charge leakage, program disturbances, read disturbances, word and/or bit-line coupling, temperature change, voltage change, degeneration of the memory cell, etc. For example, the intended distribution may be shifted and/or broadened to cause a read fail such that incorrect data different from the stored data are read out.

Recently, nonvolatile memory devices of three-dimensional structure such as a vertical NAND memory devices have been developed to increase a degree of integration and a memory capacity of the nonvolatile memory devices. Along with increases in the integration degree and memory capacity, a programming time of the nonvolatile memory devices increases.

SUMMARY

The present disclosure relates to semiconductor memory devices, and more particularly to nonvolatile memory devices and memory systems capable of reducing read errors.

The present disclosure also relates to methods of controlling an operation of a nonvolatile memory device capable of reducing read errors.

In general, aspects of the subject matter described in this specification can be embodied in a nonvolatile memory device including: a memory block, a page buffer circuit and a control circuit. The memory block includes a plurality of cell strings where each of the plurality of cell strings includes a string selection transistor, a plurality of memory cells and a ground selection transistor which are connected in series and disposed in a vertical direction between each of a plurality of bit-lines and a common source line. The page buffer circuit is connected to the plurality of cell strings through the plurality of bit-lines. The control circuit controls a read operation by: latching a first sensing data and a second sensing data in the page buffer circuit by performing a first read operation on a selected word-line designated by an access address, among a plurality of word-lines of the memory block, based on a read voltage set; latching a third sensing data in the page buffer circuit by performing a second read operation on an aggress word-line adjacent to the selected word-line, based on at least one adjacent read voltage; selecting one of the first sensing data and the second sensing data as a hard decision data based on a program state of the third sensing data; and generating a soft decision data by using the first sensing data and the second sensing data.

Another general aspect can be embodied in a memory system including: a nonvolatile memory device and a memory controller to control the nonvolatile memory device. The nonvolatile memory device includes a memory block, a page buffer circuit and a control circuit. The memory block includes a plurality of cell strings where each of the plurality of cell strings includes a string selection transistor, a plurality of memory cells and a ground selection transistor which are connected in series and disposed in a vertical direction between each of a plurality of bit-lines and a common source line. The page buffer circuit is connected to the plurality of cell strings through the plurality of bit-lines. The control circuit controls a read operation by: latching a first sensing data and a second sensing data in the page buffer circuit by performing a first read operation on a selected word-line designated by an access address, among a plurality of word-lines of the memory block, based on a read voltage set; latching a third sensing data in the page buffer circuit by performing a second read operation on an aggressor word-line adjacent to the selected word-line, based on at least one adjacent read voltage; selecting one of the first sensing data and the second sensing data as a hard decision data based on a program state of the third sensing data; and providing the hard decision data to the memory controller.

Another general aspect can be embodied in a method of controlling an operation of a nonvolatile memory device, which includes: a memory block including a plurality of cell strings where each of the plurality of cell strings includes a string selection transistor, a plurality of memory cells and a ground selection transistor which are connected in series and disposed in a vertical direction between each of a plurality of bit-lines and a common source line. The method includes: latching a first sensing data and a second sensing data in the page buffer circuit by performing a first read operation on a selected word-line designated by an access address, from among a plurality of word-lines of the memory block, based on a read voltage set; latching a third sensing data in the page buffer circuit by performing a second read operation on an aggressor word-line adjacent to the selected word-line, based on at least one group read voltage; selecting one of the first sensing data and the second sensing data as a hard decision data based on a program state of the third sensing data; and generating a soft decision data by using the first sensing data and the second sensing data.

Therefore, according to the nonvolatile memory device and the method of controlling operation of the nonvolatile memory device, the hard decision data and the soft decision data for compensating for coupling of the selected word-line may be generated through one read operation and ECC decoding may be performed based on the hard decision data and the soft decision data. Accordingly, error correction capability may be enhanced.

BRIEF DESCRIPTION OF THE DRAWINGS

FIG. 1 is a flow chart illustrating an example of a method of controlling an operation of a nonvolatile memory device.

FIG. 4 is a flow chart illustrating an example of an operation of generating the soft decision data in the method of FIG. 1.

FIG. 5 is a flow chart illustrating an example of an operation of outputting the hard decision data and the soft decision data in the method of FIG. 1.

FIG. 6 is a flow chart illustrating an example of an operation of outputting the hard decision data and the soft decision data in the method of FIG. 1.

FIG. 10 is a block diagram illustrating an example of the nonvolatile memory device in the memory system of FIG. 8.

FIG. 15 illustrates an example of a page buffer in detail.

FIG. 25 is a cross-sectional view for describing an example of a boundary portion included in a memory block.

FIGS. 26A and 26B are examples of timing diagrams illustrating a data recovery read operation when programming progresses from the string selection line to a substrate.

FIG. 28A is a flow chart illustrating an example of a method of operating a memory system.

FIG. 28B is a flow chart illustrating an example of a method of operating a memory system.

FIG. 29 is a block diagram illustrating an example of an ECC decoder.

FIG. 30 is a block diagram illustrating an example of a storage device that includes a nonvolatile memory device.

FIG. 32 is a diagram illustrating an example of a manufacturing process of a stacked semiconductor device.

Like reference numerals may refer to like elements throughout the accompanying drawings.

DETAILED DESCRIPTION

FIG. 1 is a flow chart illustrating a method of controlling an operation of a nonvolatile memory device.

FIG. 1 illustrates a method of controlling an operation of a nonvolatile memory device including a memory block that includes a plurality of cell strings, where each cell string includes a string selection transistor, a plurality of memory cells and a ground selection transistor connected between each of a plurality of bit-lines and a common source line. In some implementations, the nonvolatile memory device may include a three-dimensional NAND flash memory device or a vertical NAND flash memory device.

Referring to FIG. 1, a first sensing data and a second sensing data is latched in a page buffer circuit connected to the plurality of cell strings through the plurality of bit-lines by performing a first read operation on a selected word-line designated by an access address, among a plurality of word-lines of the memory block, based on a read voltage set (operation S100).

In some implementations, the first read operation may correspond to a data recovery read operation and the read voltage set may include at least a first recovery read voltage and a second recovery read voltage. The first sensing data may correspond to data read from memory cells that are turned-on in response to the first recovery read voltage and the second sensing data may correspond to data read from memory cells that are turned-on in response to the second recovery read voltage. A voltage level of the second recovery read voltage may be greater than a voltage level of the first recovery read voltage and the first recovery read voltage and the second recovery read voltage may be obtained through valley search operation.

A third sensing data is latched in the page buffer circuit by performing a second read operation on an aggressor word-line adjacent to the selected word-line, based on at least one adjacent read voltage (operation S200). The third sensing data may be referred to as at least one decision data.

One of the first sensing data and the second sensing data is selected as a hard decision data based on a program state of the third sensing data (operation S300). A soft decision data is generated by using the first sensing data and the second sensing data (operation S400). The hard decision data and the soft decision data are output to an outside of the nonvolatile memory device (operation S500).

Figures 2, 3:
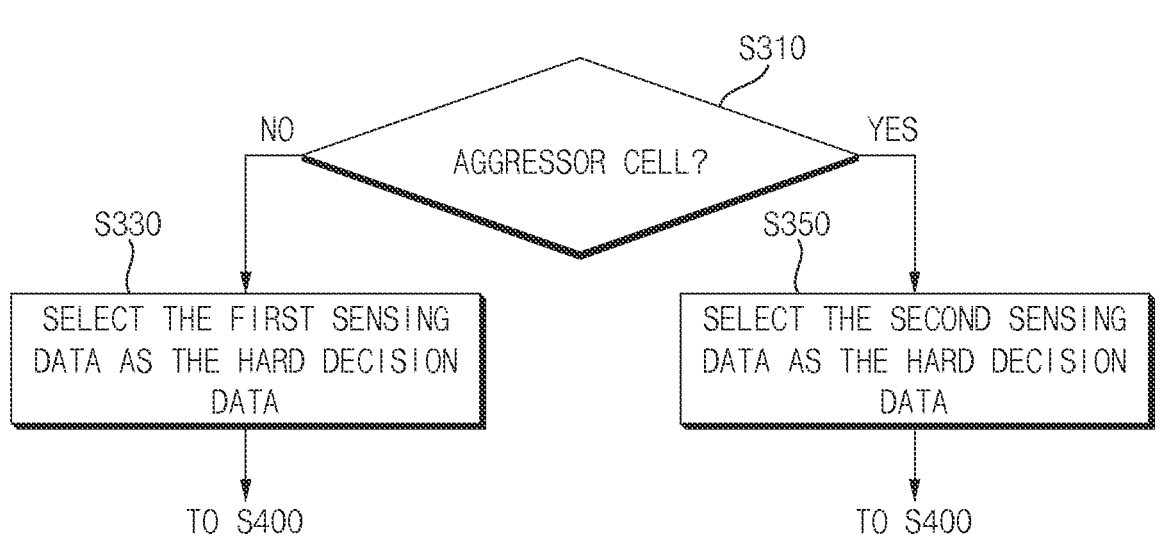
FIG. 2 is a flow chart illustrating an example of an operation of selecting the hard decision data in the method of FIG. 1.
FIG. 3 is a flow chart illustrating an example of an operation of generating the soft decision data in the method of FIG. 1.

FIG. 2 is a flow chart illustrating an operation of selecting the hard decision data in the method of FIG. 1.

Referring to FIG. 2, for selecting one of the first sensing data and the second sensing data as the hard decision data (operation S300), it is determined that each of memory cells coupled to the aggressor word-lines is an aggressor cell based on the program state of the third sensing data (operation S310). Aggressor cells may be memory cells that cause varying of threshold voltage of other memory cells (i.e., memory cells coupled to a word-line adjacent to an aggressor word-line including the aggressor cells.

When it is determined that some of the memory cells coupled to the aggressor word-lines are non-aggressor cells (NO in S310), the first sensing data of each of first memory cells corresponding to the non-aggressor cells, among memory cells coupled to the selected word-line, is selected as the hard decision data (operation S330). That is, when a threshold voltage distribution of the program state of the third sensing data of each of the non-aggressor cells of memory cells coupled to the aggressor word-line is smaller than the at least one group read voltage, the first sensing data of each of first memory cells corresponding to the non-aggressor cells is selected as the hard decision data, the first memory cells are not affected by the program state of the non-aggressor cells.

When it is determined that some of the memory cells coupled to the aggressor word-lines are aggressor cells (YES in S310), the second sensing data of each of second memory cells corresponding to the aggressor cells, among memory cells coupled to the selected word-line, is selected as the hard decision data (operation S350). That is, when a threshold voltage distribution of the program state of the third sensing data of each of the aggressor cells of memory cells coupled to the aggressor word-line is equal to or greater than the at least one group read voltage, the second sensing data of each of second memory cells corresponding to the aggressor cells is selected as the hard decision data, the second memory cells are affected by the program state of the aggressor cells.

FIG. 3 is a flow chart illustrating an operation of generating the soft decision data in the method of FIG. 1.

Referring to FIG. 3, for generating a soft decision data (operation S400a), an exclusive NOR operation is performed on the first sensing data and the second sensing data (operation S410a) and the soft decision data is generated a result of the exclusive NOR operation.

FIG. 4 is a flow chart illustrating an operation of generating the soft decision data in the method of FIG. 1.

Referring to FIG. 4, for generating a soft decision data (operation S400b), an exclusive OR operation is performed on the first sensing data and the second sensing data (operation S410b) and the soft decision data is generated a result of the exclusive OR operation.

FIG. 5 is a flow chart illustrating an operation of outputting the hard decision data and the soft decision data in the method of FIG. 1.

Referring to FIG. 5, for outputting the hard decision data and the soft decision data (operation S500a), the hard decision data is output (operation S510a) and then the soft decision data is output after outputting the hard decision data (operation S530a).

FIG. 6 is a flow chart illustrating an operation of outputting the hard decision data and the soft decision data in the method of FIG. 1.

Referring to FIG. 6, for outputting the hard decision data and the soft decision data (operation S500b), the soft decision data is output (operation S510b) and then the hard decision data is output after outputting the soft decision data (operation S530b).

Figure 7:
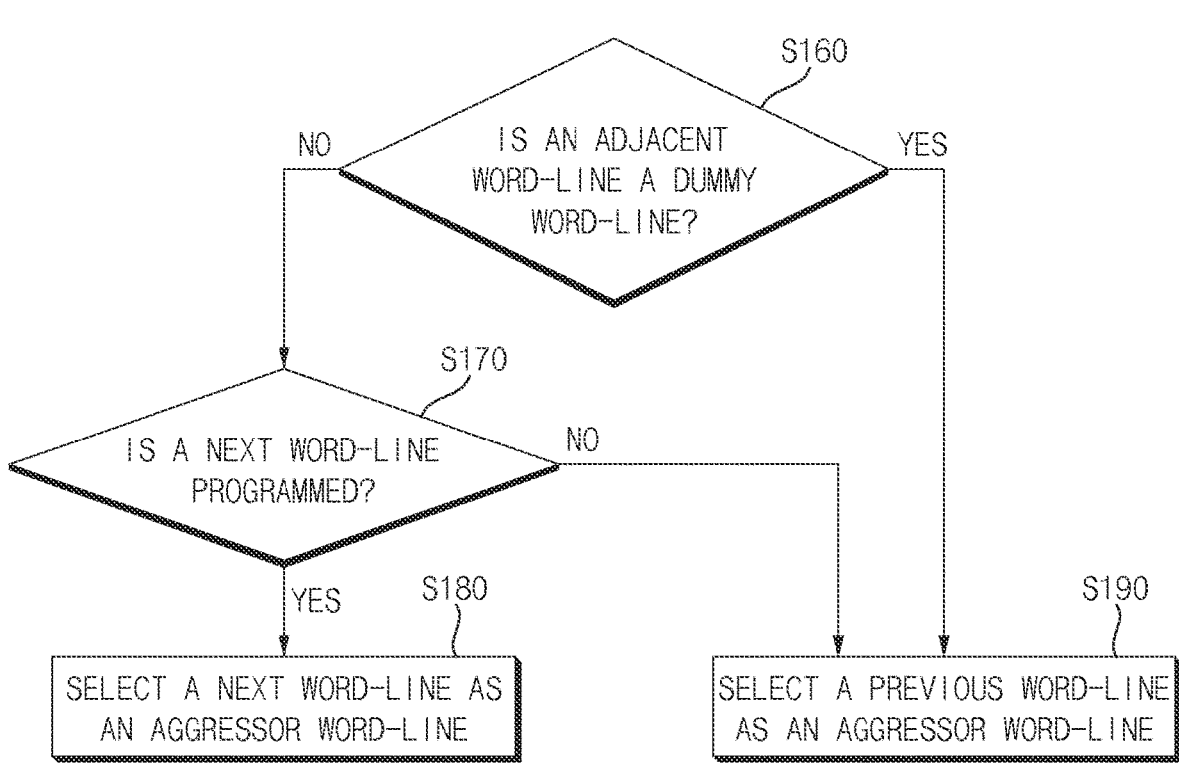
FIG. 7 is a flow chart illustrating an example of an operation of selecting an aggressor word-line that is performed before performing the second read operation in the method of FIG. 1.

FIG. 7 is a flow chart illustrating an operation of selecting an aggressor word-line that is performed before performing the second read operation in the method of FIG. 1.

In FIG. 7, assuming that a plurality of word-lines coupled to the memory block are programmed from the bit-line to the common source line.

Referring to FIG. 7, for selecting an aggressor word-line (operation S150), it is determined that the adjacent word-line is a dummy word-line based on a row address included in the access address and programming progress information (operation S160). When the adjacent word-line is not a dummy word-line (NO in S160), it is determined whether a next word-line is programmed (operation S170) because the next word-line is a normal word-line, e.g., not a dummy word-line. The normal word-line may be a word-line that is not the dummy word-line.

When the next word-line is programmed (YES in S170), the next word-line is selected as an aggressor word-line (operation S180). When the next word-line is not programmed (NO in S170), a previous word-line is selected as an aggressor word-line (operation S190).

When the adjacent word-line is a dummy word-line (YES in S160), a previous word-line is selected as an aggressor word-line (operation S190).

Figure 8:
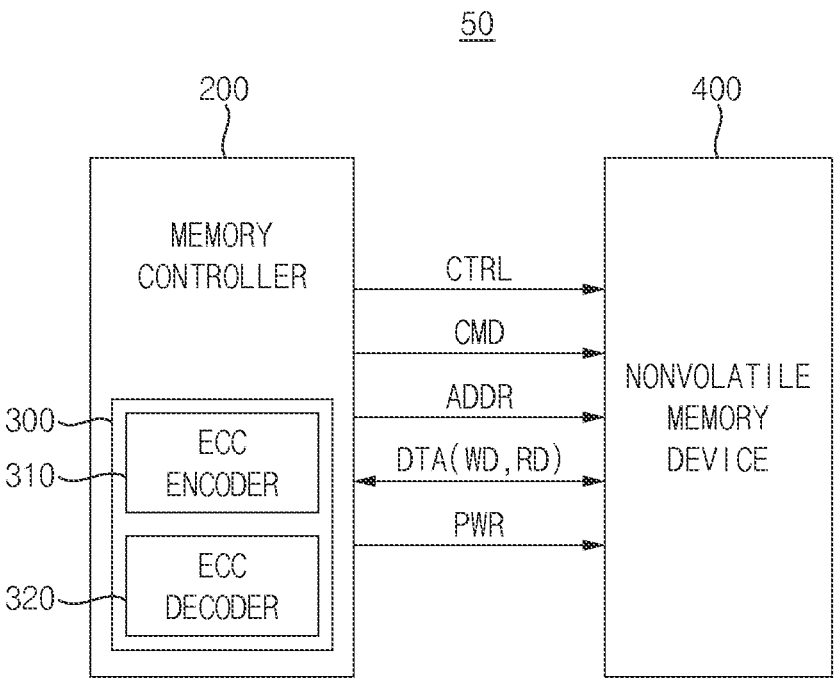
FIG. 8 is a block diagram illustrating an example of a memory system.

FIG. 8 is a block diagram illustrating a memory system.

Referring to FIG. 8, a memory system 50 includes a memory controller 200 and a nonvolatile memory device 400.

In some implementations, each of the memory controller 200 and the nonvolatile memory device 400 may be provided with the form of a chip, a package, or a module. Alternatively, the memory controller 200 and the nonvolatile memory device 400 may be packaged into one of various packages and may be provided as a storage device such as a memory card.

The nonvolatile memory device 400 may perform an erase operation, a program operation, a normal read operation or a data recovery read operation under control of the memory controller 200. The nonvolatile memory device 400 may receive a command CMD, an address ADDR and data DTA through input/output lines from the memory controller 200 for performing such operations. The data DTA may include a write data WD and a read data RD. In addition, the nonvolatile memory device 400 may receive a control signal CTRL through a control line from the memory controller 200. In addition, the nonvolatile memory device 400 may receive a power PWR through a power line from the memory controller 200.

The memory controller 200 may include an error correction code (ECC) engine 300, and the ECC engine 300 may include an ECC encoder 310 and the ECC decoder 320. The ECC encoder 310 may perform an ECC encoding operation on data to be stored in the nonvolatile memory device 400. The ECC decoder 320 may perform an ECC decoding operation on data read from the nonvolatile memory device 400.

Figure 9:
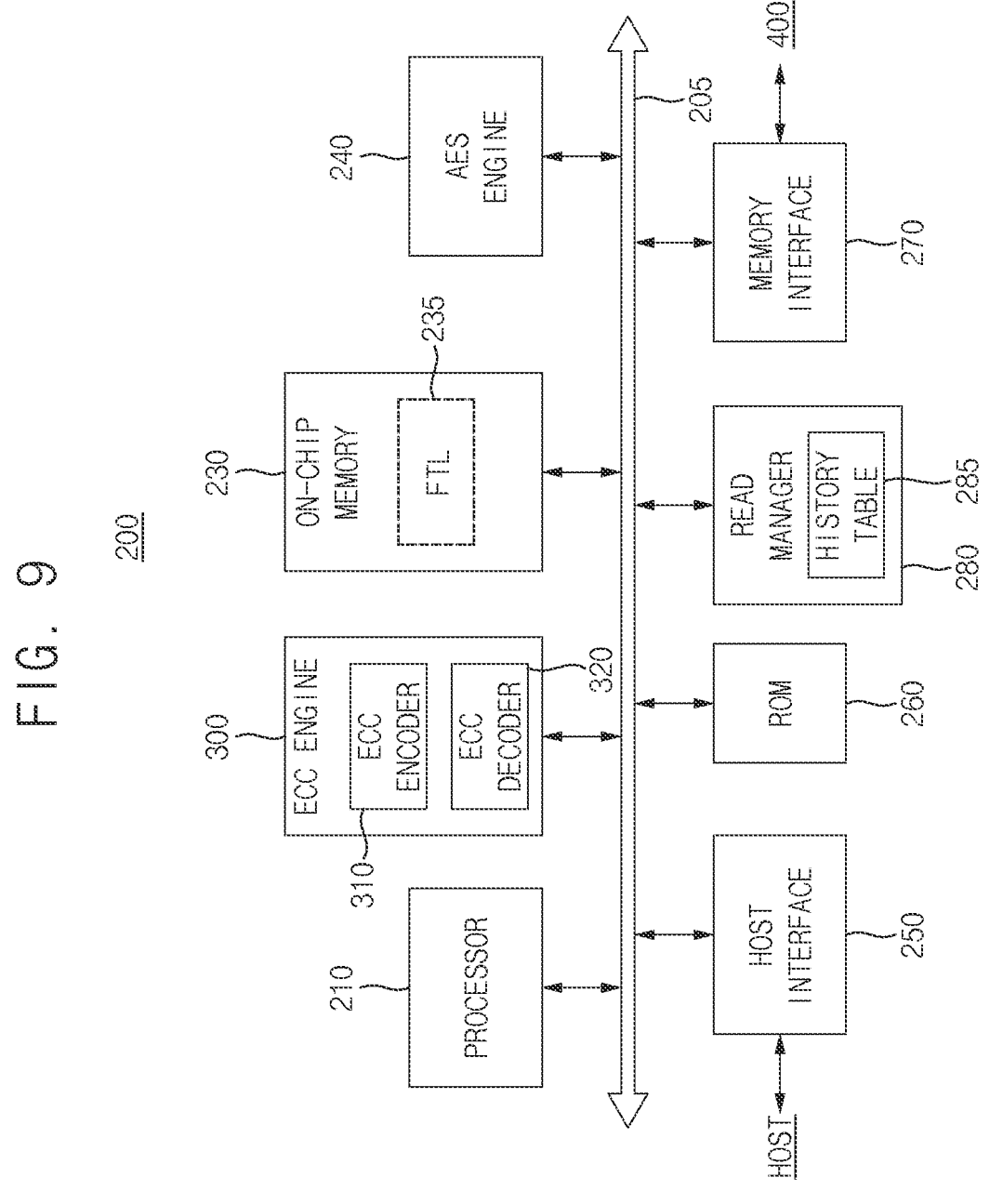
FIG. 9 is a block diagram illustrating an example of the memory controller in the memory system of FIG. 8.

FIG. 9 is a block diagram illustrating an example of the memory controller in the memory system of FIG. 8.

Referring to FIG. 9, the memory controller 200 includes a processor 210, the ECC engine 300, an on-chip memory 230, an advanced encryption standard (AES) engine 240, a host interface 250, a ROM 260, a memory interface 270 and a read manager 280, which are connected via a bus 205.

The processor 210 controls an overall operation of the memory controller 200. The processor 210 may control the ECC engine 300, the on-chip memory 230, the AES engine 240, the host interface 250, the ROM 260, the memory interface 270, and the read manager 280. The processor 210 may include one or more cores (e.g., a homogeneous multi-core or a heterogeneous multi-core). The processor 210 may be or include, for example, at least one of a central processing unit (CPU), an image signal processing unit (ISP), a digital signal processing unit (DSP), a graphics processing unit (GPU), a vision processing unit (VPU), and a neural processing unit (NPU). The processor 210 may execute various application programs (e.g., a flash translation layer (FTL) 235 and firmware) loaded onto the on-chip memory 230.

The on-chip memory 230 may store various application programs that are executable by the processor 210. The on-chip memory 230 may operate as a cache memory adjacent to the processor 210. The on-chip memory 230 may store a command, an address, and data to be processed by the processor 210 or may store a processing result of the processor 210. The on-chip memory 230 may be, for example, a storage medium or a working memory including a latch, a register, a static random access memory (SRAM), a dynamic random access memory (DRAM), a thyristor random access memory (TRAM), a tightly coupled memory (TCM), etc.

The processor 210 may execute the FTL 235 loaded onto the on-chip memory 230. The FTL 235 may be loaded onto the on-chip memory 230 as firmware or a program stored in the memory cells of the nonvolatile memory device 400. The FTL 235 may manage mapping between a logical address provided from a host and a physical address of the nonvolatile memory device 400 and may include an address mapping table manager managing and updating an address mapping table. The FTL 235 may further perform a garbage collection operation, a wear leveling operation, and the like, as well as the address mapping described above. The FTL 235 may be executed by the processor 210 for addressing one or more of the following aspects of the nonvolatile memory device 400: overwrite- or in-place write-impossible, a life time of a memory cell, a limited number of program-erase (PE) cycles, and an erase speed slower than a write speed.

Memory cells of the nonvolatile memory device 400 may have the physical characteristic that a threshold voltage distribution varies due to causes, such as a program elapsed time, a temperature, program disturbance, read disturbance and etc. For example, data stored at the nonvolatile memory device 400 becomes erroneous due to the above causes.

The memory controller 200 may utilize a variety of error correction techniques to correct such errors. For example, the memory controller 200 may include the ECC engine 300. The ECC engine 300 may correct errors that occur in the data stored in the nonvolatile memory device 400. The ECC engine 300 may include the ECC encoder 310 and the ECC decoder 320. The ECC encoder 310 may perform an ECC encoding operation on data to be stored in the nonvolatile memory device 400. The ECC decoder 320 may perform an ECC decoding operation on data read from the nonvolatile memory device 400.

The ECC decoder 320 may perform a first ECC decoding operation on a hard decision data read from a memory block of the nonvolatile memory device 400 and may perform a second ECC decoding operation on a soft decision data read from the memory block.

The ROM 260 may store a variety of information, needed for the memory controller 200 to operate, in firmware.

The AES engine 240 may perform at least one of an encryption operation and a decryption operation on data input to the memory controller 200 by using a symmetric-key algorithm. Although not illustrated in detail, the AES engine 240 may include an encryption module and a decryption module. For example, the encryption module and the decryption module may be implemented as separate modules. For another example, one module capable of performing both encryption and decryption operations may be implemented in the AES engine 240.

The read manager 280 may adjust and manage a plurality of read voltages associated with reading the data DTA stored in the nonvolatile memory device 400. For example, when the ECC engine 300 cannot correct errors in the data DTA read from the nonvolatile memory device 400, the read manager 280 may adjust the plurality of read voltages used in the nonvolatile memory device 400. The read manager 280 may include a read history table (e.g., a history table) 285 and may adjust the plurality of read voltages based on the read history table 285. The read manager 280 may read the data DTA stored in the nonvolatile memory device 400 at least two times and may adjust the plurality of read voltages based on the read data DTA.

In some implementations, the ECC engine 300 may have a given error correction capability. Data that includes error bits (or fail bits), the number of which exceeds the error correction capability of the ECC engine 300, are called "uncorrectable ECC (UECC) data." When the data DTA read from the nonvolatile memory device 400 are the UECC data, the read manager 280 may adjust the plurality of read voltages and may perform the read operation again.

The read history table 285 may store a history of previous read voltages. For example, the read history table 285 may include information of read voltages read-passed in a previous read operation. The expression "read-passed" indicates that data read by specific read voltages are normal data not including an error or that an error included in the read data is correctable by the ECC engine 300.

In some implementations, the read manager 280 may adjust the plurality of read voltages based on the read history table 285. That is, because read voltages are adjusted based on previously read-passed read voltages and the data DTA are read by using the adjusted read voltages (or read voltage levels), the probability that the error of the read data DTA is corrected by the ECC engine 300 may increase. That is, the probability of a read pass may be improved.

A previously read-passed read voltage that is stored and managed in the read history table 285 is referred to as a "history read voltage." The read history table 285 may include information about history read voltages for each of a plurality of pages included in the nonvolatile memory device 400. For example, the read history table 285 may include information of previously read-passed read voltages for each word-line.

The read manager 280 may update the read history table 285. For example, the read manager 280 may detect an optimal read voltage. The optimal read voltage indicates read voltages read-passed when data are read. In some implementations, the read manager 280 may read data from the nonvolatile memory device 400 at least two times or more and may detect the optimal read voltage based on the read data. An operation of detecting the optimal read voltage is also called a valley search operation.

The memory controller 200 may communicate with the host through the host interface 250. For example, the host interface 250 may include Universal Serial Bus (USB), Multimedia Card (MMC), embedded-MMC, peripheral component interconnection (PCI), PCI-express, Advanced Technology Attachment (ATA), Serial-ATA, Parallel-ATA, small computer small interface (SCSI), enhanced small disk interface (ESDI), Integrated Drive Electronics (IDE), Mobile Industry Processor Interface (MIPI), Nonvolatile memory express (NVMe), Universal Flash Storage (UFS), and etc. The memory controller 200 may communicate with the nonvolatile memory device 400 through the memory interface 270.

Figure 10:
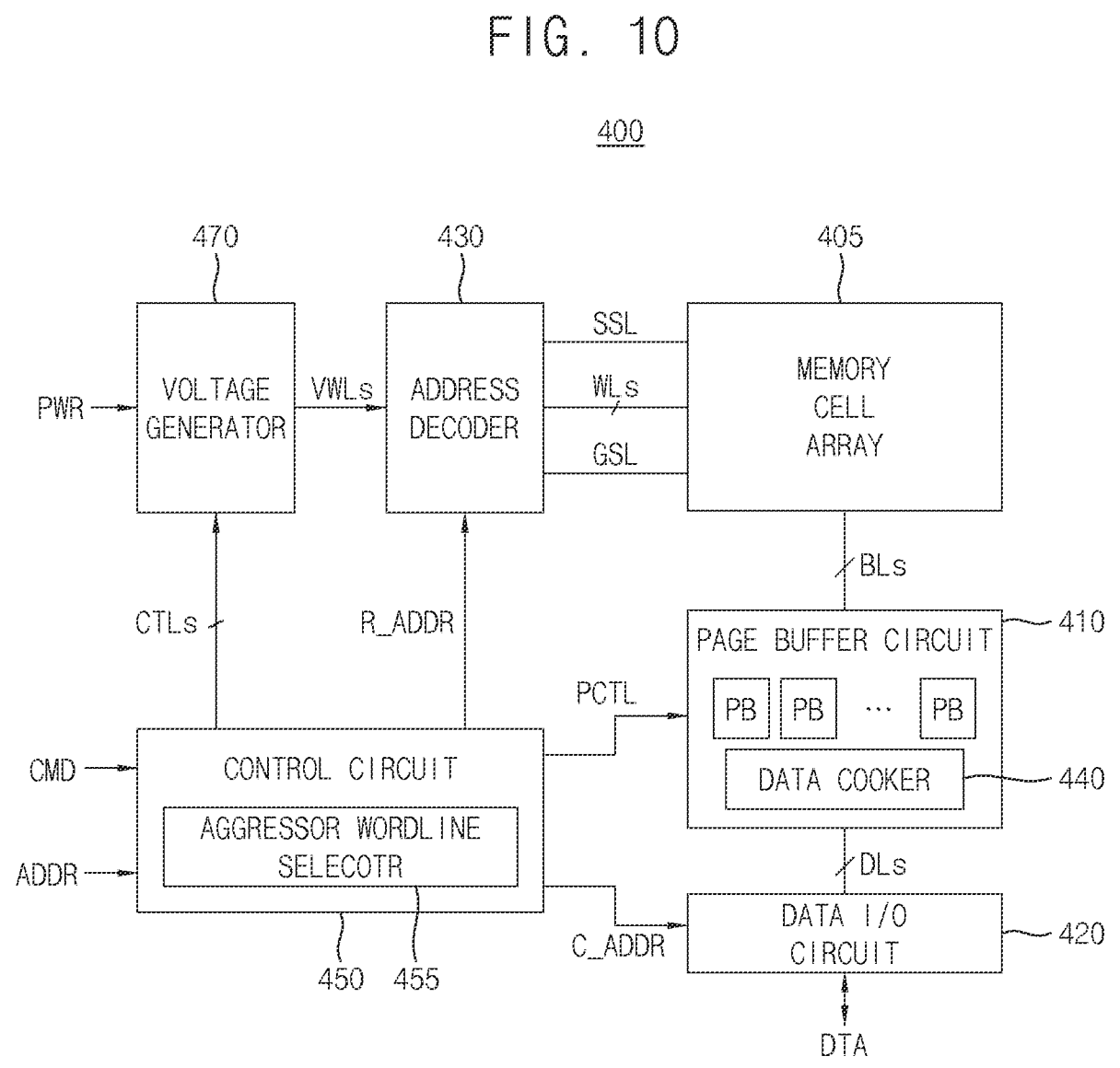

FIG. 10 is a block diagram illustrating an example of the nonvolatile memory device in the memory system of FIG. 8.

Referring to FIG. 10, the nonvolatile memory device 400 includes a memory cell array 405, an address decoder 430, a page buffer circuit 410, a data input/output (I/O) circuit 420, a control circuit 450, and a voltage generator 470. The control circuit 450 may include an aggressor word-line selector 455 and the page buffer circuit 410 may include a data cooker 440.

The memory cell array 405 may be coupled to the address decoder 430 through a string selection line SSL, a plurality of word-lines WLs, and a ground selection line GSL. In addition, the memory cell array 405 may be coupled to the page buffer circuit 410 through a plurality of bit-lines BLs. The memory cell array 405 may include a plurality of nonvolatile memory cells coupled to the plurality of word-lines WLs and the plurality of bit-lines BLs.

In some implementations, the memory cell array 405 may be a three-dimensional memory cell array, which is formed on a substrate in a three-dimensional structure (or a vertical structure). In this case, the memory cell array 405 may include (vertical) cell strings that are vertically oriented such that at least one memory cell is located over another memory cell.

The control circuit 450 may receive a command (signal) CMD and an address (signal) ADDR from the memory controller 200 and control an erase loop, a program loop and a read operation of the nonvolatile memory device 400 based on the command signal CMD and the address signal ADDR. The program loop may include a program operation and a program verification operation. The erase loop may include an erase operation and an erase verification operation.

For example, the control circuit 450 may generate control signals CTLs to control the voltage generator 470 and may generate a page buffer control signal PCTL to control the page buffer circuit 410 based on the command signal CMD. The control circuit 450 may generate a row address R_ADDR and a column address C_ADDR based on the address signal ADDR. The control circuit 450 may provide the row address R_ADDR to the address decoder 430 and provide the column address C_ADDR to the data input/output circuit 420.

The address decoder 430 may be coupled to the memory cell array 405 through the string selection line SSL, the plurality of word-lines WLs, and the ground selection line GSL. During the program operation or the read operation, the address decoder 430 may determine one of the plurality of word-lines WLs as a selected word-line and determine rest of the plurality of word-lines WLs except for the selected word-line as unselected word-lines based on the row address R_ADDR.

The voltage generator 470 may generate word-line voltages VWLs, which are associated with operation of the nonvolatile memory device 400, based on the control signals CTLs. The voltage generator 470 may receive the power PWR from the memory controller 200. The word-line voltages VWLs may be applied to the plurality of word-lines WLs through the address decoder 430.

For example, during the erase operation, the voltage generator 470 may apply an erase voltage to channels of cell string of the memory block and may apply a ground voltage to entire word-lines of the memory block. During the erase verification operation, the voltage generator 470 may apply an erase verification voltage to the entire word-lines of the memory block or sequentially apply the erase verification voltage to word-lines in a word-line basis.

For example, during the program operation, the voltage generator 470 may apply a program voltage to the selected word-line and may apply a program pass voltage to the unselected word-lines. In addition, during the program verification operation, the voltage generator 470 may apply a program verification voltage to the selected word-line and may apply a verification pass voltage to the unselected word-lines. For example, during the read operation, the voltage generator 470 may apply a read voltage to the selected word-line and may apply a read pass voltage to the unselected word-lines.

The page buffer circuit 410 may be coupled to the memory cell array 405 through the plurality of bit-lines BLs. The page buffer circuit 410 may include a plurality of page buffers. The page buffer circuit 410 may temporarily store data to be programmed in a selected page or data read out from the selected page.

The control circuit 450 may control the read operation by: latching a first sensing data and a second sensing data in the page buffer circuit 410 by performing a first read operation on a selected word-line designated by an access address, among the plurality of word-lines WL of a memory block, based on a read voltage set (i.e., recovery read voltages); latching a third sensing data in the page buffer circuit 410 by performing a second read operation on an aggressor word-line adjacent to the selected word-line, based on at least one adjacent read voltage; selecting one of the first sensing data and the second sensing data as a hard decision data based on a program state of the third sensing data; and generating a soft decision data by using the first sensing data and the second sensing data.

The data cooker 440 may generate the soft decision data by performing one of an exclusive NOR operation and an exclusive OR operation on the first sensing data and the second sensing data. The data cooker 440 may be referred to as a data manipulator or a data generator because the data cooker 440 generate the soft decision data by performing logical operation on the first sensing data and the second sensing data.

The data input/output circuit 420 may be coupled to the page buffer circuit 410 through a plurality of data lines DLs. During the program operation, the data input/output circuit 420 may receive program data DTA from the memory controller 200 and provide the program data DTA to the page buffer circuit 410 based on the column address C_ADDR received from the control circuit 450. During the read operation, the data input/output circuit 420 may provide read data DTA, which are stored in the page buffer circuit 410, to the memory controller 200 based on the column address C_ADDR received from the control circuit 450.

Figure 11:
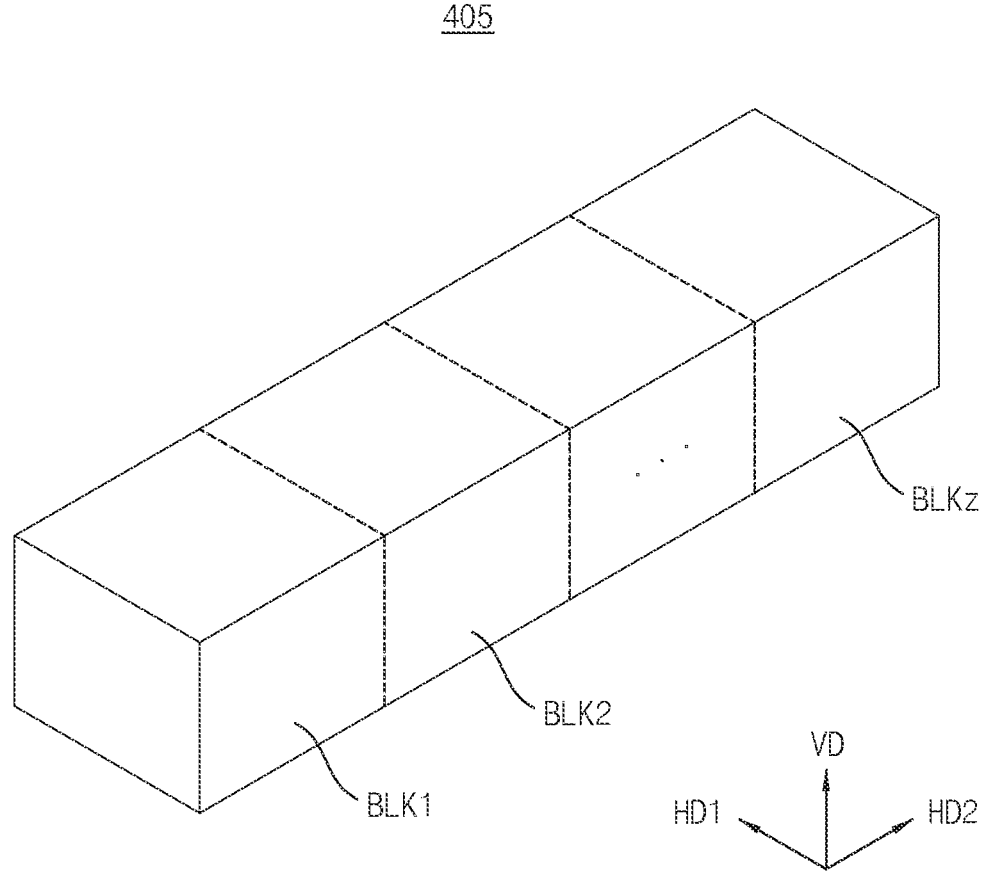
FIG. 11 is a block diagram illustrating an example of the memory cell array in FIG. 10.

FIG. 11 is a block diagram illustrating an example of the memory cell array in FIG. 10.

Referring to FIG. 11, the memory cell array 405 includes a plurality of memory blocks BLK1 to BLKz that extend along a first direction HD1 (i.e., a first horizontal direction), a second direction HD2 (i.e., a second horizontal direction) and a third direction VD (i.e., a vertical direction). Here, z may be a natural number greater than two. In some implementations, the memory blocks BLK1 to BLKz are selected by the address decoder 430 in FIG. 10. For example, the address decoder 430 may select a memory block BLK corresponding to a block address among the memory blocks BLK1 to BLKz.

Figure 12:
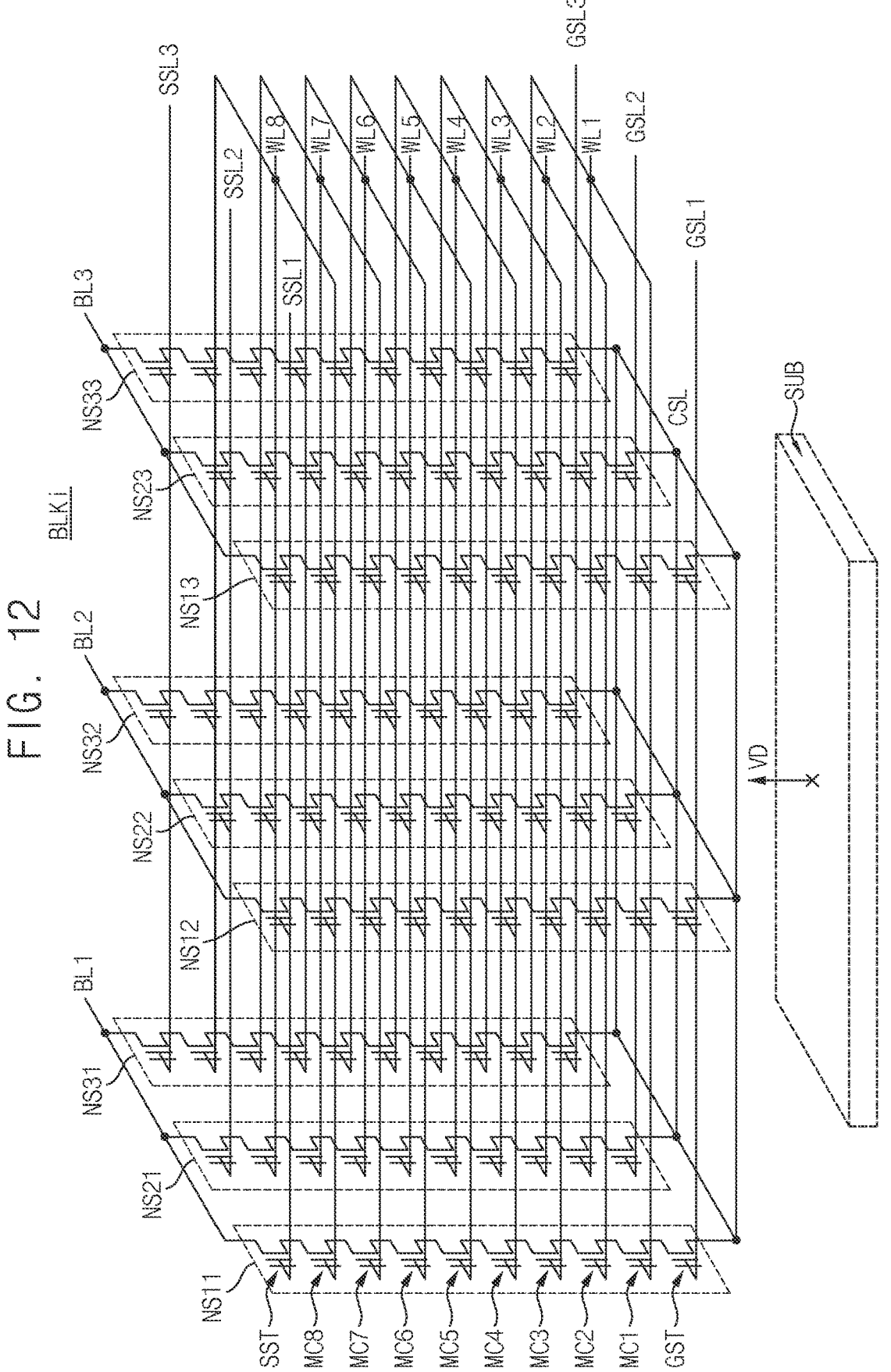
FIG. 12 is a circuit diagram illustrating one of the memory blocks of FIG. 11.

FIG. 12 is a circuit diagram illustrating one of the memory blocks of FIG. 11.

The memory block BLKi of FIG. 12 may be formed on a substrate SUB in a three-dimensional structure (or a vertical structure). For example, a plurality of memory cell strings included in the memory block BLKi may be formed in the third direction VD perpendicular to the substrate SUB.

Referring to FIG. 12, the memory block BLKi includes (memory) cell strings NS11 to NS33 coupled between bit-lines BL1, BL2, and BL3 and a common source line CSL. Each of the cell strings NS11 to NS33 may include a string selection transistor SST, a plurality of memory cells MC1 to MC8, and a ground selection transistor GST. In FIG. 12, each of the cell strings NS11 to NS33 is illustrated to include eight memory cells MC1 to MC8. However, the present disclosure is not limited thereto. In some implementations, each of the cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2, and BL3, and the ground selection transistor GST may be connected to the common source line CSL.

Word-lines (e.g., WL1) having the same height may be commonly connected, and the ground selection lines GSL1 to GSL3 and the string selection lines SSL1 to SSL3 may be separated.

Figure 13:
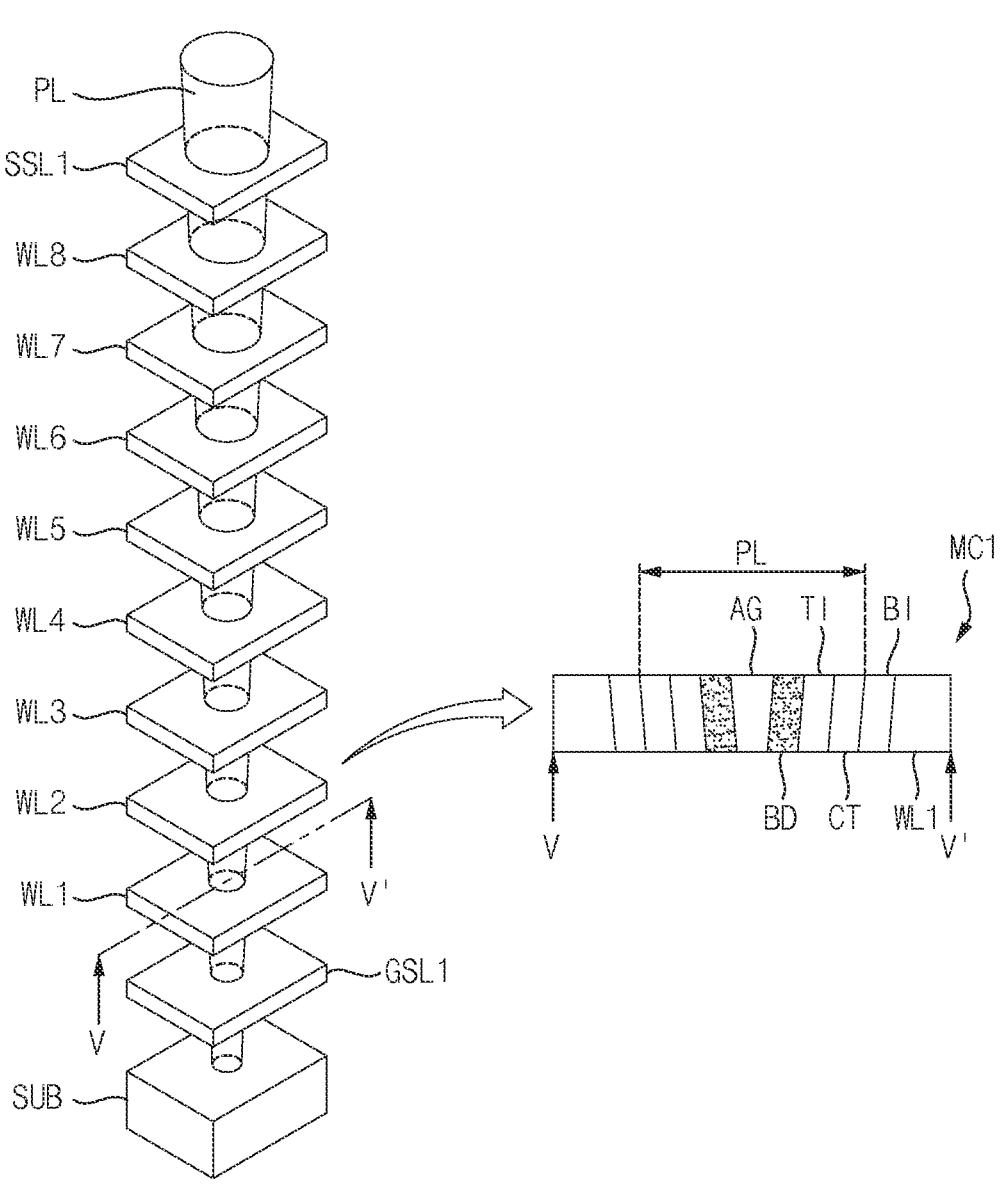
FIG. 13 illustrates an example of a structure of a cell string in the memory block of FIG. 12.

FIG. 13 illustrates an example of a structure of a cell string in the memory block of FIG. 12.

Referring to FIGS. 12 and 13, in the cell string NS11, a pillar PL is provided on the substrate SUB such that the pillar PL extends in a direction perpendicular to the substrate SUB to make contact with the substrate SUB. Each of the ground selection line GSL, the word-lines WL1 to WL8, and the string selection lines SSL illustrated in FIG. 12A may be formed of a conductive material parallel with the substrate SUB, for example, a metallic material. The pillar PL may be in contact with the substrate SUB through the conductive materials forming the string selection lines SSL, the word-lines WL1 to WL8, and the ground selection line GSL.

A sectional view taken along a line V-V' is also illustrated in FIG. 13. In some implementations, a sectional view of a first memory cell MC1 corresponding to a first word-line WL1 is illustrated. The pillar PL may include a cylindrical body BD. An air gap AG may be defined in the interior of the body BD.

The body BD may include P-type silicon and may be an area where a channel will be formed. The pillar PL may further include a cylindrical tunnel insulating layer TI surrounding the body BD and a cylindrical charge trap layer CT surrounding the tunnel insulating layer TI. A blocking insulating layer BI may be provided between the first word-line WL1 and the pillar PL. The body BD, the tunnel insulating layer TI, the charge trap layer CT, the blocking insulating layer BI, and the first word-line WL1 may constitute or be included in a charge trap type transistor that is formed in a direction perpendicular to the substrate SUB or to an upper surface of the substrate SUB. A string selection transistor SST, a ground selection transistor GST, and other memory cells may have the same structure as the first memory cell MC1.

Figure 14:
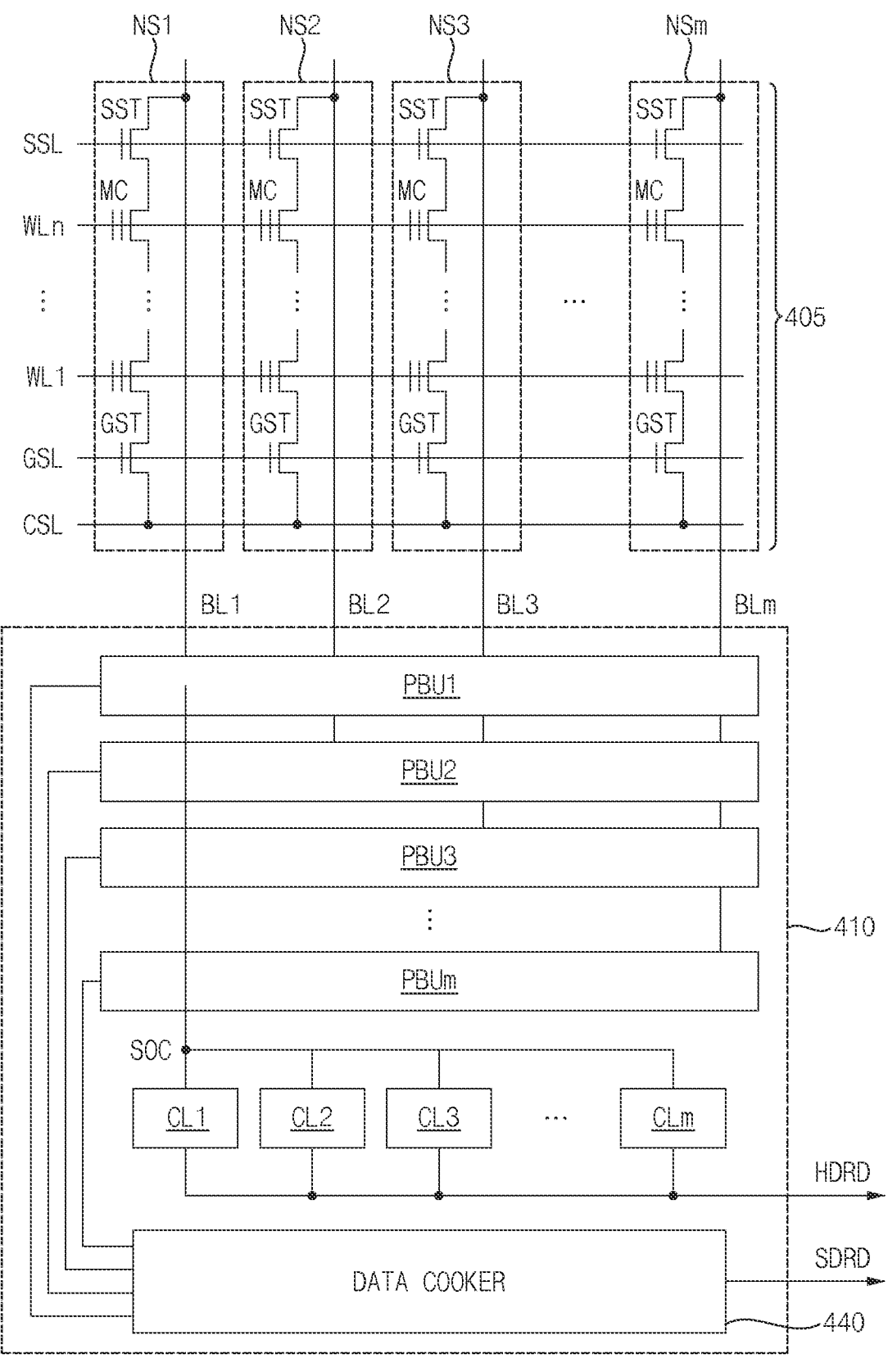
FIG. 14 is a schematic diagram of a connection of the memory cell array to the page buffer circuit in FIG. 10.

FIG. 14 is a schematic diagram of a connection of the memory cell array to the page buffer circuit in FIG. 10.

Referring to FIG. 14, the memory cell array 405 may include first through m-th cell strings NS1, NS2, NS3, . . . , NSm, each of the first through m-th cell strings NS1, NS2, NS3, . . . , NSm may include a ground select transistor GST connected to the ground select line GSL, a plurality of memory cells MC respectively connected to the first through n-th word-lines WL1, . . . , WLn, and a string select transistor SST connected to the string select line SSL, and the ground select transistor GST, the plurality of memory cells MC, and the string select transistor SST may be connected to each other in series. In this case, n may be a positive integer greater than three.

The page buffer circuit 410 may include first through m-th page buffer units PBU1, PBU2, PBU3, . . . , PBUm. The first page buffer unit PB1 may be connected to the first cell string NS1 via the first bit-line BL1, and the m-th page buffer unit PBUm may be connected to the m-th cell string NSm via the m-th bit-line BLm. For example, m may be 8, and the page buffer circuit 410 may have a structure in which page buffer units of eight stages, or, the first through m-th page buffer units PBU1, PBU2, PBU3, . . . , PBUm are in a line. For example, the first through m-th page buffer units PBU1, PBU2, PBU3, . . . , PBUm may be in a row in an extension direction of the first through m-th bit-lines BL1, BL2, BL3, . . . , BLm.

The page buffer circuit 410 may further include first through m-th cache latches CL1, CL2, CL3, . . . , CLm respectively corresponding to the first through m-th page buffer units PBU1, PBU2, PBU3, . . . , PBUm. For example, the page buffer circuit 410 may have a structure in which the cache latches of eight stages or the first through m-th cache latches CL1, CL2, CL3, . . . , CLm in a line. For example, the first through m-th cache latches CL1, CL2, CL3, . . . , CLm may be in a row in an extension direction of the first through m-th bit-lines BL1, BL2, BL3, . . . , BLm.

The sensing nodes of each of the first through m-th page buffer units PBU1, PBU2, PBU3, . . . , PBUm may be commonly connected to a combined sensing node SOC. In addition, the first through m-th cache latches CL1, CL2, CL3, . . . , CLm may be commonly connected to the combined sensing node SOC. Accordingly, the first through m-th page buffer units BU1, PBU2, PBU3, . . . , PBUm may be connected to the first through m-th cache latches CL1, CL2, CL3, . . . , CLm via the combined sensing node SOC. The first through m-th cache latches CL1, CL2, CL3, . . . , CLm may output a hard decision data HDRD.

The page buffer circuit 410 may further include the data cooker 440. The data cooker 440 may be connected to the first through m-th page buffer units PBU1, PBU2, PBU3, . . . , PBUm, may generate a soft decision data SDRD by using the first sensing data and the second sensing data stored in the first through m-th page buffer units PBU1, PBU2, PBU3, . . . , PBUm and may output the soft decision data SDRD.

Figure 15:
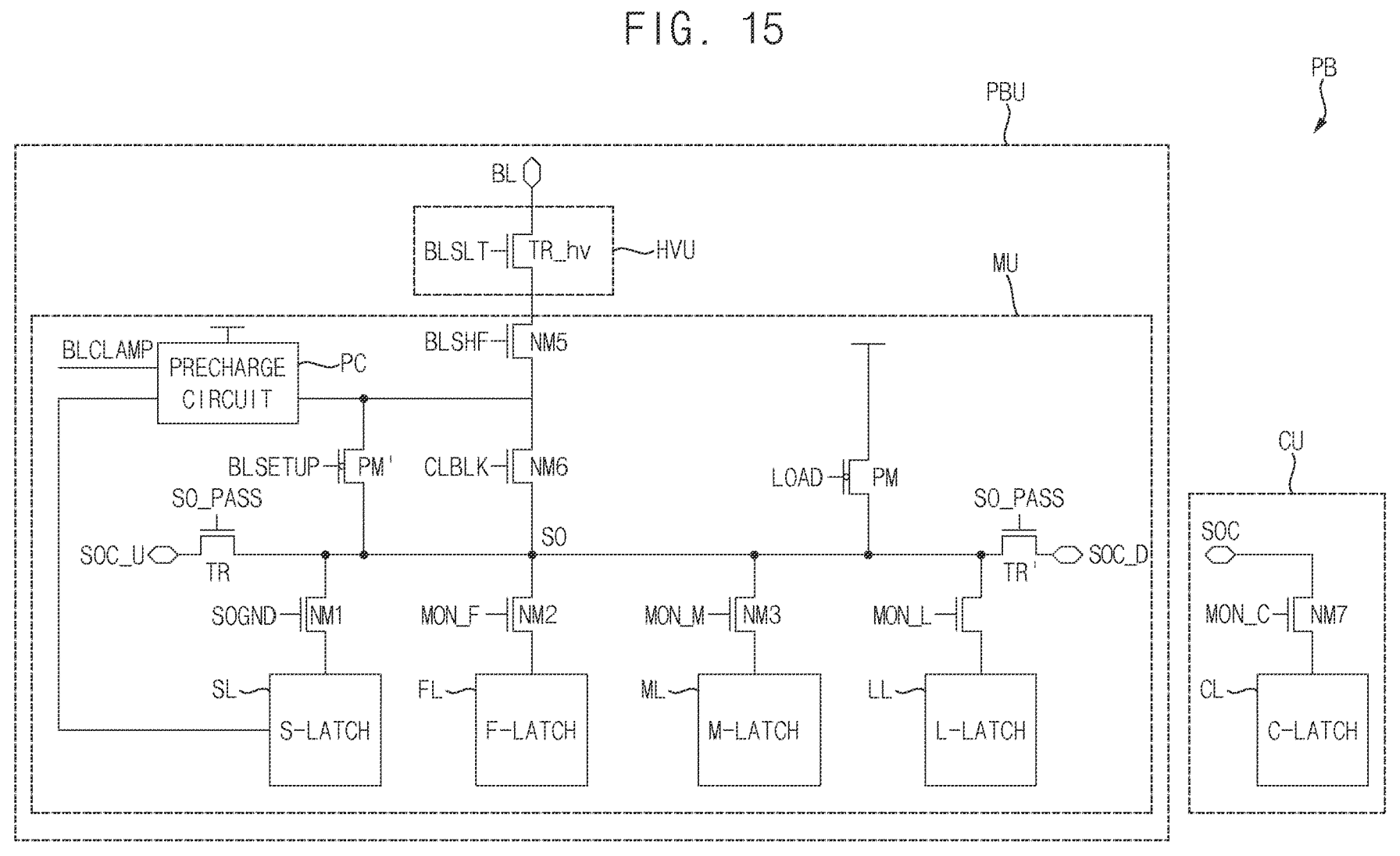

FIG. 15 illustrates a page buffer in detail.

Referring to FIG. 15, the page buffer PB may correspond to an example of the page buffer PB in FIG. 10. The page buffer PB may include a page buffer unit PBU and a cache unit CU. Because the cache unit CU includes a cache latch (C-LATCH) CL, and the C-LATCH CL is connected to a data input/output line, the cache unit CU may be adjacent to the data input/output line. Accordingly, the page buffer unit PBU and the cache unit CU may be apart from each other, and the page buffer PB may have a structure in which page buffer unit PBU and the cache unit CU are apart from each other.

The page buffer unit PBU may include a main unit MU. The main unit MU may include main transistors in the page buffer PB. The page buffer unit PBU may further include a bit-line selection transistor TR_hv that is connected to the bit-line BL and driven by a bit-line selection signal BLSLT. The bit-line select transistor TR_hv may include a high voltage transistor, and accordingly, the bit-line selection transistor TR_hv may be in a different well region from the main unit MU, that is, in a high voltage unit HVU.

The main unit MU may include a sensing latch (S-LATCH) SL, a force latch (F-LATCH) FL, an upper bit latch (M-LATCH) ML and a lower bit latch (L-LATCH) LL. In some implementations, the S-LATCH SL, the F-LATCH FL, the M-LATCH ML, or the L-LATCH LL may be referred to as main latches. The main unit MU may further include a precharge circuit PC capable of controlling a precharge operation on the bit-line BL or a sensing node SO based on a bit-line clamping control signal BLCLAMP, and may further include a transistor PM' driven by a bit-line setup signal BLSETUP.

The S-LATCH SL may, during a read or program verification operation, store data stored in a memory cell MC or a sensing result of a threshold voltage of the memory cell MC. In addition, the S-LATCH SL may, during a program operation, be used to apply a program bit-line voltage or a program inhibit voltage to the bit-line BL. The F-LATCH FL may be used to improve threshold voltage distribution during the program operation. The F-LATCH FL may store force data. After the force data is initially set to '1', the force data may be converted to '0' when the threshold voltage of the memory cell MC enters a forcing region that has a lower voltage than a target region. By utilizing the force data during a program execution operation, the bit-line voltage may be controlled, and the program threshold voltage distribution may be formed narrower.

The M-LATCH ML, the L-LATCH LL, and the C-LATCH CL may be utilized to store data externally input during the program operation, and may be referred to as data latches. When data of 3 bits is programmed in one memory cell MC, the data of 3 bits may be stored in the M-LATCH ML, the L-LATCH LL, and the C-LATCH CL, respectively. Until a program of the memory cell MC is completed, the M-LATCH ML, the L-LATCH LL, and the C-LATCH CL may maintain the stored data. In addition, the C-LATCH CL may receive data read from a memory cell MC during the read operation from the S-LATCH SL, and output the received data to the outside via the data input/output line.

In addition, the main unit MU may further include first through fourth transistors NM1 through NM4. The first transistor NM1 may be connected between the sensing node SO and the S-LATCH SL, and may be driven by a ground control signal SOGND. The second transistor NM2 may be connected between the sensing node SO and the F-LATCH FL, and may be driven by a forcing monitoring signal MON_F. The third transistor NM3 may be connected between the sensing node SO and the M-LATCH ML, and may be driven by a higher bit monitoring signal MON_M. The fourth transistor NM4 may be connected between the sensing node SO and the L-LATCH LL, and may be driven by a lower bit monitoring signal MON_L.

In addition, the main unit MU may further include fifth and sixth transistors NM5 and NM6 connected to each other in series between the bit-line selection transistor TV_hv and the sensing node SO. The fifth transistor NM5 may be driven by a bit-line shut-off signal BLSHF, and the sixth transistor NM6 may be driven by a bit-line connection control signal CLBLK. In addition, the main unit MU may further include a precharge transistor PM. The precharge transistor PM may be connected to the sensing node SO, driven by a load signal LOAD, and precharge the sensing node SO to a precharge level in a precharge period.

In some implementations, the main unit MU may further include a pair of pass transistors connected to the sensing node SO, or first and second pass transistors TR and TR'. In some implementations, the first and second pass transistors TR and TR' may also be referred to as first and second sensing node connection transistors, respectively. The first and second pass transistors TR and TR' may be driven in response to a pass control signal SO_PASS. In some implementations, the pass control signal SO_PASS may be referred to as a sensing node connection control signal. The first pass transistor TR may be connected between a first terminal SOC_U and the sensing node SO, and the second pass transistor TR' may be between the sensing node SO and a second terminal SOC_D.

For example, when the page buffer unit PBU corresponds to the second page buffer unit PBU2 in FIG. 14, the first terminal SOC_U may be connected to one end of the pass transistor included in the first page buffer unit PBU1, and the second terminal SOC_D may be connected to one end of the pass transistor included in the third page buffer unit PBU3. In this manner, the sensing node SO may be electrically connected to the combined sensing node SOC via pass transistors included in each of the third through m-th page buffer units PBU3 through PBUM.

During the program operation, the page buffer PB may verify whether the program is completed in a memory cell MC selected among the memory cells MC included in the NAND string connected to the bit-line BL. The page buffer PB may store data sensed via the bit-line BL during the program verify operation in the S-LATCH SL. The M-LATCH ML and the L-LATCH LL may be set in which target data is stored according to the sensed data stored in the S-LATCH SL.

For example, when the sensed data indicates that the program is completed, the M-LATCH ML and the L-LATCH LL may be switched to a program inhibit setup for the selected memory cell MC in a subsequent program loop. The C-LATCH CL may temporarily store input data provided from the outside. During the program operation, the target data to be stored in the C-LATCH CL may be stored in the M-LATCH ML and the L-LATCH LL.

Hereinafter, assuming that signals for controlling elements in the page buffer circuit 410 are included in the page buffer control signal PCTL in FIG. 10.

Figure 16:
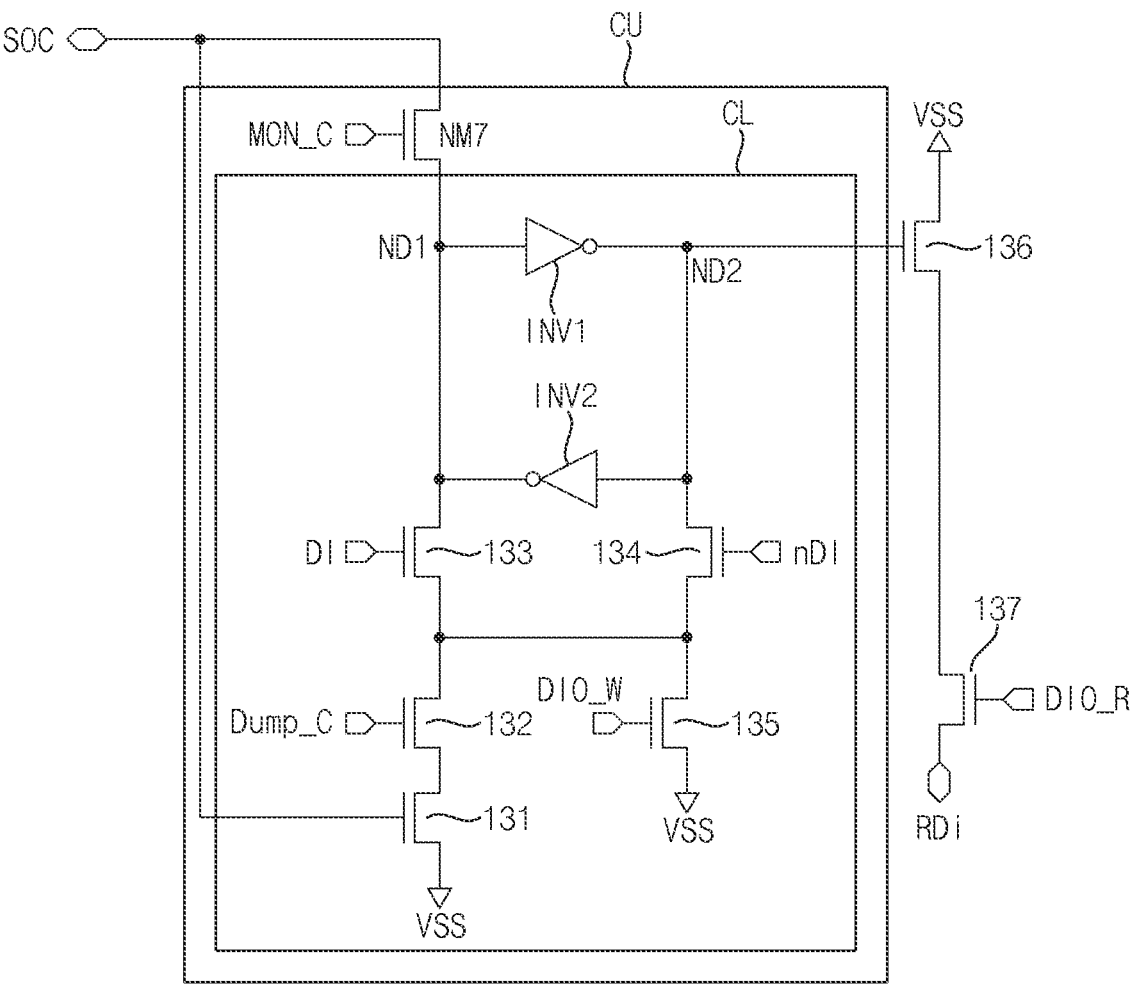
FIG. 16 is a circuit diagram illustrating an example of a cache unit.

FIG. 16 is a circuit diagram illustrating an example of the cache unit.

Referring to FIGS. 15 and 16, the cache unit CU may include the monitor transistor NM7 and the C-LATCH CL, and the C-LATCH CL may include first and second inverters INV1 and INV2, a dump transistor 132, and transistors 131, 133, to 135. The monitor transistor NM7 may be driven based on the cache monitoring signal MON_C, and may control a connection between the coupling sensing node SOC and the C-LATCH CL.

The first inverter INV1 may be connected between the first node ND1 and the second node ND2, the second inverter INV2 may be connected between the second node ND2 and the first node ND1, and thus, the first and second inverters INV1 and INV2 may form a latch. The transistor 131 may include a gate connected to the combined sensing node SOC and may be connected between the dump transistor 132 and a ground voltage VSS.

The dump transistor 132 may be driven by a dump signal Dump_C, and may transmit data stored in the C-LATCH CL to a main latch, for example, the S-LATCH SL in the page buffer unit PBU. The transistor 133 may be driven by a data signal D1, a transistor 134 may be driven by a data inversion signal nD1, and the transistor 135 may be driven by a write control signal DIO_W. When the write control signal DIO_W is activated, voltage levels of the first and second nodes ND1 and ND2 may be determined based on the data signal DI and the data inversion signal nD1, respectively.

The cache unit CU may be connected to a data I/O line (or data I/O terminal) RDi via transistors 136 and 137. The transistor 136 may include a gate connected to the second node ND2, and may be turned on or off based on a voltage level of the second node ND2. The transistor 137 may be driven by a read control signal DIO_R. When the read control signal DIO_R is activated and the transistor 137 is turned on, a voltage level of the input/output terminal RDi may be determined as '1' or '0' based on a state of the C-LATCH CL.

Figure 17:
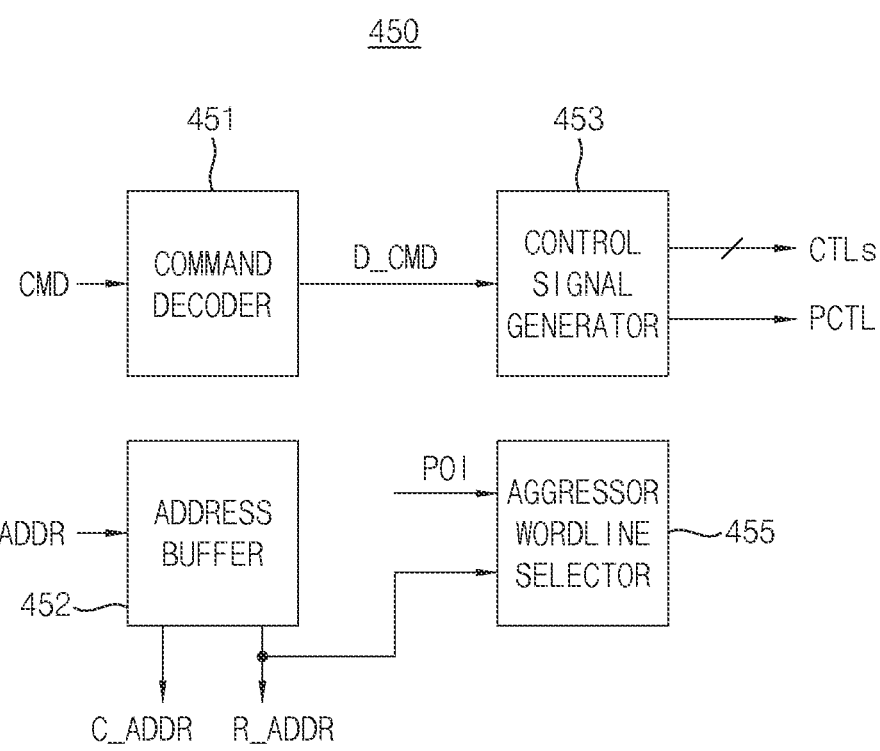
FIG. 17 is a block diagram illustrating the control circuit in the nonvolatile memory device of FIG. 10.

FIG. 17 is a block diagram illustrating the control circuit in the nonvolatile memory device of FIG. 10.

Referring to FIG. 17, the control circuit 450 includes a command decoder 451, an address buffer 452, a control signal generator 453 and the aggressor word-line selector 455.

The command decoder 451 decodes the command CMD and provides a decoded command D_CMD to the control signal generator 453.

The address buffer 452 receives the address signal ADDR, provides the row address R_ADDR to the address decoder 430 and the aggressor word-line selector 455 and provides the column address C_ADDR to the data input/output circuit 420.

The control signal generator 453 receives the decoded command D_CMD and the voltage level signal VLS, generates the control signals CTLs based on an operation directed by the decoded command D_CMD and the voltage level of the program pass voltage directed by the voltage level signal VLS, provides the control signals CTLs to the voltage generator 470, generates the page buffer control signal PCTL and provides the page buffer control signal PCTL to the page buffer circuit 410.

The aggressor word-line selector 455 may determine one of the word-lines adjacent to the selected word-line based on the row address ROW_ADDR and a programming order information (e.g., programming progress information) POI.

Figure 18:
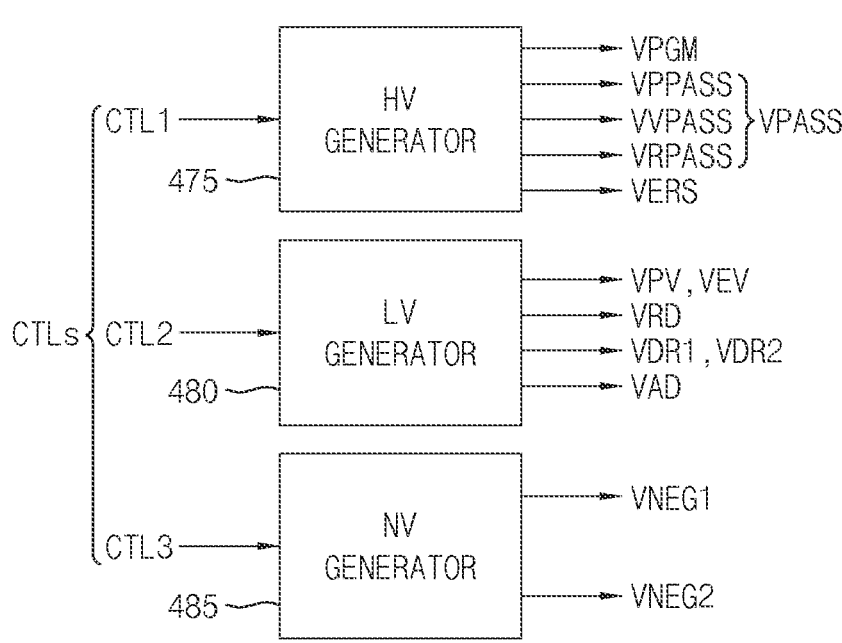
FIG. 18 is a block diagram illustrating the voltage generator in the nonvolatile memory device of FIG. 10.

FIG. 18 is a block diagram illustrating the voltage generator in the nonvolatile memory device of FIG. 10.

Referring to FIG. 18, the voltage generator 470 may include a high voltage HV generator 475 and a low voltage (LV) generator 480. The voltage generator 470 may further include a negative voltage generator 485.

The high voltage generator 470 may generate a program voltage PGM, a program pass voltage VPPASS, a verification pass voltage VVPASS, a read pass voltage VRPASS and an erase voltage VERS according to operations directed by the command CMD, in response to a first control signal CTL1. The program pass voltage VPPASS, the verification pass voltage VVPASS and the read pass voltage VRPASS may be referred to as a pass voltage VPASS.

The program voltage PGM is applied to the selected word-line, the program pass voltage VPPASS, the verification pass voltage VVPASS, the read pass voltage VRPASS may be applied to the unselected word-lines and the erase voltage VERS may be applied to the well of the memory block. The first control signal CTL1 may include a plurality of bits that indicate the operations directed by the decoded command D_CMD.

The low voltage generator 480 may generate a program verification voltage VPV, an erase verification voltage VER, a read voltage VRD, recovery read voltages VDR1 and VDR2, and an adjacent read voltage VAD according to operations directed by the command CMD, in response to a second control signal CTL2. The program verification voltage VPV, the read voltage VRD, the erase verification voltage VER and the recovery read voltages VDR1 and VDR2 may be applied to the selected word-line according to operation of the memory controller 200, e.g., a nonvolatile memory device. The adjacent read voltage VAD may be applied to an aggressor word-line in a data recovery read operation. The second control signal CTL2 may include a plurality of bits that indicate the operations directed by the decode command D_CMD.

The negative voltage generator 485 may generate a first negative voltage VNEG1 and a second negative voltage VNEG2 that have negative levels according to operations directed by the command CMD, in response to a third control signal CTL3. The third control signal CTL3 may include a plurality of bits which indicate the operations directed by the decoded command D_CMD. The first negative voltage VNEG1 may be applied to a selected word-line and unselected word-lines during the program recovery period and the second negative voltage VNEG2 may be applied to the unselected word-lines during the bit-line set-up period.

Figure 19:
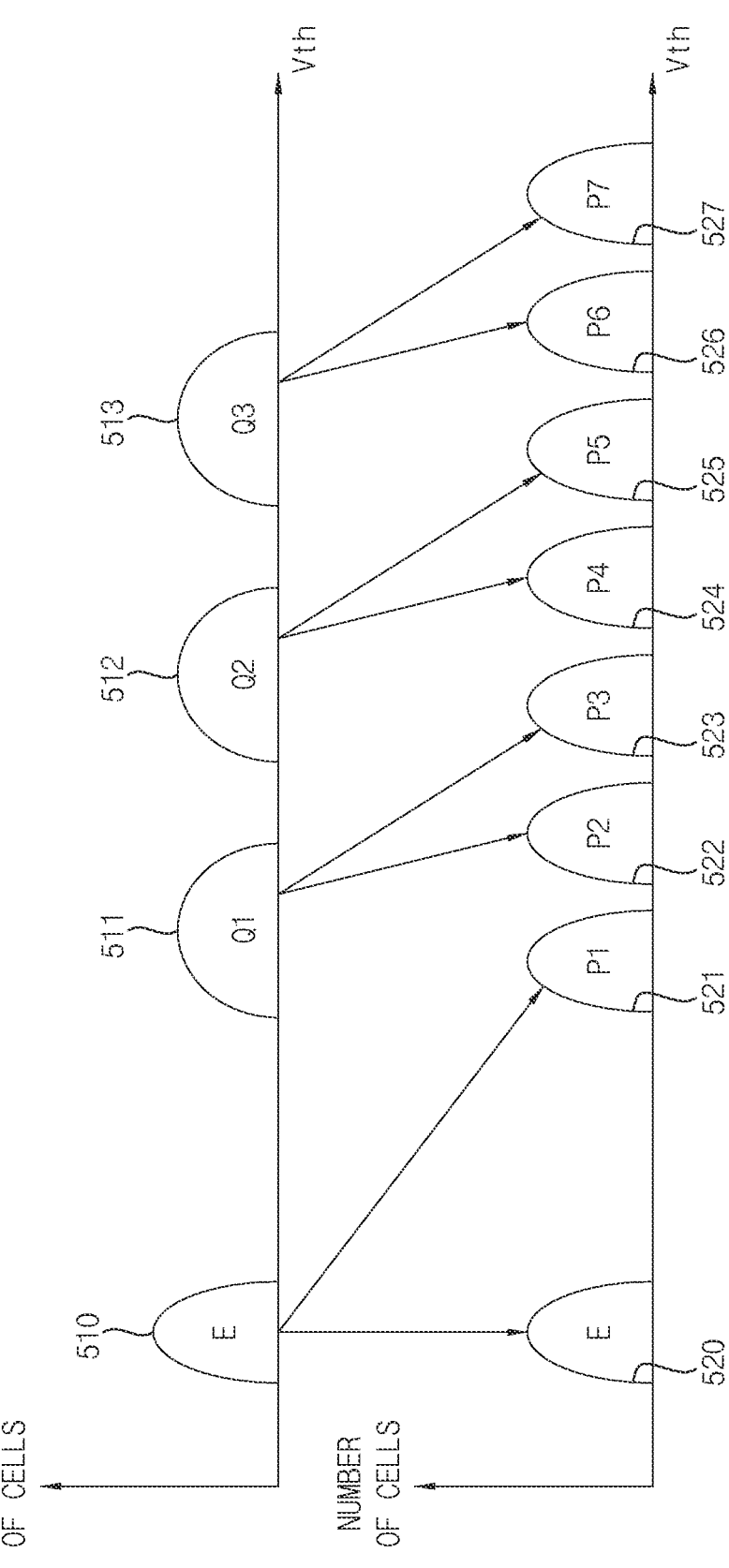
FIGS. 19 and 20 are diagrams illustrating examples of program methods for reducing word-line coupling.
Figure 20:
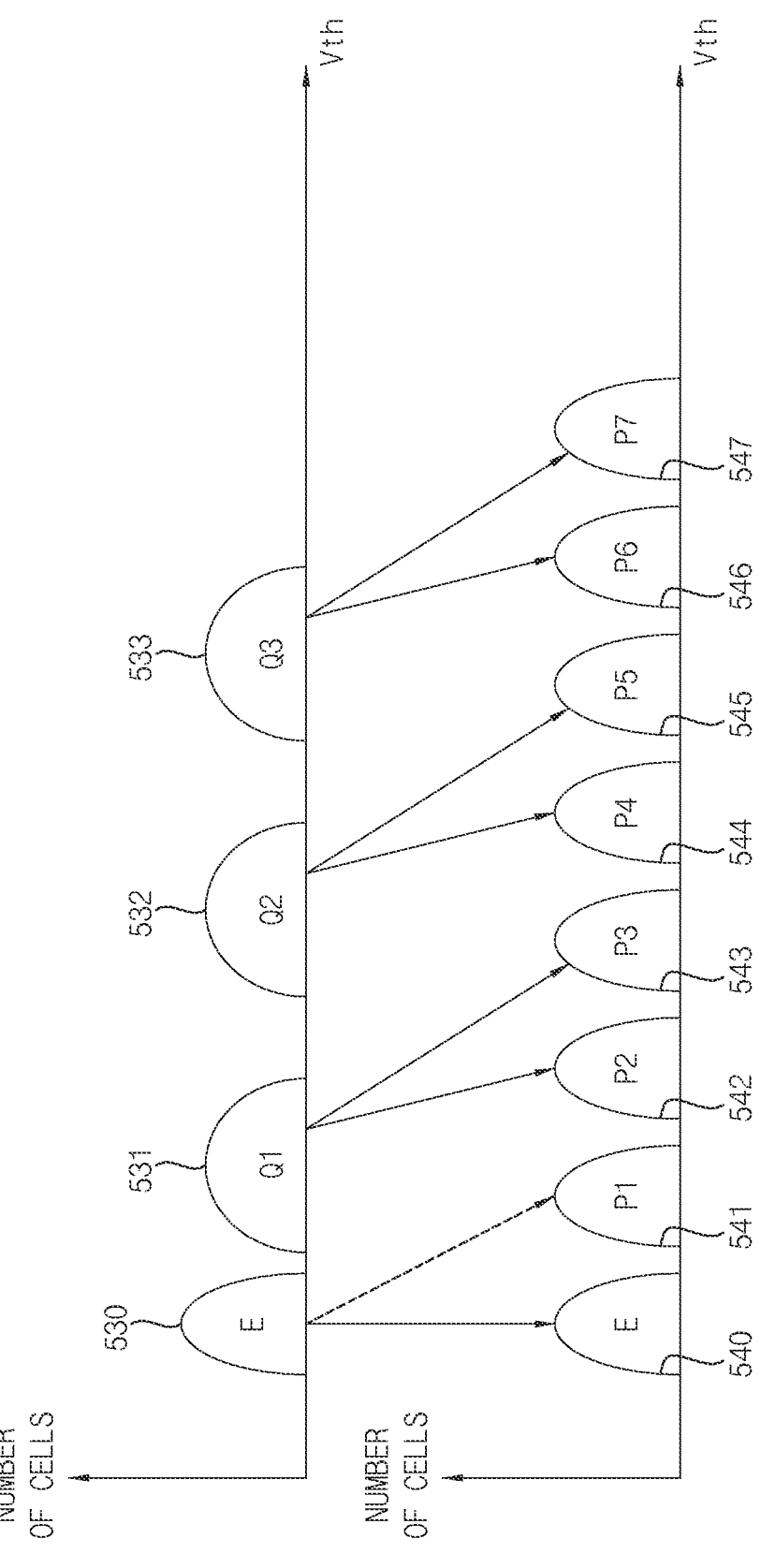

FIGS. 19 and 20 are diagrams illustrating program methods for reducing word-line coupling.

FIG. 19 illustrates a program method for reducing word-line coupling which will be performed under the assumption that each memory cell stores 3-bit data.

In FIG. 19, curves, e.g., threshold voltage distributions 510 to 513, illustrate threshold voltage distributions for memory cells after a lower 2-page program procedure representing logic states, for example, of "00", "01", "10" and "11", and curves, e.g., threshold voltage distributions 520, 521, 522, 523, 524, 525, 526 and 527 (i.e., 520 to 527), illustrate threshold voltage distributions for memory cells after an upper 1-page program procedure.

After lower and upper pages are programmed, as illustrated in FIG. 19, memory cells may have any one of eight data states E (erase) and P1, P2, P3, P4, P5, P6 and P7 (i.e., P1 to P7).

In case of a method illustrated in FIG. 19, memory cells in the threshold voltage distribution 510 are programmed to a threshold voltage distribution 520 or a threshold voltage distribution 521 after the low 2-page programming, and memory cells in the threshold voltage distribution 511 are programmed to a threshold voltage distribution 522 or a threshold voltage distribution 523 after the low 2-page programming. Memory cells in the threshold voltage distribution 512 are programmed to a threshold voltage distribution 524 or a threshold voltage distribution 525 after the low 2-page programming, and memory cells in the threshold voltage distribution 513 are programmed to a threshold voltage distribution 526 or a threshold voltage distribution 527 after the low 2-page programming.

FIG. 20 illustrates a program method for reducing word-line coupling which will be performed under the assumption that each memory cell stores 3-bit data.

In FIG. 20, curves 530, 531, 532 and 533 (i.e., 530 to 533) illustrate threshold voltage distributions for memory cells after a lower 2-page program procedure, and curves, e.g., threshold voltage distributions 541, 542, 543, 544, 545, 546 and 547 (i.e., 540 to 547), illustrate threshold voltage distributions for memory cells after an upper 1-page program procedure. After lower and upper pages are programmed, as illustrated in FIG. 20, memory cells may have any one of eight data states E and P1 to P7.

In case of a method illustrated in FIG. 20, memory cells in the threshold voltage distribution 530 are programmed to a threshold voltage distribution 540 or a threshold voltage distribution 541 after the low 2-page programming, and memory cells in the threshold voltage distribution 531 are programmed to a threshold voltage distribution 542 or a threshold voltage distribution 543 after the low 2-page programming. Memory cells in the threshold voltage distribution 532 are programmed to a threshold voltage distribution 544 or a threshold voltage distribution 545 after the low 2-page programming, and memory cells in the threshold voltage distribution 533 are programmed to a threshold voltage distribution 546 or a threshold voltage distribution 547 after the low 2-page programming.

The program method described in FIG. 20 is different from that in FIG. 19 in that negative verification voltages are used. That is, in case of the program method described in FIG. 19, verification voltages each corresponding to program states P1 to P7 may be set to positive voltages, respectively. In other words, each of the program states P1 to P7 may be judged with a positive voltage being applied to a selected word-line. On the other hand, in case of the program method described in FIG. 10, verification voltages each corresponding to program states P1 and P2 may be set to negative voltages, and verification voltages each corresponding to program states P3 to P7 may be set to positive voltages. In other words, one or more ones of the program states P1 to P7 may be judged with a negative voltage being applied to a selected word-line. It is well understood that the number of program states (or, data states) judged by a negative voltage is not limited to this disclosure.

Figure 21:
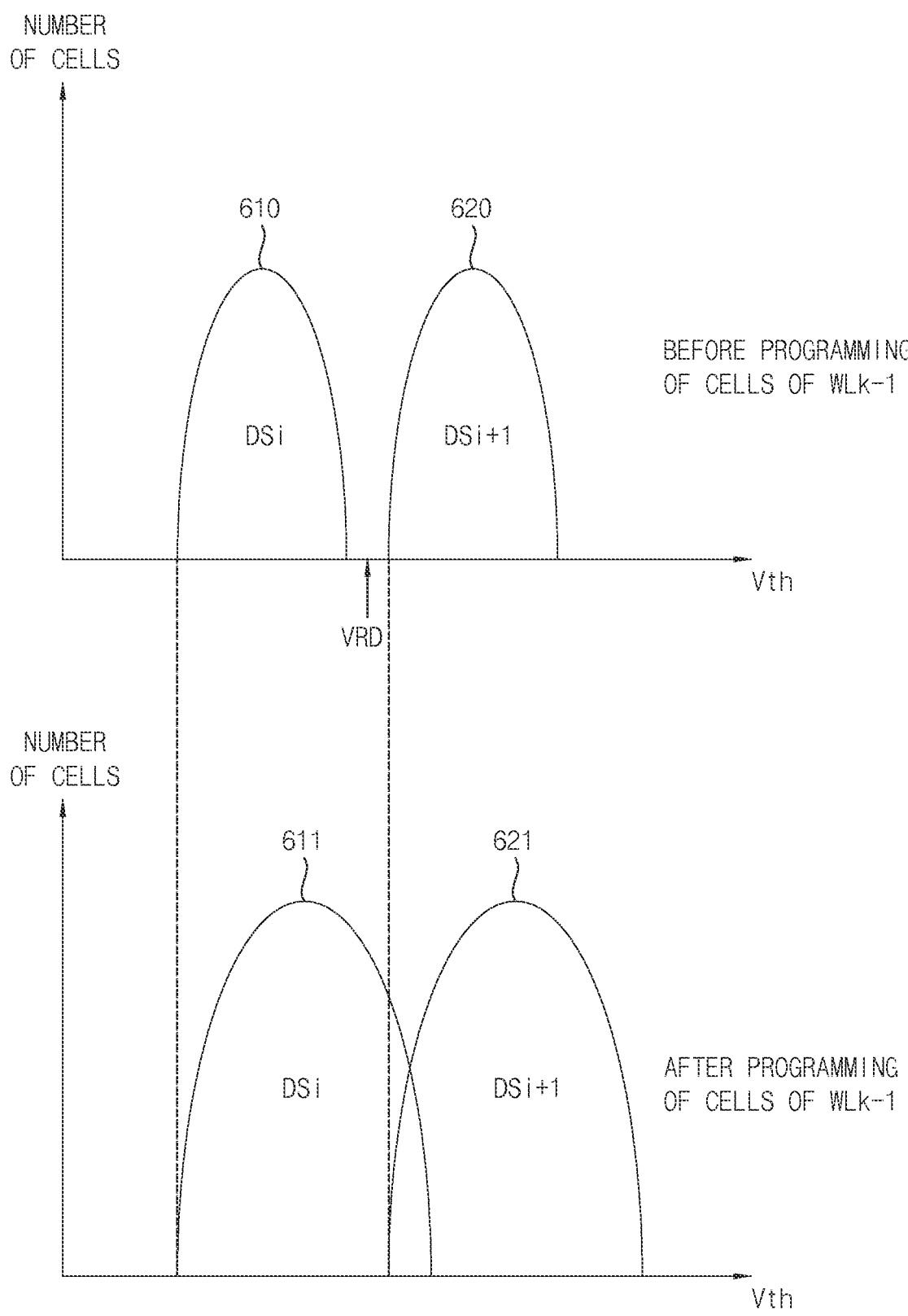
FIG. 21 is a diagram illustrating examples threshold voltage distributions associated with memory cells of an (k)-th word-line before and after word-line coupling caused when memory cells of a (k−1)-th word-line are programmed.

FIG. 21 is a diagram illustrating threshold voltage distributions associated with memory cells of a (k)-th word-line before and after word-line coupling caused when memory cells of a (k−1)-th word-line are programmed.

An example in FIG. 21 illustrates two adjacent threshold voltage distributions 610 and 620 associated with memory cells of a k-th word-line (i.e., a second word-line) before programming of memory cells of a (k−1)-th word-line (a third word-line), that is, before word-line coupling.

In FIG. 21, there are illustrated two threshold voltage distributions. But, a skilled person would understood that more threshold voltage distributions may be provided according to a bit number per cell. The number of threshold voltage distributions may be determined according to the number of data bits of stored in a memory cell. For example, when p-bit data (p being 2 or more integer) is stored in a memory cell, threshold voltage distributions may be provided. Threshold voltage distributions 610 and 620 may be judged using a read voltage VRD between threshold voltage distributions 610 and 620. Although not illustrated in FIG. 21, remaining threshold voltage distributions may be judged using a read voltage between adjacent threshold voltage distributions. This read operation is named a normal read operation, and the read voltage VRD used at the normal read operation is named a normal read voltage.

Threshold voltage distributions 611 and 621 in FIG. 21 illustrate threshold voltage distributions associated with memory cells of the k-th word-line after experiencing word-line coupling, which is caused when memory cells of the (k−1)-th word-line are programmed. The threshold voltage distributions 611 and 621 may include threshold voltage distributions associated with memory cells experiencing word-line coupling and memory cells not experiencing word-line coupling when memory cells of the (k−1)-th word-line are programmed.

Figure 22:
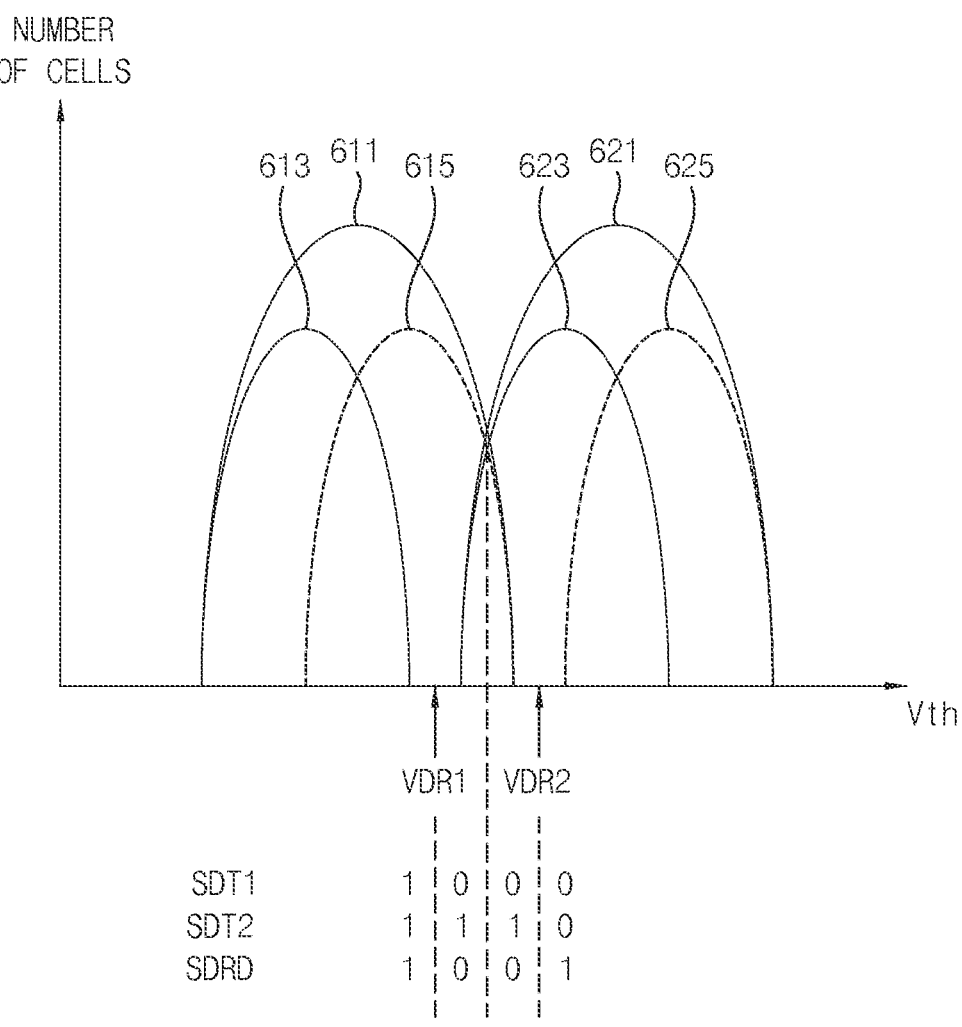
FIG. 22 is a diagram illustrating all threshold voltage distributions in FIG. 21 including coupled and uncoupled memory cells.

FIG. 22 is a diagram illustrating all threshold voltage distributions in FIG. 21 including coupled and uncoupled memory cells.

In an example of FIG. 22, threshold voltage distributions 613 and 623 illustrate threshold voltage distributions of memory cells (or, uncoupled memory cells), which do not experience a threshold voltage shift due to word-line coupling. Threshold voltage distributions 615 and 625 illustrate threshold voltage distributions of memory cells (or, coupled memory cells), which experience a threshold voltage shift due to word-line coupling. That is, the threshold voltage distributions 615 and 625 indicate a threshold voltage shift of memory cells, which was programmed to data states SDT1 and SDT2.

Programmed memory cells of a k-th word-line may belong to uncoupled threshold voltage distributions 613 and 623 or to coupled threshold voltage distributions 615 and 625, based on a threshold voltage shift caused by programming of memory cells of the (k−1)-th word-line. As illustrated in FIG. 22, a first recovery read voltage VDR1 may be used to read uncoupled memory cells, that is, to discriminate memory cells within threshold voltage distributions 613 and 623. A second recovery read voltage VDR2 may be used to read coupled memory cells, that is, to discriminate memory cells within threshold voltage distributions 615 and 625.

Two read operations may be executed with respect to one threshold voltage distribution (or, a data state) (formed of a coupled distribution and an uncoupled distribution) using the first and second recovery read voltages VDR1 and VDR2 in order to reduce the read error due to word-line coupling. The number of read operations executed with respect to one data state may be determined according to the number of groups formed of aggressor cells (or, program states causing the coupling). For example, aggressor cells constitute one group or two or more groups. If aggressor cells constitute one group, a read operation may be carried out twice, once for the uncoupled nth word-lines, and once for the coupled nth word-lines. If aggressor cells constitute two groups, a read operation may be carried out three times, once for the uncoupled nth word-lines, and twice for the two groups of coupled nth word-lines.

Referring to FIG. 22 which illustrates a read operation executed when aggressor cells constitute one group, a read operation using the first recovery read voltage VDR1 is performed to discriminate memory cells within the uncoupled distributions 613 and 623, and a read operation using the second recovery read voltage VDR2 is performed to discriminate memory cells within the coupled distributions 615 and 625.

First sensing data SDT1 are read from the k-th word-line based on the first recovery read voltage VDR1 and the first sensing data SDT1 are latched in first latches of the page buffers in the page buffer circuit 410 in FIG. 10. Second sensing data SDT2 are read from the k-th word-line based on the second recovery read voltage VDR2 and the second sensing data SDT2 are latched in second latches of the page buffers in the page buffer circuit 410. Third sensing are read from the (k−1)-th word-line (i.e., an aggressor word-line) based on the adjacent read voltage and the third sensing data are latched in third latches of the page buffers in the page buffer circuit 410. One of the first sensing data SDT1 and the second sensing data SDT2 are selected as the hard decision data based on program state of the third sensing data and the data cooker 440 in FIG. 14 may generate the soft decision data SDRD by performing an exclusive NOR operation on the first sensing data SDT1 and the second sensing data SDT2.

Memory cells to be read using the first recovery read voltage VDR1 and memory cells to be read using the second recovery read voltage VDR2 may be divided based on data read from the memory cells of the aggressor word-line.

In one example, in case of 3-bit data, if aggressor cells constitute one group, the aggressor cells may be memory cells programmed to have program states P1, P3, P5 and P7 as illustrated in FIGS. 19 and 20. In another example, in case of 3-bit data, if aggressor cells constitute one group, the aggressor cells may be memory cells programmed to have at least three program states of program states illustrated in FIGS. 19 and 20. If aggressor cells constitute two groups, the aggressor cells may be memory cells programmed to have a program state P1 in FIG. 19 and remaining program states P2 to P7 therein. But, program states to define groups of aggressor cells are not limited thereto. For example, program states to define groups of aggressor cells can be determined variously according to a program manner and a coupling level.

In FIG. 22, in addition, the threshold voltage distributions 611 and 621 associated with the memory cells of the k-th word-line tend to be widened toward in a positive direction (that is, an increasing direction) of the threshold voltage Vth as the time after a program operation performed on the memory cells is completed (retention time) increases when the threshold voltage distributions 611 and 621 are threshold voltage distributions representing lower program states. The threshold voltage distributions 611 and 621 tend to be widened in a negative direction (that is, a decreasing direction) along the threshold voltage Vth as the retention time increases.

In addition, widened amount of the threshold voltage distributions 611 and 621 associated with the memory cells of the k-th word-line may depend on program states of memory cells of the (k−1)-th word-line.

Figure 23A:
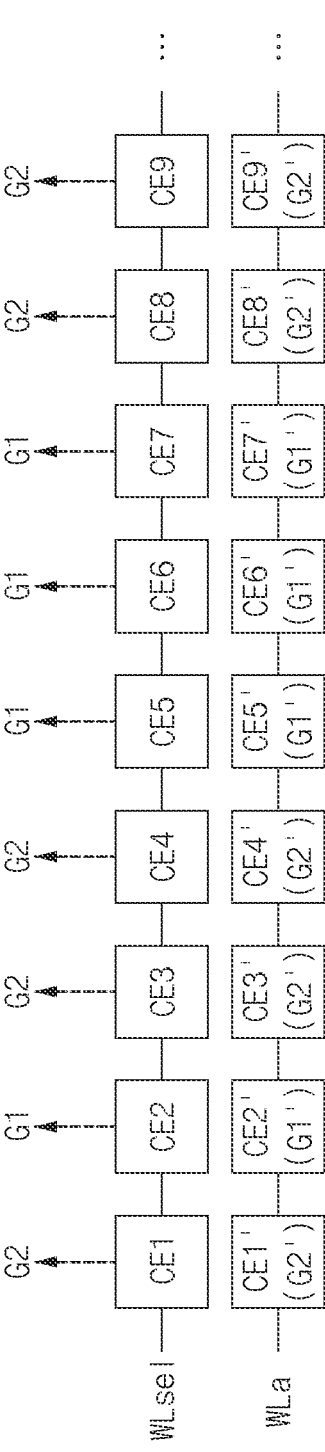
FIGS. 23A, 23B, and 23C are diagrams illustrating an example of grouping memory cells in a method of controlling an operation of a nonvolatile memory device.
Figure 23B:
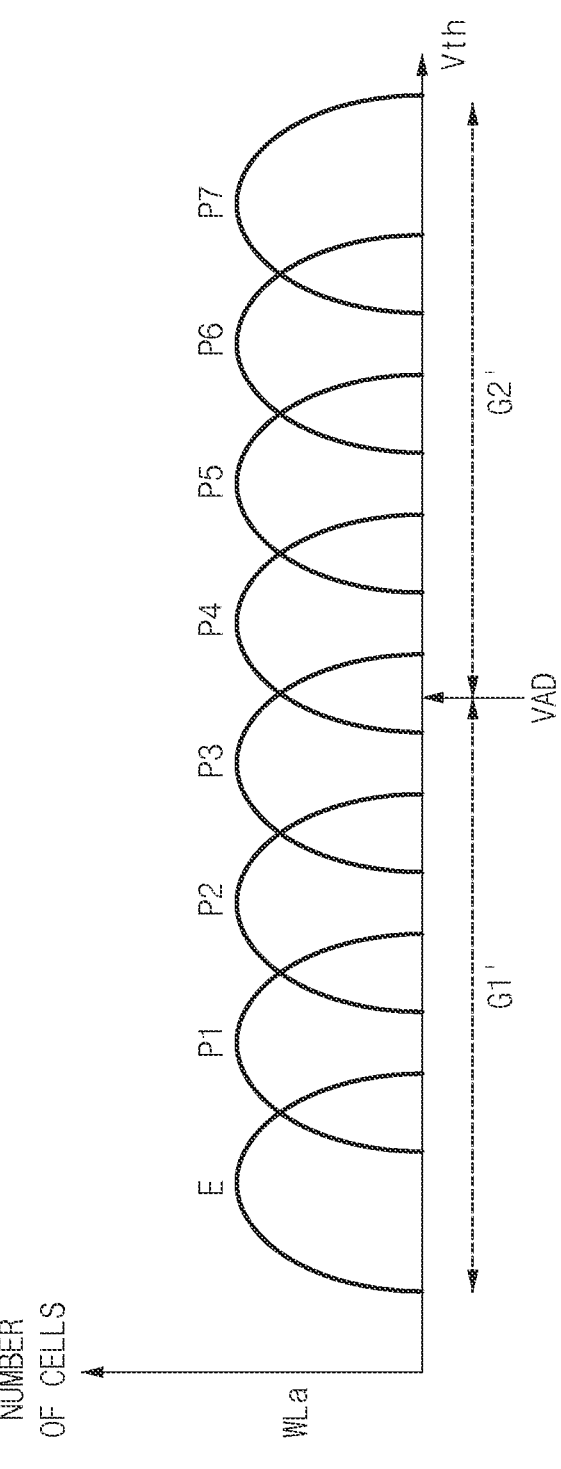
Figure 23C:
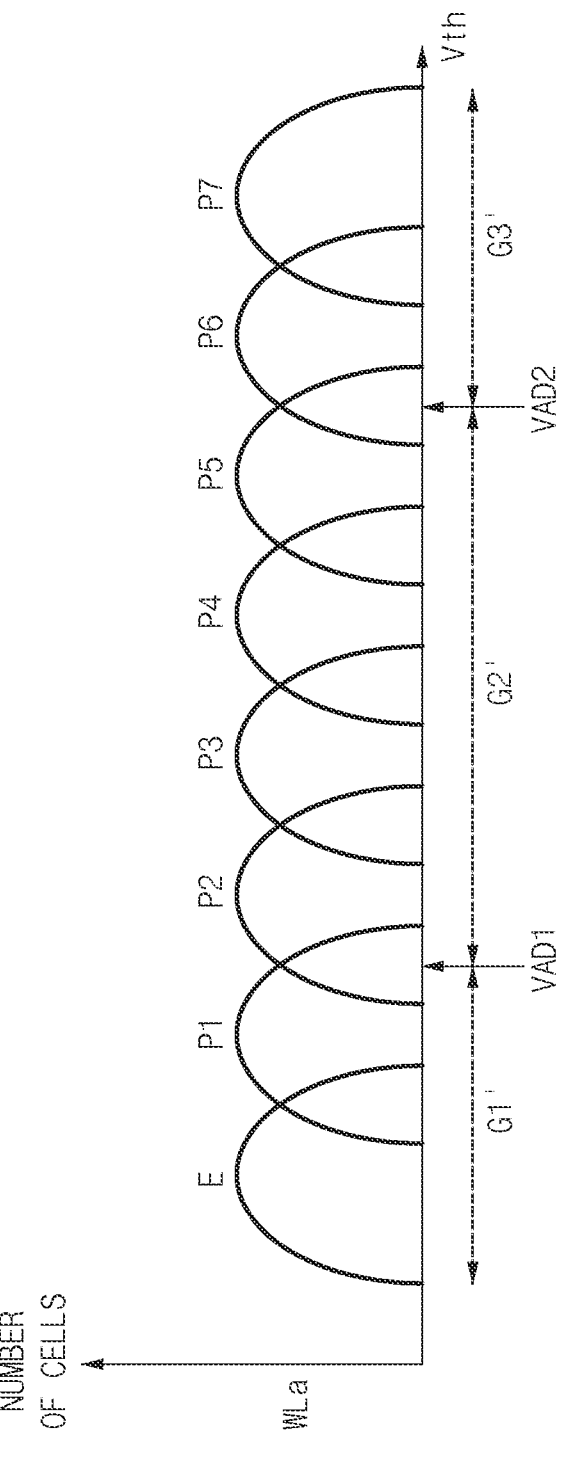

FIGS. 23A, 23B, and 23C are diagrams illustrating an example of grouping memory cells in a method of controlling an operation of a nonvolatile memory device.

FIG. 23A illustrates a selected word-line WLsel and one aggressor word-line WLa adjacent to the selected word-line WLsel. The selected word-line WLsel may include a plurality of selected memory cells CE1-CE9 and the aggressor word-line WLa may include a plurality of aggressor memory cells CE1'-CE9' respectively adjacent to the selected memory cells CE1~CE9.

FIG. 23B illustrates an example in which the aggressor memory cells of the aggressor word-line WLa are grouped into two aggressor cell groups, that is, a first aggressor cell group G1' and a second aggressor cell group G2', based on one adjacent read voltage VAD. The first aggressor cell group G1' may include the aggressor memory cells having the relatively low threshold voltages and the second aggressor cell group G2' may include the aggressor memory cells having the relatively high threshold voltages.

For example, as illustrated in FIG. 23A, the aggressor memory cells CE2', CE5', CE6', and CE7' may be included in the first aggressor cell group G1' and the aggressor memory cells CE1', CE3', CE4', CE8', and CE9' may be included in the second aggressor cell group G2'.

The selected memory cells CE1-CE9 of the selected word-line WLsel may be grouped into the respective selected cell groups according to the respective aggressor cell groups of the aggressor memory cells adjacent to the selected memory cells. In the example of FIG. 23A, the selected memory cells CE2, CE5, CE6, and CE7 corresponding to the aggressor memory cells CE2', CE5', CE6', and CE7' of the first aggressor cell group G1' may be included in a first selected cell group G1 and the selected memory cells CE1, CE3, CE4, CE8, and CE9 corresponding to the aggressor memory cells CE1', CE3', CE4', CE8', and CE9' of the second aggressor cell group G2' may be included in a second selected cell group G2.

FIG. 23C illustrates an example in which the aggressor memory cells of the aggressor word-line are grouped into three aggressor cell groups, that is, a first aggressor cell group G1', a second aggressor cell group G2', and a third aggressor cell group G3', based on two adjacent read voltages VAD1 and VAD2. As such, the aggressor memory cells may be grouped into the first through third aggressor cell groups G1'-G3' having different the threshold voltage ranges based on the first and second adjacent read voltages VAD1 and VAD2.

When two or more adjacent read voltages are applied to the aggressor word-line WLa, a first read operation is performed on the selected word-line WLsel by applying three or more recovery read voltages to the selected word-line WLsel and three or more sensing data may be latched in first latches of the page buffers of the page buffer circuit 410. In addition, a second read operation is performed on the aggressor word-line WLa and two or more decision data may be latched in second latches of the page buffers of the page buffer circuit 410.

The control circuit 450 may control the read operation by selecting one of the three or more sensing data as the hard decision data and by generating the soft decision data based on the three or more sensing data.

Figure 24A:
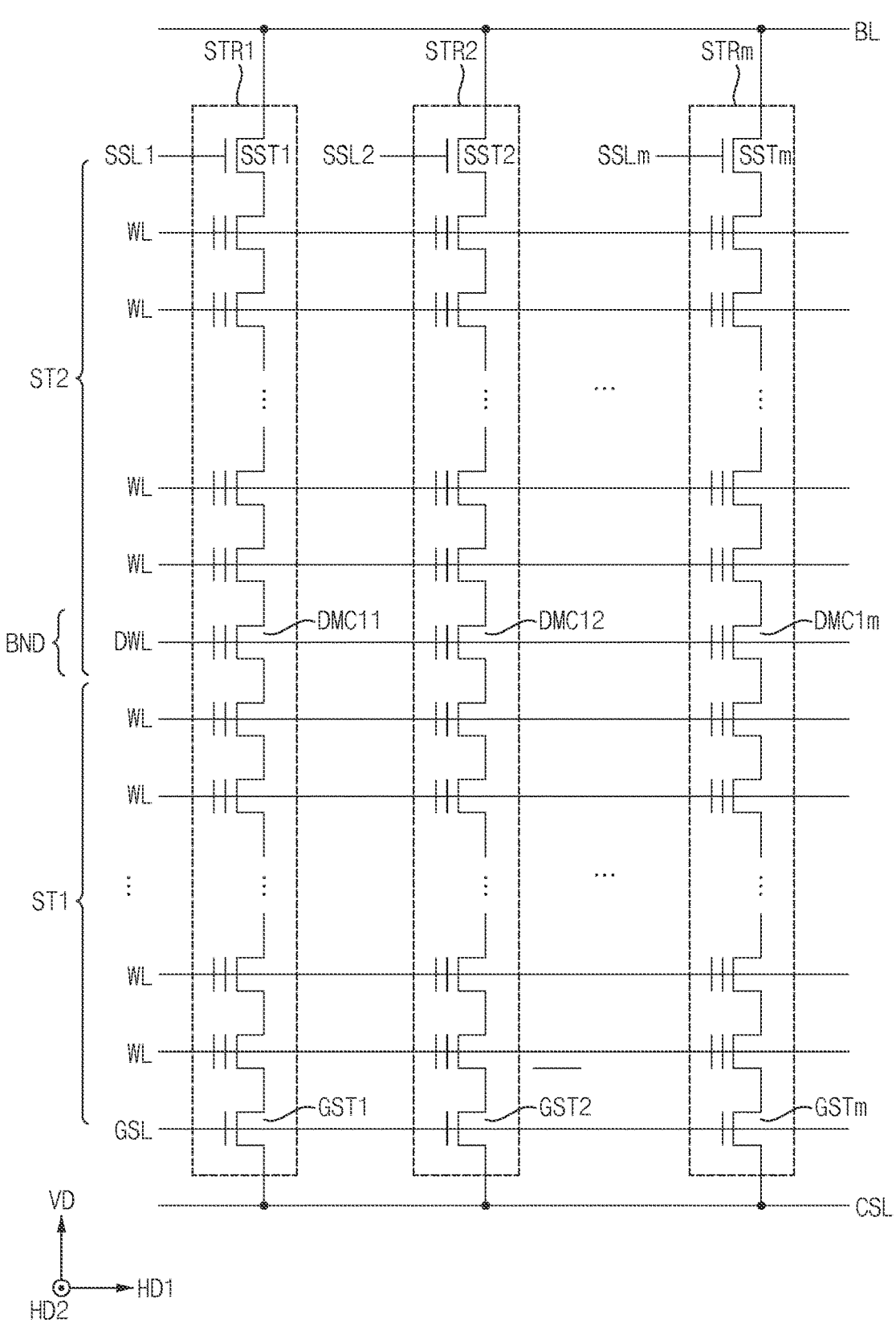
FIG. 24A is a circuit diagram illustrating an example of a structure of a memory cell array.
Figure 24B:
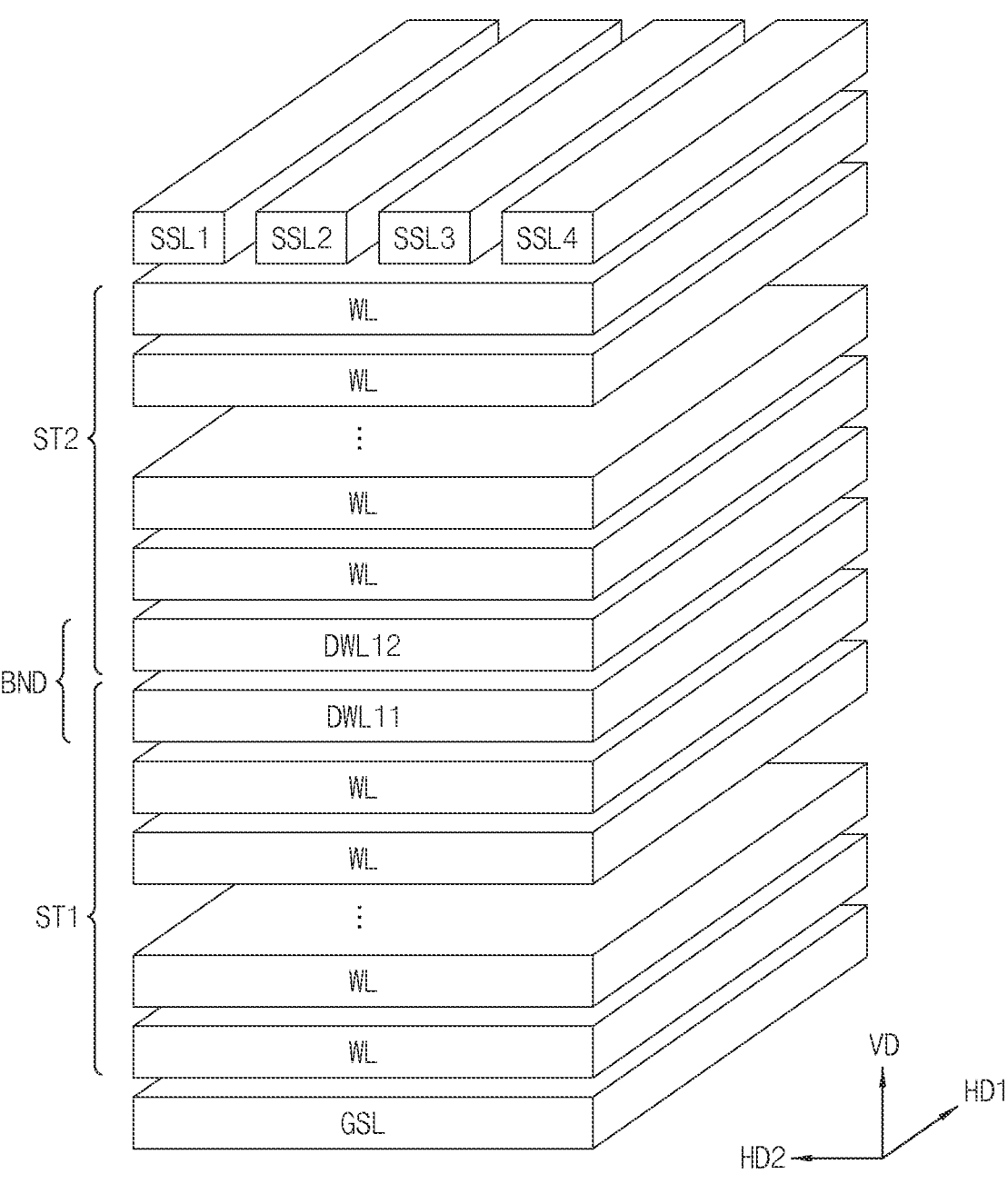
FIG. 24B is a perspective view illustrating an example of a memory block corresponding to a structure of FIG. 24A.

FIG. 24A is a circuit diagram illustrating a structure of a memory cell array, and FIG. 24B is a perspective view illustrating a memory block corresponding to a structure of FIG. 24A.

FIG. 24A illustrates a memory block including cell strings connected to one bit-line BL and one common source line CSL for convenience of illustration, but a skilled person would understood that the memory block may have a three-dimensional structure of a plurality of bit-lines as described with reference to FIGS. 11 and 12.

Referring to FIGS. 24A and 24B, a memory block includes a plurality of cell strings STR1, STR2, . . . , STRm connected between a bit-line BL and a common source line CSL. The cell strings STR1, STR2, . . . , STRm may include string selection transistors SST1, SST2, . . . , SSTm controlled by string selection lines SSL1, SSL2, . . . , SSLm, memory cells controlled by word-lines WL, dummy memory cells DMC11, DMC12, . . . , DMCIm controlled by a dummy word-line, and ground selection transistors GST1, GST2, . . . , GSTm controlled by a ground selection line GSL, respectively. The plurality of cell strings STR1, STR2, . . . , STRm may be divided into a first stack ST1 and a second stack ST2 along the vertical direction VD. The second stack ST2 is disposed at a higher position than the first stack ST1 in the vertical direction VD. Memory cells coupled to at least one word-line located at an edge of each of the first stack ST1 and the second stack ST2 may be dummy memory cells. The dummy memory cells may not store valid data or may store smaller bit of data than other memory cells.

The dummy memory cells DMC11, DMC12, . . . , DMCIm may be included in the second stack ST1.

FIG. 24A illustrates an example in which the ground selection transistors GST1, GST2, . . . , GSTm are connected to the same ground selection line GSL. In other examples, the ground selection transistors are connected to the respective ground selection lines.

In some implementations, as illustrated in FIGS. 24A, a boundary portion BND may include one gate line corresponding to the dummy word-line DWL that activates simultaneously the dummy memory cells DMC11, DMC12, . . . , DMCIm connected thereto.

In some implementations, as illustrated in FIGS. 24B, a boundary portion BND may include two gate lines corresponding to dummy word-lines DWL11 and DWL12. The dummy word-line DWL11 may be included in the first stack ST1 and the dummy word-line DWL12 may be included in the second stack ST2.

That is, the memory block may be implemented in a multi-stack structure including two or more stacks, and the dummy word-line is placed at a boundary of the stacks.

In FIGS. 24A and 234B, although the memory block includes the first stack ST1 and a second stack ST2, the memory block may include three or more stacks in other implementations.

Figure 25:
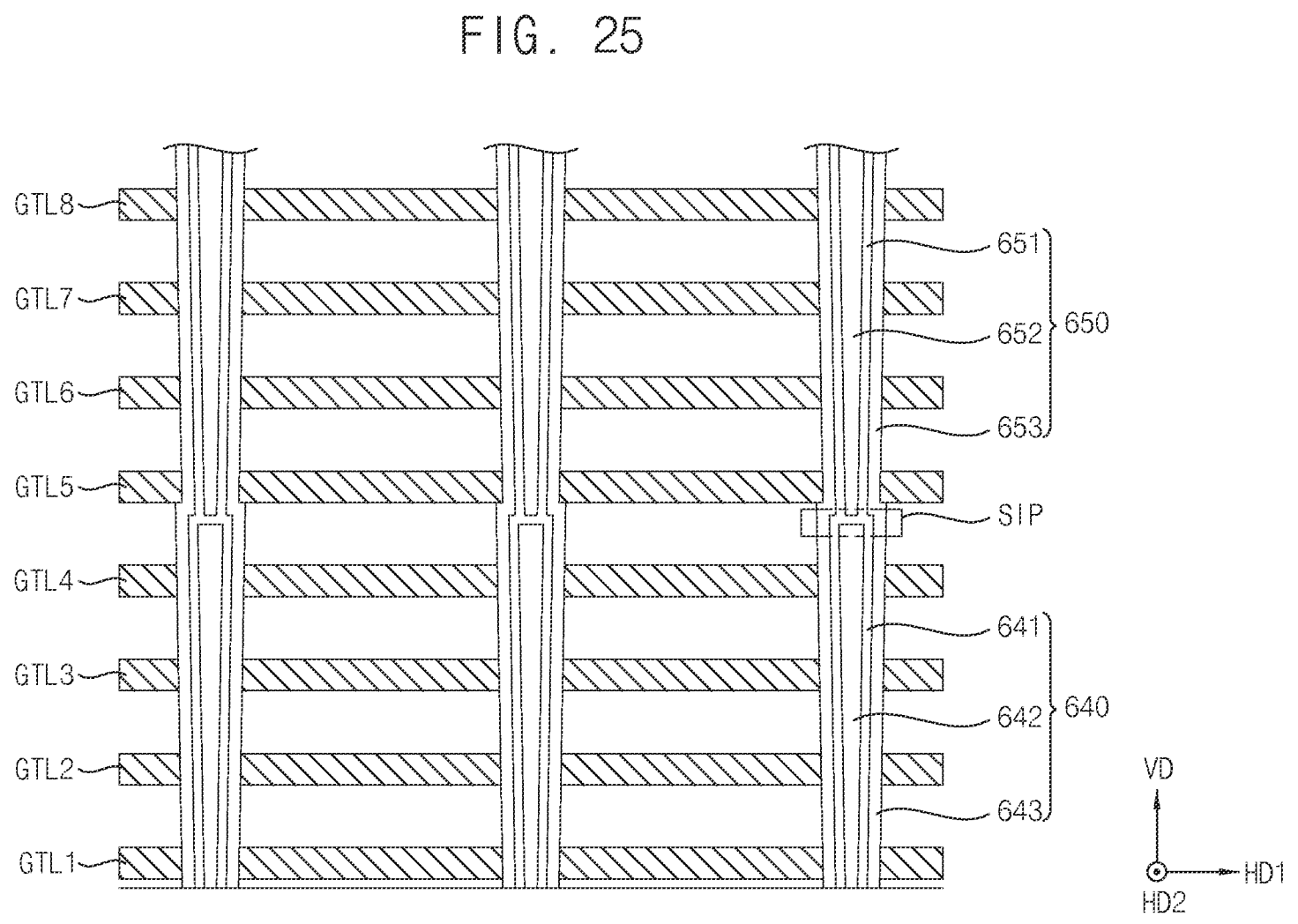

FIG. 25 is a cross-sectional view of an example of a boundary portion included in a memory block.

Referring to FIG. 25, a channel hole of each cell string STR may include a first sub channel hole 640 and a second sub channel hole 640. A channel hole may be referred to as a pillar. The first sub channel hole 640 may include a channel layer 641, an inner material 642, and an insulation layer 643. The second sub channel hole 650 may include a channel layer 651, an inner material 652, and an insulation layer 653. The channel layer 641 of the first channel hole 640 may be connected to the channel layer 651 of the second sub channel hole 650 through a P-type silicon pad SIP. The sub channel holes 640 and 650 may be formed using a stopper line GTL5 having an appropriate etch rate. For example, the stopper line GTL5 may be formed of polysilicon and the other gate lines GTL1-GTL4 and the GTL6-GTL8 may be formed of metal, such as tungsten to implement the appropriate etch rate.

The above-described boundary portion BND may correspond to the stopper layer GTL5 that is used to form the plurality of sub channel holes. The cells in the stopper layer GTL5 may be improper for storing data, and the stopper layer may be used as the boundary portion BND to form dummy memory cells. The examples in this disclosure are not limited to a boundary portion of one stopper layer, and the boundary portion may include two or more gate layers.

The dummy memory cells may be implemented with a cell type or transistor type. The cell type may include a floating gate as a flash memory cell and the transistor type may not include the floating gate.

Figure 26A:
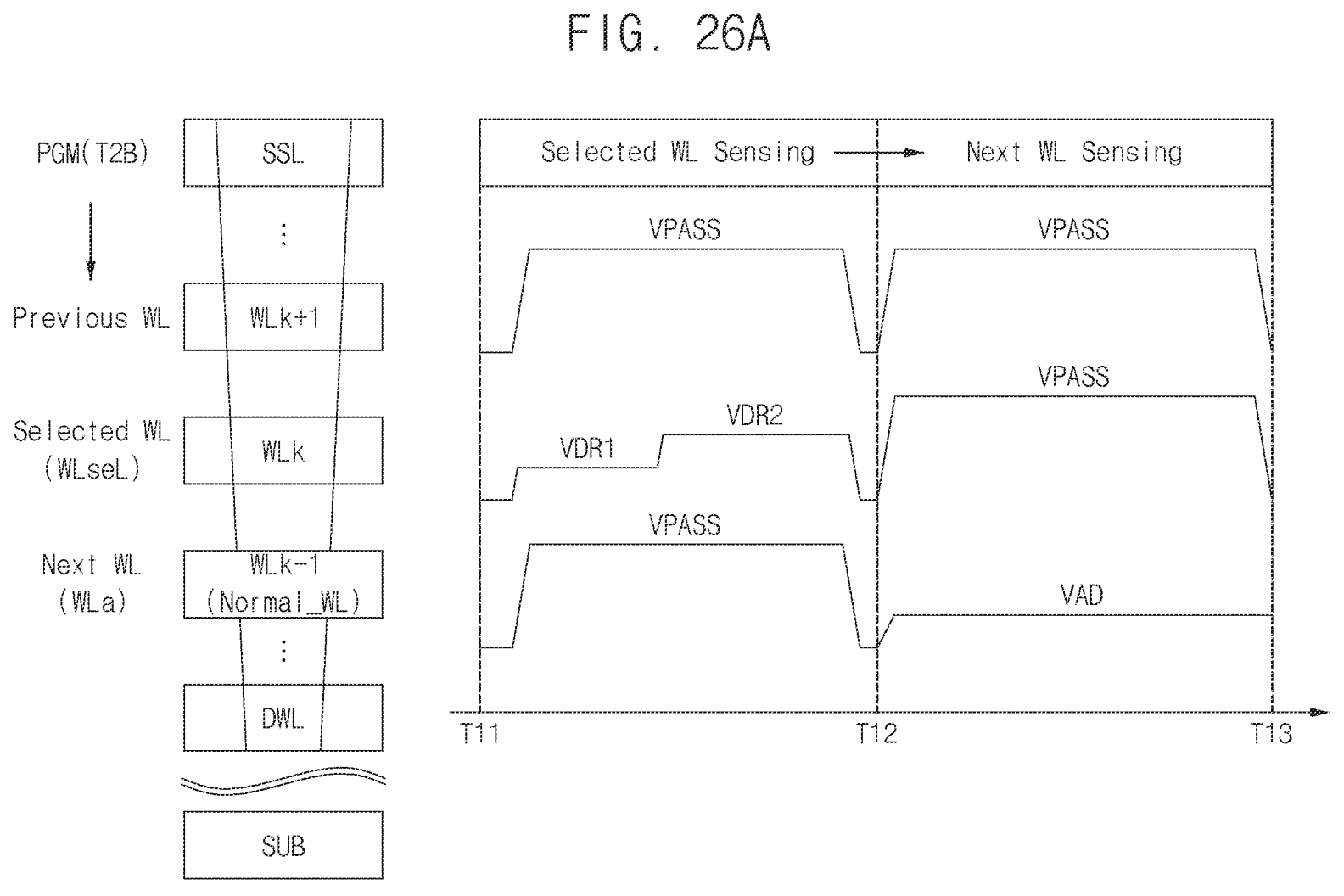
Figure 26B:
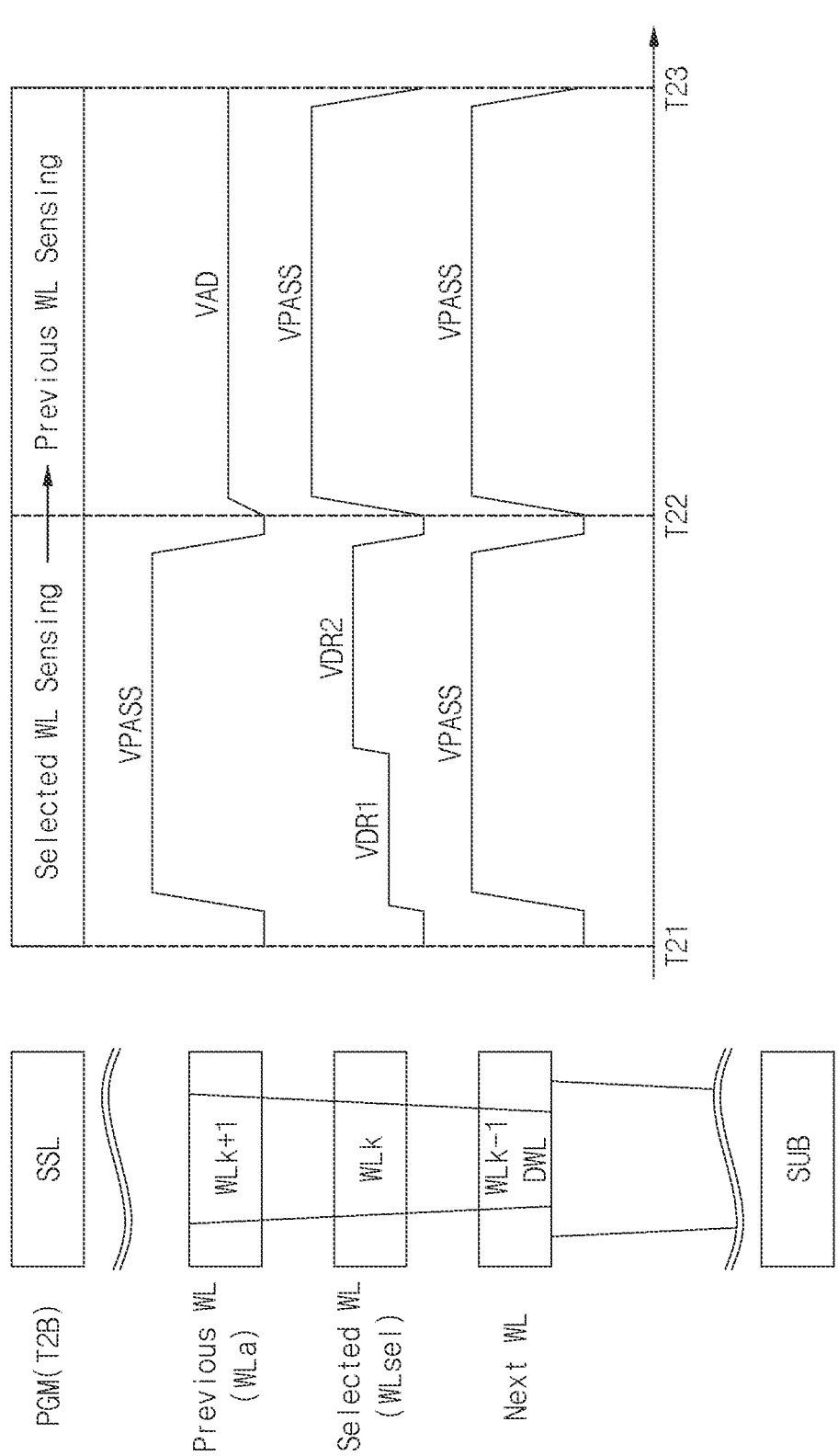

FIGS. 26A and 26B are timing diagrams illustrating a data recovery read operation when programming progresses from the string selection line to a substrate.

A manner in which programming progresses from the top to the bottom is called a top to bottom (T2B) program manner FIG. 26A shows an example where the next word-line is the normal word-line, and FIG. 26B shows an example where the next word-line is the dummy word-line.

Referring to FIG. 26A, the (k+1)-th word-line WLk+1 is the previous word-line, the k-th word-line WLk is the selected word-line, and the (k−1)-th word-line WLk−1 is the next word-line. The nonvolatile memory device 400 (refer to FIG. 10) may perform the first read operation on the k-th word-line.

During the first read operation on the selected word-line, a first recovery read voltage VDR1 and a second recovery read voltage VDR2 may be provided to the k-th word-line and the first sensing data and the second sensing data may be obtained. The pass voltage VPASS may be provided to adjacent word-lines WLk+1 and WLk−1. After the first read operation, a second read operation may be performed to compensate for threshold voltages of the selected word-line.

After the first read operation, the nonvolatile memory device 400 may detect a current disturbance level of the selected word-line through one additional sensing operation (the second read operation) and may compensate for the disturbance based on a detection result. In this case, a word-line targeted for the one additional sensing operation is the aggressor word-line and is the (k−1)-th word-line WLk−1 in FIG. 26A. An adjacent read voltage VAD for determining the compensation level may be provided to the (k−1)-th word-line WLk−1. In this case, the pass voltage VPASS may be applied to the (k+1)-th word-line WLk+1, and the pass voltage VPSS may be applied to the k-th word-line WLk.

The third sensing data may be obtained through the second read operation and one of the first sensing data and the second sensing data may be selected as the hard decision data based on program state of the third sensing data.

Referring to FIG. 26B, the (k+1)-th word-line WLk+1 is the previous word-line, the k-th word-line WLk is the selected word-line, and the (k−1)-th word-line WLk−1 is the next word-line. In the example of FIG. 26B, the next word-line is the dummy word-line DWL.

After the first read operation on the selected word-lie, a second read operation may be performed to compensate for threshold voltages of the selected word-line. In this case, a word-line targeted for one second read operation is the aggressor word-line. When the next word-line is the dummy word-line, the aggressor word-line is the previous word-line and is the (k+1)-th word-line WLk+1 in FIG. 26B.

The adjacent read voltage VAD for determining the compensation level may be provided to the (k+1)-th word-line WLk+1. In this case, the pass voltage VPASS may be applied to the (k−1)-th word-line WLk−1 and the k-th word-line WLk.

The third sensing data may be obtained through the second read operation and one of the first sensing data and the second sensing data may be selected as the hard decision data based on program state of the third sensing data. A threshold voltage of the selected word-line may be distorted due to lateral spreading caused by the previous word-line WLk−1

In FIGS. 26A and 26B, the (k+1)-th word-line WLk+1 is a first word-line, the k-th word-line WLk is a second word-line and the (k−1)-th word-line WLk−1 is a third word-line.

In addition, when programming progresses from the substrate SUB to the string selection line SSL in FIGS. 26A and 26B, the (k−1)-th word-line WLk+1 is the previous word-line, the k-th word-line WLk is the selected word-line, and the (k+1)-th word-line WLk+1 is the next word-line.

Figure 27:
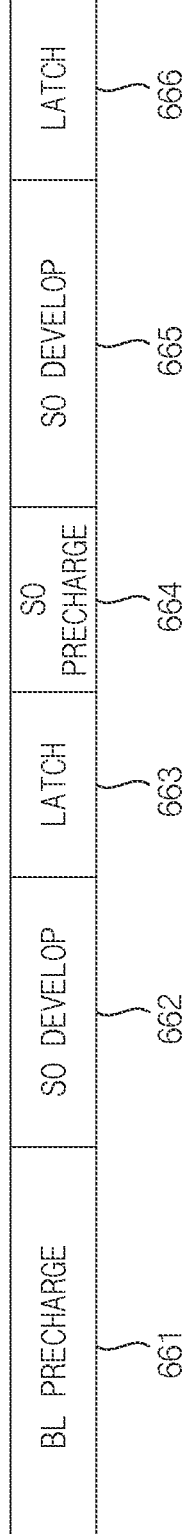
FIG. 27 is diagram of an example of a read operation on the selected word-line.

FIG. 27 is diagram of a read operation on the selected word-line.

Referring to FIGS. 15 and 27, the read operation on the selected word-line may include a bit-line precharge period BL PRECHARGE 661, a sensing node develop period SO DEVELOP 665, a latch period LATCH 663, a sensing node precharge period SO PRECHARGE 654, a sensing node develop period SO DEVELOP 655, and a latch period LATCH 656. The read operation on the selected word-line may further include bit-line recovery period after the latch period LATCH 656.

During the bit-line pre-charge period BL PRECHARGE 661, the bit-line BL is precharged with a predetermined voltage level by the precharge circuit PC and the sensing node SO is precharged with the power supply voltage Vdd.

During the sensing node develop period 662, a supply of a current to the sensing node SO from the pre-charge circuit PC may be blocked, and the transistors TR_hv, NM5, and NM6 may be turned on. With this condition, the sensing node SO may be developed.

At the latch period 663 following the sensing node develop period 662, a latch operation may be performed via the latch SL, and first sensing data of the memory cells of the selected word-line are latched in the latch FL. The sensing node SO may be pre-charged at the sensing node pre-charge period 664 following the latch period 663. During the sensing node develop period 665, supplying of a current to the sensing node SO from the precharge circuit PC may be blocked, and the transistors TR_hv, NM5 and NM6 may be turned on. With this condition, the sensing nodes SO may be developed. At the latch period 666 following the sensing node develop period 665, a latch operation may be performed via the latch SL, and second sensing data of the memory cells of the selected word-line are latched in the latch ML.

Therefore, according to the nonvolatile memory device and the method of controlling operation of the nonvolatile memory device, the hard decision data and the soft decision data for compensating for coupling of the selected word-line may be generated through one read operation and ECC decoding may be performed based on the hard decision data and the soft decision data. Accordingly, error correction capability may be enhanced.

FIG. 28A is a flow chart illustrating a method of operating a memory system.

FIG. 28A illustrates a method of operating a memory system that includes a nonvolatile memory device including a memory block which includes a plurality of cell strings, where each cell string includes a string selection transistor, a plurality of memory cells, and a ground selection transistor connected between each of a plurality of bit-lines and a common source line, and a memory controller to control the nonvolatile memory device.

Referring to FIG. 28A, a first sensing data and a second sensing data is latched in a page buffer circuit connected to the plurality of cell strings through the plurality of bit-lines by performing a first read operation on a selected word-line designated by an access address, among a plurality of word-lines of the memory block, based on a read voltage set (operation S610). A third sensing data is latched in the page buffer circuit by performing a second read operation on an aggressor word-line adjacent to the selected word-line, based on at least one adjacent read voltage (operation S620).

One of the first sensing data and the second sensing data is selected as a hard decision data based on a program state of the third sensing data (operation S630). The hard decision data is output to an external memory controller (operation S640). The first sensing data and the second sensing data are output to the external memory controller (operation S650)

A soft decision data is generated by using the first sensing data and the second sensing data in the memory controller (operation S660). The memory controller may generate the soft decision data by performing one of an exclusive NOR operation and an exclusive OR operation on the first sensing data and the second sensing data. An ECC engine in the memory controller performs an ECC decoding on the hard decision data and the soft decision data (operation S670).

FIG. 28B is a flow chart illustrating a method of operating a memory system.

FIG. 28B illustrates a method of operating a memory system that includes a nonvolatile memory device including a memory block that includes a plurality of cell strings, where each cell string includes a string selection transistor, a plurality of memory cells and a ground selection transistor connected between each of a plurality of bit-lines and a common source line, and a memory controller to control the nonvolatile memory device.

Referring to FIG. 28B, a first sensing data and a second sensing data is latched in a page buffer circuit connected to the plurality of cell strings through the plurality of bit-lines by performing a first read operation on a selected word-line designated by an access address, among a plurality of word-lines of the memory block, based on a read voltage set (operation S710). A third sensing data is latched in the page buffer circuit by performing a second read operation on an aggressor word-line adjacent to the selected word-line, based on at least one adjacent read voltage (operation S720).

One of the first sensing data and the second sensing data is selected as a hard decision data based on a program state of the third sensing data (operation S730). The data cooker 440 generates a soft decision data by using the first sensing data and the second sensing data (operation S740). The hard decision data is output to an external memory controller (operation S750.)

The ECC decoder in the memory controller performs a first ECC decoding based on the hard decision data (operation S760). When the first ECC decoding fails, the memory controller transmits a request of the soft decision data to the nonvolatile memory device 400 (operation S770). The nonvolatile memory device 400 transmits the soft decision data to the memory controller in response to the request and the ECC decoder in the memory controller performs a second ECC decoding based on the soft decision data (operation S780).

Figure 29:
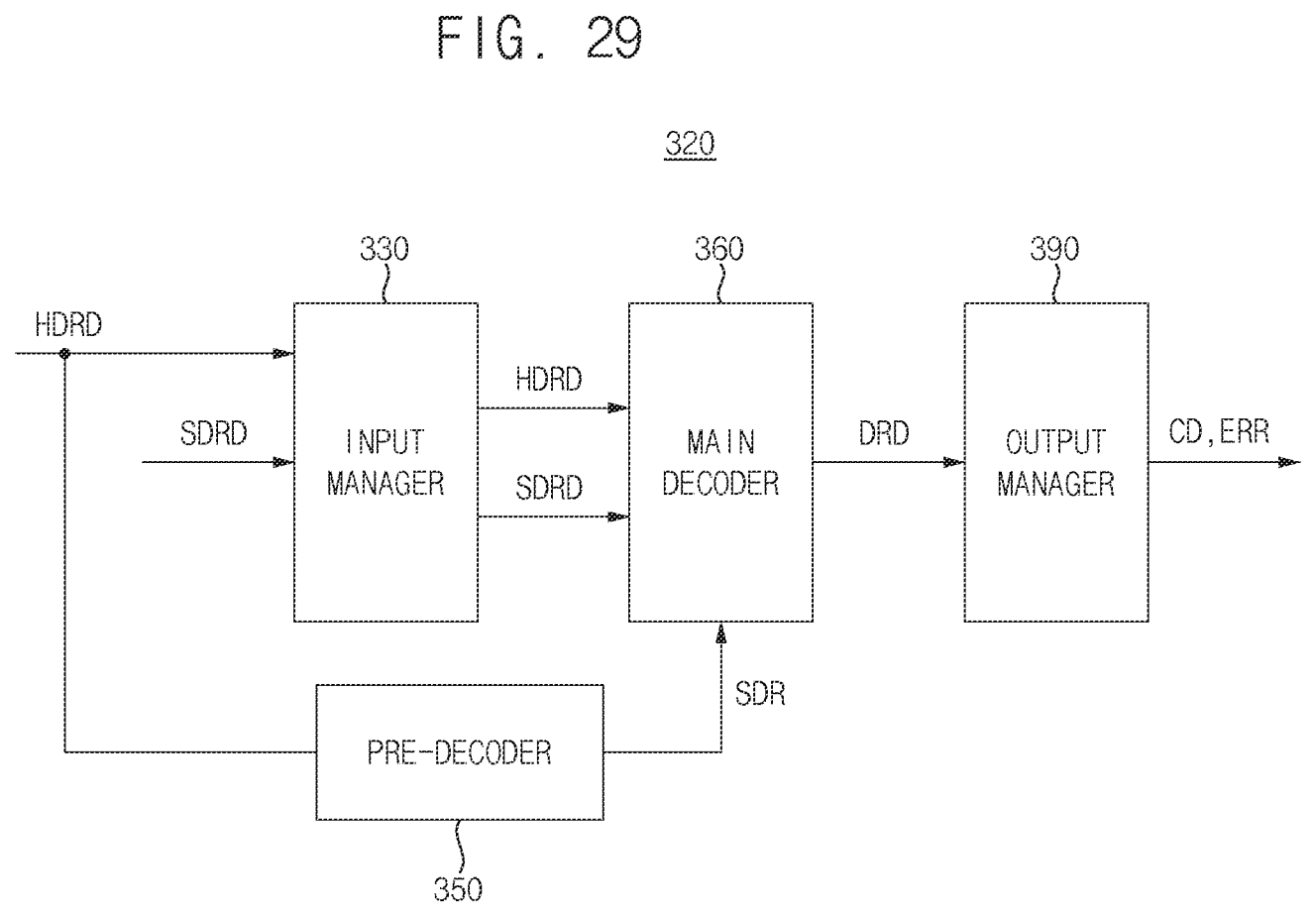

FIG. 29 is a block diagram illustrating an example of an ECC decoder.

The nonvolatile memory device 400 may perform a read operation including a hard decision read operation and/or a soft decision read operation on a plurality of sectors in a target page. The hard decision read operation reads the hard decision data stored in the memory cell as 1 or 0, depending on whether the memory cell coupled to a target word-line the on-cell or the off-cell, when the default read voltage is applied to the target word-line. The ECC decoder 320 in the memory controller 200 may perform a hard decision type of error correction based on the hard decision data and an error correction code (i.e., LDPC code). The soft decision read operation reads the soft decision data having reliability information on the hard decision data, from the memory cells coupled to the target word-lines when offset read voltages having offsets with respect to the default read voltage are applied to the target word-line. The ECC decoder 320 may perform soft decision type of error correction based on the hard decision data, the reliability information on the hard decision data decision data and the error correction code (i.e., LDPC code).

Referring to FIG. 29, the ECC decoder 320 includes an input manager 330, a pre-decoder 350, a main decoder 360, and an output manager 390.

The input manager 330 may receive hard decision data HDRD and the soft decision data SDRS read from a plurality of sectors of a target page, sequentially by unit of sector.

The pre-decoder 350 may receive the hard decision data HDRD sequentially by unit of sector in parallel with the input manager 330 receiving the hard decision data HDRD, may generate a syndrome SDR of the hard decision data HDRD sequentially and may provide the syndrome SDR to the main decoder 360.

The main decoder 360 may receive the hard decision data HDRD sequentially from the input manager 330, may perform a first ECC decoding the hard decision data HDRD based on the respective syndrome SDR, sequentially by unit of sector and may determine pass/fail of the first ECC decoding on each of the hard decision data HDRD.

The input manager 330, in response to the first ECC decoding on the hard decision data HDRD being failed, may perform a second ECC decoding on the soft decision data SDRD corresponding to the hard decision data HDRD and may provide the output manager 390 with a result DRD of the second ECC decoding.

The output manager 390 may output a decoded data CD or a read error message ERR based on the result DRD of the second ECC decoding.

FIG. 30 is a block diagram illustrating a storage device that includes a nonvolatile memory device.

Referring to FIG. 30, a storage device 1000 includes a plurality of nonvolatile memory devices NVMs 1100 and a controller 1200. For example, the storage device 1000 may be any storage device such as an embedded multimedia card (eMMC), a universal flash storage (UFS), a solid state disc or solid state drive (SSD), etc.

The controller 1200 may be connected to the nonvolatile memory devices 1100 via a plurality of channels CCH1, CCH2, CCH3, . . . , CCHk. The controller 1200 may include one or more processors 1210, a buffer memory 1220, an error correction code (ECC) engine 1230, a host interface 1250, and a nonvolatile memory (NVM) interface 1260.

The buffer memory 1220 may store data used to drive the controller 1200. The ECC engine 1230 may calculate error correction code values of data to be programmed during a program operation, and may correct an error of read data using an error correction code value during a read operation. In a data recovery operation, the ECC engine 1230 may correct an error of data recovered from the nonvolatile memory devices 1100. The host interface 1250 may provide an interface with an external device. The nonvolatile memory interface 1260 may provide an interface with the nonvolatile memory devices 1100.

In some implementations, each of the nonvolatile memory devices 1100 may correspond to the nonvolatile memory device and may be optionally supplied with an external high voltage VPP.

Figure 31:
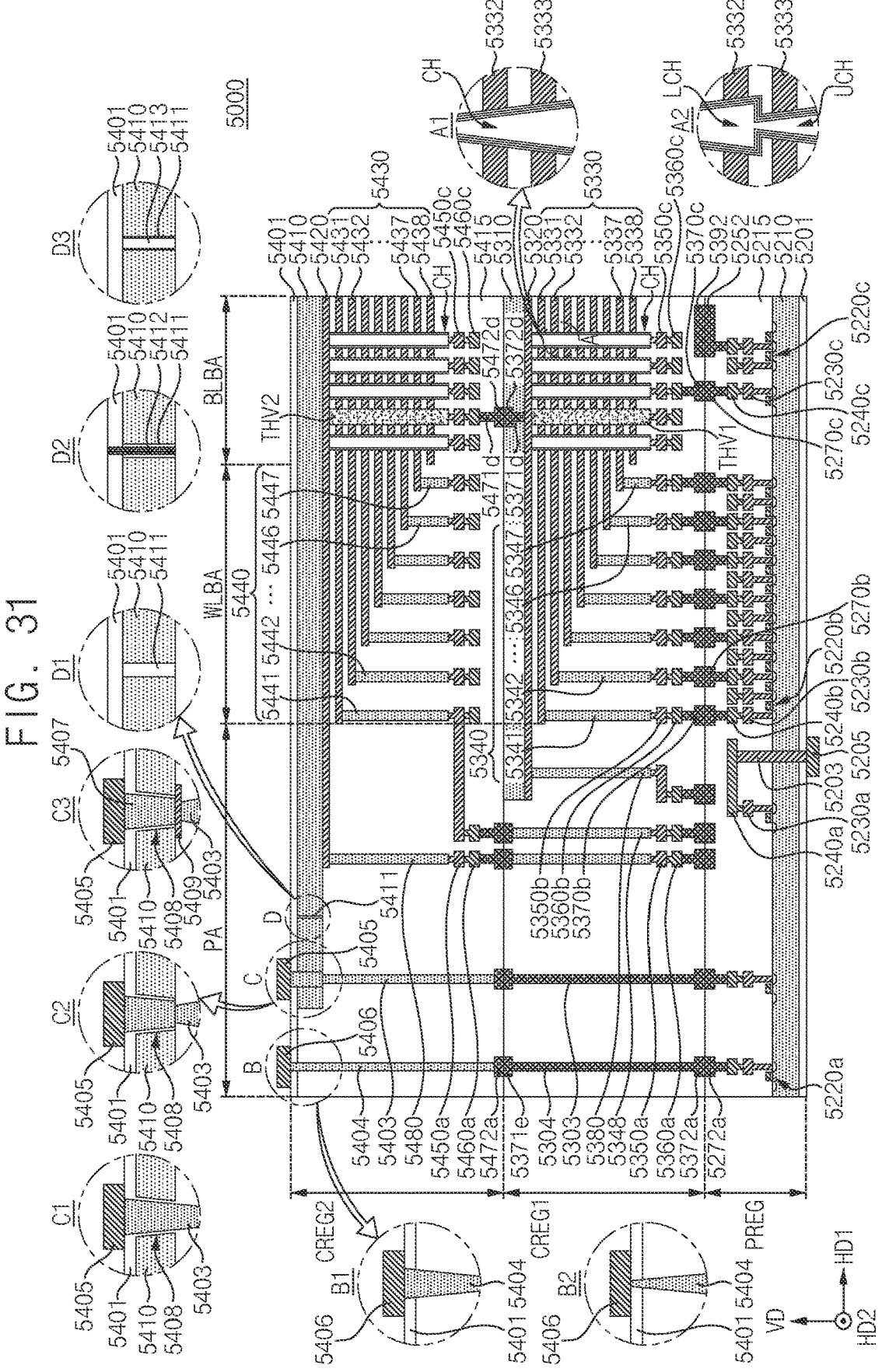
FIG. 31 is a cross-sectional view of an example of a nonvolatile memory device.

FIG. 31 is a cross-sectional view of a nonvolatile memory device.

Referring to FIG. 31, a nonvolatile memory device (or a memory device) 5000 has a chip-to-chip (C2C) structure. At least one upper chip including a cell region and a lower chip including a peripheral circuit region PREG may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 5000 may include the at least one upper chip including the cell region. For example, as illustrated in FIG. 31, the memory device 5000 may include two upper chips. However, the number of the upper chips is not limited thereto. In the case in which the memory device 5000 includes the two upper chips, a first upper chip including a first cell region CREG1, a second upper chip including a second cell region CREG2, and the lower chip including the peripheral circuit region PREG may be manufactured separately. The first upper chip, the second upper chip, and the lower chip may then be connected to each other by the bonding method to manufacture the memory device 5000. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on positive third direction VD, and the upper portion of each of the first and second upper chips may mean an upper portion defined based on negative third direction VD in FIG. 31. However, the bonding methods of present disclosures are not limited thereto. In some implementations, one of the first upper chip and the second upper chip may be turned over and then may be connected to a corresponding chip by the bonding method.

Each of the peripheral circuit region PREG and the first and second cell regions CREG1 and CREG2 of the memory device 5000 may include an external pad bonding region PA, a word-line bonding region WLBA, and a bit-line bonding region BLBA.

The peripheral circuit region PREG may include a first substrate 5210 and a plurality of circuit elements 5220a, 5220b, and 5220c formed on the first substrate 5210. An interlayer insulating layer 5215 including one or more insulating layers may be provided on the plurality of circuit elements 5220a, 5220b, and 5220c, and a plurality of metal lines electrically connected to the plurality of circuit elements 5220a, 5220b, and 5220c may be provided in the interlayer insulating layer 5215. For example, the plurality of metal lines may include first metal lines 5230a, 5230b, and 5230c connected to the plurality of circuit elements 5220a, 5220b, and 5220c, and second metal lines 5240a, 5240b, and 5240c formed on the first metal lines 5230a, 5230b, and 5230c. The plurality of metal lines may be formed of at least one of various conductive materials. For example, the first metal lines 5230a, 5230b, and 5230c may be formed of tungsten having a relatively high electrical resistivity, and the second metal lines 5240a, 5240b, and 5240c may be formed of copper having a relatively low electrical resistivity.

The first metal lines 5230a, 5230b, and 5230c and the second metal lines 5240a, 5240b, and 5240c are illustrated and described in the present example. However, examples of the present disclosures are not limited thereto. In some implementations, at least one or more additional metal lines may further be formed on the second metal lines 5240a, 5240b, and 5240c. In this case, the second metal lines 5240a, 5240b, and 5240c may be formed of aluminum, and at least some of the additional metal lines formed on the second metal lines 5240a, 5240b, and 5240c may be formed of copper having an electrical resistivity lower than that of aluminum of the second metal lines 5240a, 5240b, and 5240c.

The interlayer insulating layer 5215 may be disposed on the first substrate 5210 and may include an insulating material, such as silicon oxide and/or silicon nitride.

Each of the first and second cell regions CREG1 and CREG2 may include at least one memory block. The first cell region CREG1 may include a second substrate 5310 and a common source line 5320. A plurality of word-lines 5330 (5331 to 5338) may be stacked on the second substrate 5310 in the third direction VD perpendicular to a top surface of the second substrate 5310. String selection lines and a ground selection line may be disposed on and under the word-lines 5330, and the plurality of word-lines 5330 may be disposed between the string selection lines and the ground selection line. Likewise, the second cell region CREG2 may include a third substrate 5410 and a common source line 5420, and a plurality of word-lines 5430 (5431 to 5438) may be stacked on the third substrate 5410 in a direction (e.g., the Z-axis direction) perpendicular to a top surface of the third substrate 5410. Each of the second substrate 5310 and the third substrate 5410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CREG1 and CREG2.

In some implementations, as illustrated in a region 'A1', the channel structure CH may be provided in the bit-line bonding region BLBA and may extend in the direction perpendicular to the top surface of the second substrate 5310 to penetrate the word-lines 5330, the string selection lines, and the ground selection line. The channel structure CH may include a data storage layer, a channel layer, and a filling insulation layer. The channel layer may be electrically connected to a first metal line 5350c and a second metal line 5360c in the bit-line bonding region BLBA. For example, the second metal line 5360c may be a bit-line and may be connected to the channel structure CH through the first metal line 5350c. The bit-line 5360c may extend in a second direction HD2 parallel to the top surface of the second substrate 5310.

In some implementations, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 5310 to penetrate the common source line 5320 and lower word-lines 5331 and 5332. The lower channel LCH may include a data storage layer, a channel layer, and a filling insulation layer and may be connected to the upper channel UCH. The upper channel UCH may penetrate upper word-lines 5333 to 5338. The upper channel UCH may include a data storage layer, a channel layer, and a filling insulation layer. The channel layer of the upper channel UCH may be electrically connected to the first metal line 5350c and the second metal line 5360c. As a length of a channel increases, due to characteristics of manufacturing processes, forming a channel having a substantially uniform width may be difficult. In some implementations, the memory device 5000 may include a channel having improved width uniformity due to the lower channel LCH and the upper channel UCH being formed by the processes performed sequentially.

In the case in which the channel structure CH includes the lower channel LCH and the upper channel UCH as illustrated in the region 'A2', a word-line located near to a boundary between the lower channel LCH and the upper channel UCH may be a dummy word-line. For example, the word-lines 5332 and 5333 adjacent to the boundary between the lower channel LCH and the upper channel UCH may be the dummy word-lines. In this case, data may not be stored in memory cells connected to the dummy word-line. Alternatively, the number of pages corresponding to the memory cells connected to the dummy word-line may be less than the number of pages corresponding to the memory cells connected to a general word-line. A level of a voltage applied to the dummy word-line may be different from a level of a voltage applied to the general word-line, and thus reducing an influence of a non-uniform channel width between the lower and upper channels LCH and UCH on an operation of the memory device is possible.

Meanwhile, the number of the lower word-lines 5331 and 5332 penetrated by the lower channel LCH is less than the number of the upper word-lines 5333 to 5338 penetrated by the upper channel UCH in the region 'A2'. However, the present disclosures is not limited thereto. In some implementations, the number of the lower word-lines penetrated by the lower channel LCH may be equal to or more than the number of the upper word-lines penetrated by the upper channel UCH. In addition, structural features and connection relation of the channel structure CH disposed in the second cell region CREG2 may be substantially the same as those of the channel structure CH disposed in the first cell region CREG1.

In the bit-line bonding region BLBA, a first through-electrode THV1 may be provided in the first cell region CREG1, and a second through-electrode THV2 may be provided in the second cell region CREG2. As illustrated in FIG. 31, the first through-electrode THV1 may penetrate the common source line 5320 and the plurality of word-lines 5330. In some implementations, the first through-electrode THV1 may further penetrate the second substrate 5310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some implementations, the first through-electrode THV1 and the second through-electrode THV2 may be electrically connected to each other through a first through-metal pattern 5372d and a second through-metal pattern 5472d. The first through-metal pattern 5372d may be formed at a bottom end of the first upper chip including the first cell region CREG1, and the second through-metal pattern 5472d may be formed at a top end of the second upper chip including the second cell region CREG2. The first through-electrode THV1 may be electrically connected to the first metal line 5350c and the second metal line 5360c. A lower via 5371d may be formed between the first through-electrode THV1 and the first through-metal pattern 5372d, and an upper via 5471d may be formed between the second through-electrode THV2 and the second through-metal pattern 5472d. The first through-metal pattern 5372d and the second through-metal pattern 5472d may be connected to each other by the bonding method.

In addition, in the bit-line bonding region BLBA, an upper metal pattern 5252 may be formed in an uppermost metal layer of the peripheral circuit region PERI, and an upper metal pattern 5392 having the same shape as the upper metal pattern 5252 may be formed in an uppermost metal layer of the first cell region CREG1. The upper metal pattern 5392 of the first cell region CREG1 and the upper metal pattern 5252 of the peripheral circuit region PREG may be electrically connected to each other by the bonding method. In the bit-line bonding region BLBA, the bit-line 5360c may be electrically connected to a page buffer included in the peripheral circuit region PERI. For example, some of the circuit elements 5220c of the peripheral circuit region PREG may constitute the page buffer, and the bit-line 5360c may be electrically connected to the circuit elements 5220c constituting the page buffer through an upper bonding metal pattern 5370c of the first cell region CREG1 and an upper bonding metal pattern 5270c of the peripheral circuit region PERI.

Continuing to refer to FIG. 31, in the word-line bonding region WLBA, the word-lines 5330 of the first cell region CREG1 may extend in a first direction HD1 parallel to the top surface of the second substrate 5310 and may be connected to a plurality of cell contact plugs 5340 (5341 to 5347). First metal lines 5350b and second metal lines 5360b may be sequentially connected onto the cell contact plugs 5340 connected to the word-lines 5330. In the word-line bonding region WLBA, the cell contact plugs 5340 may be connected to the peripheral circuit region PREG through upper bonding metal patterns 5370b of the first cell region CREG1 and upper bonding metal patterns 5270b of the peripheral circuit region PERI.

The cell contact plugs 5340 may be electrically connected to a row decoder included in the peripheral circuit region PERI. For example, some of the circuit elements 5220b of the peripheral circuit region PREG may constitute the row decoder, and the cell contact plugs 5340 may be electrically connected to the circuit elements 5220b constituting the row decoder through the upper bonding metal patterns 5370b of the first cell region CREG1 and the upper bonding metal patterns 5270b of the peripheral circuit region PERI. In some implementations, an operating voltage of the circuit elements 5220b constituting the row decoder may be different from an operating voltage of the circuit elements 5220c constituting the page buffer. For example, the operating voltage of the circuit elements 5220c constituting the page buffer may be greater than the operating voltage of the circuit elements 5220b constituting the row decoder.

Likewise, in the word-line bonding region WLBA, the word-lines 5430 of the second cell region CREG2 may extend in the first direction HD1 parallel to the top surface of the third substrate 5410 and may be connected to a plurality of cell contact plugs 5440 (5441 to 5447). The cell contact plugs 5440 may be connected to the peripheral circuit region PREG through an upper metal pattern of the second cell region CREG2 and lower and upper metal patterns and a cell contact plug 5348 of the first cell region CREG1.

In the word-line bonding region WLBA, the upper bonding metal patterns 5370b may be formed in the first cell region CREG1, and the upper bonding metal patterns 5270b may be formed in the peripheral circuit region PERI. The upper bonding metal patterns 5370b of the first cell region CREG1 and the upper bonding metal patterns 5270b of the peripheral circuit region PREG may be electrically connected to each other by the bonding method. The upper bonding metal patterns 5370b and the upper bonding metal patterns 5270b may be formed of aluminum, copper, or tungsten.

In the external pad bonding region PA, a lower metal pattern 5371e may be formed in a lower portion of the first cell region CREG1, and an upper metal pattern 5472a may be formed in an upper portion of the second cell region CREG2. The lower metal pattern 5371e of the first cell region CREG1 and the upper metal pattern 5472a of the second cell region CREG2 may be connected to each other by the bonding method in the external pad bonding region PA. Likewise, an upper metal pattern 5372a may be formed in an upper portion of the first cell region CREG1, and an upper metal pattern 5272a may be formed in an upper portion of the peripheral circuit region PERI. The upper metal pattern 5372a of the first cell region CREG1 and the upper metal pattern 5272a of the peripheral circuit region PREG may be connected to each other by the bonding method.

Common source line contact plugs 5380 and 5480 may be disposed in the external pad bonding region PA. The common source line contact plugs 5380 and 5480 may be formed of a conductive material such as a metal, a metal compound, and/or doped polysilicon. The common source line contact plug 5380 of the first cell region CREG1 may be electrically connected to the common source line 5320, and the common source line contact plug 5480 of the second cell region CREG2 may be electrically connected to the common source line 5420. A first metal line 5350a and a second metal line 5360a may be sequentially stacked on the common source line contact plug 5380 of the first cell region CREG1, and a first metal line 5450a and a second metal line 5460a may be sequentially stacked on the common source line contact plug 5480 of the second cell region CREG2.

Input/output pads 5205, 5405, and 5406 may be disposed in the external pad bonding region PA. Referring to FIG. 31, a lower insulating layer 5201 may cover a bottom surface of the first substrate 5210, and a first input/output pad 5205 may be formed on the lower insulating layer 5201. The first input/output pad 5205 may be connected to at least one of a plurality of the circuit elements 5220a disposed in the peripheral circuit region PREG through a first input/output contact plug 5203 and may be separated from the first substrate 5210 by the lower insulating layer 5201. In addition, a side insulating layer may be disposed between the first input/output contact plug 5203 and the first substrate 5210 to electrically isolate the first input/output contact plug 5203 from the first substrate 5210.

An upper insulating layer 5401 covering a top surface of the third substrate 5410 may be formed on the third substrate 5410. A second input/output pad 5405 and/or a third input/output pad 5406 may be disposed on the upper insulating layer 5401. The second input/output pad 5405 may be connected to at least one of the plurality of circuit elements 5220a disposed in the peripheral circuit region PREG through second input/output contact plugs 5403 and 5303, and the third input/output pad 5406 may be connected to at least one of the plurality of circuit elements 5220a disposed in the peripheral circuit region PREG through third input/output contact plugs 5404 and 5304.

In some implementations, the third substrate 5410 may not be disposed in a region in which the input/output contact plug is disposed. For example, as illustrated in a region 'B', the third input/output contact plug 5404 may be separated from the third substrate 5410 in a direction parallel to the top surface of the third substrate 5410 and may penetrate an interlayer insulating layer 5415 of the second cell region CREG2 so as to be connected to the third input/output pad 5406. In this case, the third input/output contact plug 5404 may be formed by at least one of various processes.

In some implementations, as illustrated in a region 'B1', the third input/output contact plug 5404 may extend in the third direction VD, and a diameter of the third input/output contact plug 5404 may become progressively greater toward the upper insulating layer 5401. In other words, a diameter of the channel structure CH described in the region 'A1' may become progressively less toward the upper insulating layer 5401, but the diameter of the third input/output contact plug 5404 may become progressively greater toward the upper insulating layer 5401. For example, the third input/output contact plug 5404 may be formed after the second cell region CREG2 and the first cell region CREG1 are bonded to each other by the bonding method.

In some implementations, as illustrated in a region 'B2', the third input/output contact plug 5404 may extend in the third direction VD, and a diameter of the third input/output contact plug 5404 may become progressively less toward the upper insulating layer 5401. In other words, like the channel structure CH, the diameter of the third input/output contact plug 5404 may become progressively less toward the upper insulating layer 5401. For example, the third input/output contact plug 5404 may be formed together with the cell contact plugs 5440 before the second cell region CREG2 and the first cell region CREG1 are bonded to each other.

In some implementations, the input/output contact plug may overlap with the third substrate 5410. For example, as illustrated in a region 'C', the second input/output contact plug 5403 may penetrate the interlayer insulating layer 5415 of the second cell region CREG2 in the third direction VD and may be electrically connected to the second input/output pad 5405 through the third substrate 5410. In this case, a connection structure of the second input/output contact plug 5403 and the second input/output pad 5405 may be realized by various methods.

In some implementations, as illustrated in a region 'C1', an opening 5408 may be formed to penetrate the third substrate 5410, and the second input/output contact plug 5403 may be connected directly to the second input/output pad 5405 through the opening 5408 formed in the third substrate 5410. In this case, as illustrated in the region 'C1', a diameter of the second input/output contact plug 5403 may become progressively greater toward the second input/output pad 5405. However, the present disclosures are not limited thereto, and the diameter of the second input/output contact plug 5403 may become progressively less toward the second input/output pad 5405.

In some implementations, as illustrated in a region 'C2', the opening 5408 penetrating the third substrate 5410 may be formed, and a contact 5407 may be formed in the opening 5408. An end of the contact 5407 may be connected to the second input/output pad 5405, and another end of the contact 5407 may be connected to the second input/output contact plug 5403. Thus, the second input/output contact plug 5403 may be electrically connected to the second input/output pad 5405 through the contact 5407 in the opening 5408. In this case, as illustrated in the region 'C2', a diameter of the contact 5407 may become progressively greater toward the second input/output pad 5405, and a diameter of the second input/output contact plug 5403 may become progressively less toward the second input/output pad 5405. For example, the second input/output contact plug 5403 may be formed together with the cell contact plugs 5440 before the second cell region CREG2 and the first cell region CREG1 are bonded to each other, and the contact 5407 may be formed after the second cell region CREG2 and the first cell region CREG1 are bonded to each other.

In some implementations, in a region 'C3', a stopper 5409 may further be formed on a bottom end of the opening 5408 of the third substrate 5410, instead of being formed in the region 'C2'. The stopper 5409 may be a metal line formed in the same layer as the common source line 5420. Alternatively, the stopper 5409 may be a metal line formed in the same layer as at least one of the word-lines 5430. The second input/output contact plug 5403 may be electrically connected to the second input/output pad 5405 through the contact 5407 and the stopper 5409.

Like the second and third input/output contact plugs 5403 and 5404 of the second cell region CREG2, a diameter of each of the second and third input/output contact plugs 5303 and 5304 of the first cell region CREG1 may become progressively less toward the lower metal pattern 5371*e* or may become progressively greater toward the lower metal pattern 5371*e*.

In some implementations, a slit 5411 may be formed in the third substrate 5410. For example, the slit 5411 may be formed at a certain position of the external pad bonding region PA. For example, as illustrated in a region 'D', the slit 5411 may be located between the second input/output pad 5405 and the cell contact plugs 5440 when viewed in a plan view. Alternatively, the second input/output pad 5405 may be located between the slit 5411 and the cell contact plugs 5440 when viewed in a plan view.

In some implementations, as illustrated in a region 'D1', the slit 5411 may be formed to penetrate the third substrate 5410. For example, the slit 5411 may be used to prevent the third substrate 5410 from being finely cracked when the opening 5408 is formed. However, the present disclosure is not limited thereto, and the slit 5411 may be formed to have a depth ranging from about 60% to about 70% of a thickness of the third substrate 5410.

In some implementations, as illustrated in a region 'D2', a conductive material 5412 may be formed in the slit 5411. For example, the conductive material 5412 may be used to discharge a leakage current occurring in driving of the circuit elements in the external pad bonding region PA to the outside. In this case, the conductive material 5412 may be connected to an external ground line.

In some implementations, as illustrated in a region 'D3', an insulating material 5413 may be formed in the slit 5411. For example, the insulating material 5413 may be used to electrically isolate the second input/output pad 5405 and the second input/output contact plug 5403 disposed in the external pad bonding region PA from the word-line bonding region WLBA. Since the insulating material 5413 is formed in the slit 5411, it is possible to prevent a voltage provided through the second input/output pad 5405 from affecting a metal layer disposed on the third substrate 5410 in the word-line bonding region WLBA.

In some implementations, the first to third input/output pads 5205, 5405 and 5406 may be selectively formed. For example, the memory device 5000 may be realized to include only the first input/output pad 5205 disposed on the first substrate 5210, to include only the second input/output pad 5405 disposed on the third substrate 5410, or to include only the third input/output pad 5406 disposed on the upper insulating layer 5401.

In some implementations, at least one of the second substrate 5310 of the first cell region CREG1 or the third substrate 5410 of the second cell region CREG2 may be used as a sacrificial substrate and may be completely or partially removed before or after a bonding process. An additional layer may be stacked after the removal of the substrate. For example, the second substrate 5310 of the first cell region CREG1 may be removed before or after the bonding process of the peripheral circuit region PREG and the first cell region CREG1, and then, an insulating layer covering a top surface of the common source line 5320 or a conductive layer for connection may be formed. Likewise, the third substrate 5410 of the second cell region CREG2 may be removed before or after the bonding process of the first cell region CREG1 and the second cell region CREG2, and then, the upper insulating layer 5401 covering a top surface of the common source line 5420 or a conductive layer for connection may be formed.

Figure 32:
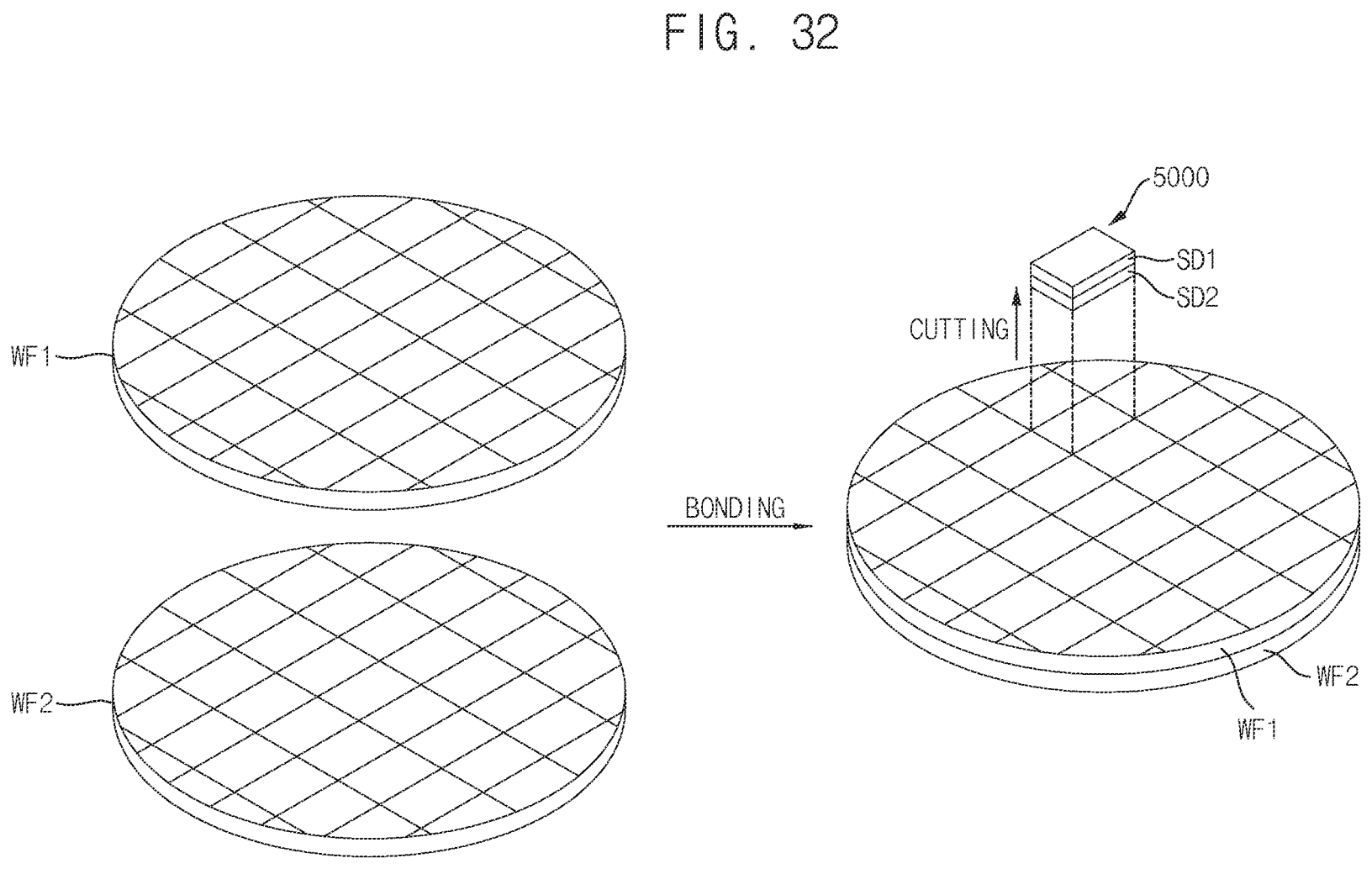

FIG. 32 is a diagram illustrating a manufacturing process of a stacked semiconductor device.

Referring to FIG. 32, respective integrated circuits may be formed on a first wafer WF1 and a second wafer WF2. The memory cell array may be formed in the first wafer WF1, and the peripheral circuits may be formed in the second wafer WF2.

After the various integrated circuits have been respectively formed on the first and second wafers WF1 and WF2, the first wafer WF1 and the second wafer WF2 may be bonded together. The bonded wafers WF1 and WF2 may then be cut (or divided) into separate chips, in which each chip corresponds to a semiconductor device such as, for example, the memory device 6000, including a first semiconductor die SD1 and a second semiconductor die SD2 that are stacked vertically (e.g., the first semiconductor die SD1 is stacked on the second semiconductor die SD2, etc.). Each cut portion of the first wafer WF1 corresponds to the first semiconductor die SD1, and each cut portion of the second wafer WF2 corresponds to the second semiconductor die SD2. For example, the memory device 5000 of FIG. 31 may be manufactured based on the manufacturing process of FIG. 32.

Figure 33:
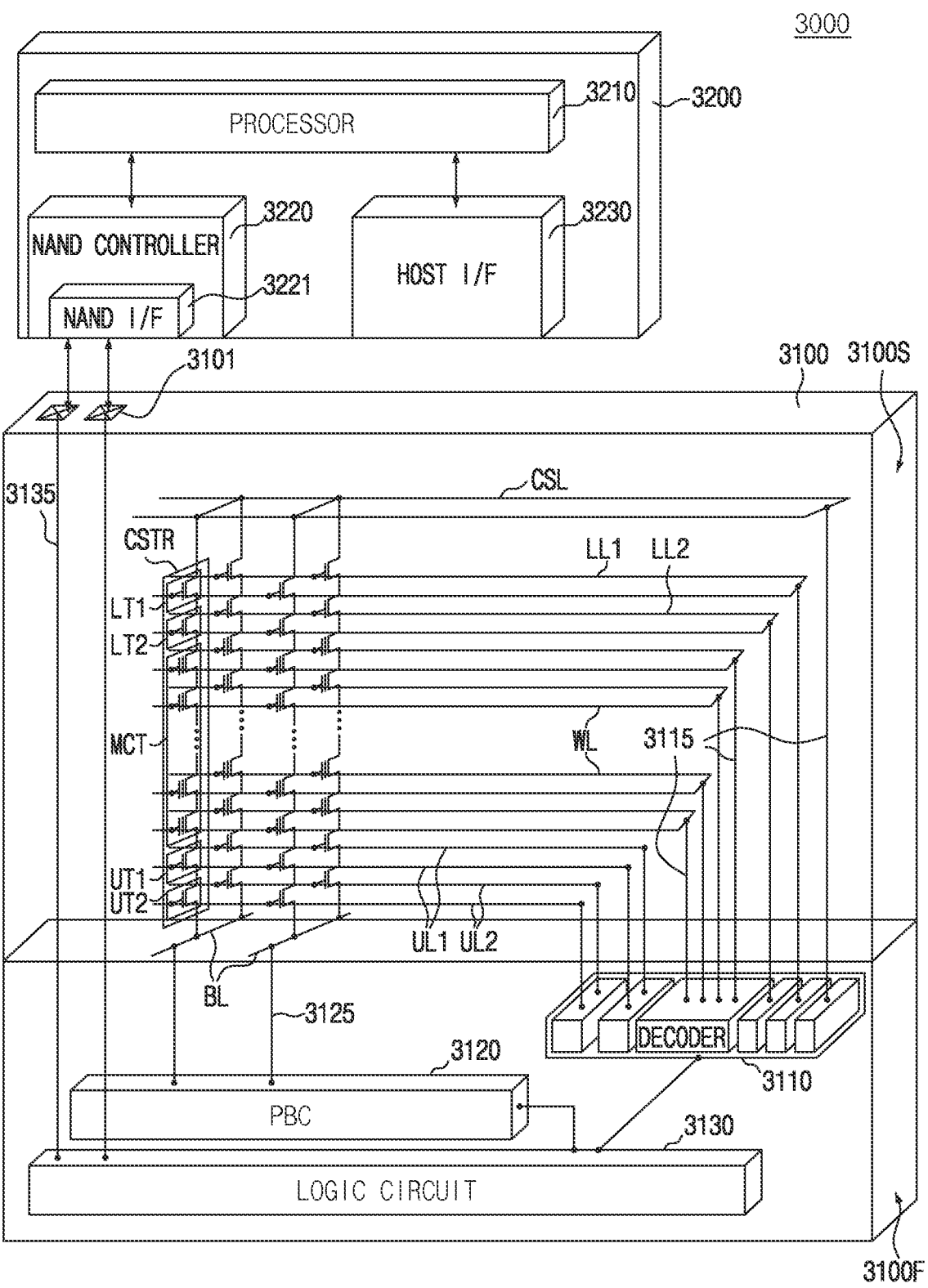
FIG. 33 is a block diagram illustrating an example of an electronic system including a semiconductor device.

FIG. 33 is a block diagram illustrating an electronic system including a semiconductor device.

Referring to FIG. 33, an electronic system 3000 includes a semiconductor device 3100 and a controller 3200 electrically connected to the semiconductor device 3100. The electronic system 3000 may be a storage device including one or a plurality of semiconductor devices 3100 or an electronic device including a storage device. For example, the electronic system 3000 may be a solid state drive (SSD) device, a universal serial bus (USB), a computing system, a medical device, or a communication device that may include one or a plurality of semiconductor devices 3100.

The semiconductor device 3100 may be a non-volatile memory device, for example, a NAND flash memory device that will be illustrated with reference to FIGS. 8 to 26, and may perform the first program operation and the second program operation described with reference to FIGS. 1 through 7. The semiconductor device 3100 includes a first structure 3100F and a second structure 3100S on the first structure 3100F. The first structure 3100F may be a peripheral circuit structure including a decoder circuit 3110, a page buffer circuit 3120, and a logic circuit 3130. The second structure 3100S may be a memory cell structure including a bit-line BL, a common source line CSL, word-lines WL, first and second upper gate lines UL1 and UL2, first and second lower gate lines LL1 and LL2, and memory cell strings CSTR between the bit line BL and the common source line CSL.

In the second structure 3100S, each of the memory cell strings CSTR may include lower transistors LT1 and LT2 adjacent to the common source line CSL, upper transistors UT1 and UT2 adjacent to the bit-line BL, and a plurality of memory cell transistors MCT between the lower transistors LT1 and LT2 and the upper transistors UT1 and UT2. The number of the lower transistors LT1 and LT2 and the number of the upper transistors UT1 and UT2 may be varied in accordance with the disclosed examples.

In some implementations, the upper transistors UT1 and UT2 may include string selection transistors, and the lower transistors LT1 and LT2 may include ground selection transistors. The lower gate lines LL1 and LL2 may be gate electrodes of the lower transistors LT1 and LT2, respectively. The word-lines WL may be gate electrodes of the memory cell transistors MCT, respectively, and the upper gate lines UL1 and UL2 may be gate electrodes of the upper transistors UT1 and UT2, respectively.

In some implementations, the lower transistors LT1 and LT2 may include a lower erase control transistor LT1 and a ground selection transistor LT2 that may be connected to each other in serial. The upper transistors UT1 and UT2 may include a string selection transistor UT1 and an upper erase control transistor UT2. At least one of the lower erase control transistor LT1 and the upper erase control transistor UT2 may be used in an erase operation for erasing data stored in the memory cell transistors MCT through gate induced drain leakage (GIDL) phenomenon.

The common source line CSL, the first and second lower gate lines LL1 and LL2, the word-lines WL, and the first and second upper gate lines UL1 and UL2 may be electrically connected to the decoder circuit 3110 through first connection wirings 1115 extending to the second structure 3110S in the first structure 3100F. The bit-lines BL may be electrically connected to the page buffer circuit 3120 through second connection wirings 3125 extending to the second structure 3100S in the first structure 3100F.

In the first structure 3100F, the decoder circuit 3110 and the page buffer circuit 3120 may perform a control operation for at least one selected memory cell transistor among the plurality of memory cell transistors MCT. The decoder circuit 3110 and the page buffer circuit 3120 may be controlled by the logic circuit 3130. The semiconductor device 3100 may communicate with the controller 3200 through an input/output pad 3101 electrically connected to the logic circuit 3130. The input/output pad 3101 may be electrically connected to the logic circuit 3130 through an input/output connection wiring 3135 extending to the second structure 3100S in the first structure 3100F.

The controller 3200 may include a processor 3210, a NAND controller 3220, and a host interface 3230. The electronic system 3000 may include a plurality of semiconductor devices 3100, and in this case, the controller 3200 may control the plurality of semiconductor devices 3100.

The processor 3210 may control operations of the electronic system 3000 including the controller 3200. The processor 3210 may be operated by firmware, and may control the NAND controller 3220 to access the semiconductor device 3100. The NAND controller 3220 may include a NAND interface 3221 for communicating with the semiconductor device 3100. Through the NAND interface 3221, control command for controlling the semiconductor device 3100, data to be written in the memory cell transistors MCT of the semiconductor device 3100, data to be read from the memory cell transistors MCT of the semiconductor device 3100, etc., may be transferred. The host interface 3230 may provide communication between the electronic system 3000 and an outside host. When control command is received from the outside host through the host interface 3230, the processor 3210 may control the semiconductor device 3100 in response to the control command.

In some implementations, a nonvolatile memory device or a storage device may be packaged using various package types or package configurations.

The present disclosure may be applied to various electronic devices and systems that include the nonvolatile memory devices and the memory packages. For example, the present disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A nonvolatile memory device comprising:
a memory block including a plurality of cell strings, each cell string of the plurality of cell strings including a string selection transistor, a plurality of memory cells, and a ground selection transistor connected in series and disposed in a vertical direction between a plurality of bit-lines and a common source line;
a page buffer circuit connected to the plurality of cell strings through the plurality of bit-lines; and
a control circuit configured to control a read operation by:
latching a first sensing data and a second sensing data in the page buffer circuit by performing a first read operation on a selected word-line designated by an access address, among a plurality of word-lines of the memory block, based on a read voltage set;
latching a third sensing data in the page buffer circuit by performing a second read operation on an aggressor word-line adjacent to the selected word-line, based on at least one adjacent read voltage;
selecting the first sensing data or the second sensing data as a hard decision data based on a program state of the third sensing data; and
generating a soft decision data by using the first sensing data and the second sensing data.

2. The nonvolatile memory device of claim 1, wherein the control circuit is configured to control the page buffer circuit to generate the soft decision data by performing an exclusive NOR operation on the first sensing data and the second sensing data.

3. The nonvolatile memory device of claim 1, wherein the control circuit is configured to control the page buffer circuit to generate the soft decision data by performing an exclusive OR operation on the first sensing data and the second sensing data.

4. The nonvolatile memory device of claim 1, wherein, when a threshold voltage distribution of the program state of the third sensing data of each of non-aggressor cells of memory cells coupled to the aggressor word-line is smaller than the at least one adjacent read voltage, the control circuit is configured to select the first sensing data of each of first memory cells corresponding to the non-aggressor cells, among memory cells coupled to the selected word-line, as the hard decision data.

5. The nonvolatile memory device of claim 1, wherein, when a threshold voltage distribution of the program state of the third sensing data of each of aggressor cells of memory cells coupled to the aggressor word-line is equal to or greater than the at least one adjacent read voltage, the control circuit is configured to select the second sensing data of each of second memory cells corresponding to the aggressor cells, among memory cells coupled to the selected word-line, as the hard decision data.

6. The nonvolatile memory device of claim 1, wherein the page buffer circuit includes:
a plurality of page buffers, wherein each of the plurality of page buffers is connected to a respective cell string of the plurality of cell strings through a respective bit-line of the plurality of bit-lines; and
a data cooker connected to the plurality of page buffers, wherein the data cooker is configured to generate the soft decision data by using the first sensing data and the second sensing data.

7. The nonvolatile memory device of claim 6, wherein the control circuit is configured to control the page buffer circuit to:
store the first sensing data in a first latch of a respective page buffer of the plurality of page buffers;
store the second sensing data in a second latch of a respective page buffer of the plurality of page buffers; and
store the third sensing data in a third latch of a respective page buffer of the plurality of page buffers.

8. The nonvolatile memory device of claim 1, wherein the page buffer circuit includes:
a plurality of page buffers, wherein each of the plurality of page buffers is connected to a respective cell string of the plurality of cell strings through a respective bit-line of the plurality of bit-lines; and
a data cooker connected to the plurality of page buffers, wherein the data cooker is configured to generate the soft decision data by using the first sensing data and the second sensing data,
wherein the control circuit is configured to control the page buffer circuit to:
store three or more sensing data in first latches of a respective page buffer of the plurality of page buffers by applying the read voltage set including three or more data recovery read voltages to the selected word-line; and
store two or more decision data in second latches of a respective page buffer of the plurality of page buffers by applying the at least one adjacent read voltage including two or more adjacent read voltages to the aggressor word-line, and
wherein the control circuit is configured to select one of three or more sensing data as the hard decision data based on the two or more decision data and generate the soft decision data by using the three or more sensing data.

9. The nonvolatile memory device of claim 1, wherein the control circuit is configured to control the page buffer circuit to:
output the soft decision data after outputting the hard decision data; or
output the hard decision data after outputting the soft decision data.

10. The nonvolatile memory device of claim 1, wherein the control circuit includes an aggressor word-line selector configured to select the aggressor word-line based on a row address included in the access address, wherein the plurality of word-lines are programmed from the plurality of bit-lines to the common source line, wherein the plurality of word-lines include:

a first word-line;

a second word-line on the first word-line in a direction perpendicular to a substrate and adjacent to the first word-line; and a third word-line on the second word-line in the direction perpendicular to the substrate and adjacent to the second word-line, and wherein the second word-line is the selected word-line.

11. The nonvolatile memory device of claim 10, wherein, when the first word-line is a normal word-line, the aggressor word-line selector is configured to select the first word-line as the aggressor word-line.

12. The nonvolatile memory device of claim 10, wherein, when the first word-line is a dummy word-line, the aggressor word-line selector is configured to select the third word-line as the aggressor word-line, wherein the memory block is implemented in a multi-stack structure including two or more stacks, and the dummy word-line is placed at a boundary of the stacks.

13. The nonvolatile memory device of claim 10, wherein, when the first word-line is a word-line on which programming is not performed, the aggressor word-line selector is configured to select the third word-line as the aggressor word-line.

14. A memory system comprising a nonvolatile memory device; and a memory controller configured to control the nonvolatile memory device, wherein the nonvolatile memory device comprises:

a memory block including a plurality of cell strings, each of the plurality of cell strings including a string selection transistor, a plurality of memory cells, and a ground selection transistor connected in series and disposed in a vertical direction between a plurality of bit-lines and a common source line;

a page buffer circuit connected to the plurality of cell strings through the plurality of bit-lines; and a control circuit configured to control a read operation by:

latching a first sensing data and a second sensing data in the page buffer circuit by performing a first read operation on a selected word-line designated by an access address, among a plurality of word-lines of the memory block, based on a read voltage set;

latching a third sensing data in the page buffer circuit by performing a second read operation on an aggressor word-line adjacent to the selected word-line, based on at least one group read voltage;

selecting the first sensing data or the second sensing data as a hard decision data based on a program state of the third sensing data; and providing the hard decision data to the memory controller.

15. The memory system of claim 14, wherein:

the memory controller includes an error correction code (ECC) decoder configured to perform a first ECC decoding on the hard decision data, the memory controller is configured to transmit a request of a soft decision data to the nonvolatile memory device when the first ECC decoding fails, the control circuit is further configured to control the read operation by providing the soft decision data to the memory controller in response to the request, and the ECC decoder is configured to perform a second ECC decoding on the soft decision data provided from the nonvolatile memory device.

16. The memory system of claim 14, wherein the control circuit is further configured to control the read operation by generating a soft decision data by using the first sensing data and the second sensing data; and providing the soft decision data to the memory controller; and wherein the memory controller includes error correction code (ECC) decoder configured to:

perform a first ECC decoding on the hard decision data; and perform a second ECC decoding on the soft decision data when the first ECC decoding fails.

17. The memory system of claim 14, wherein the control circuit is further configured to control the read operation by providing the first sensing data and the second sensing data to the memory controller, wherein the memory controller is configured to generate a soft decision data by using the first sensing data and the second sensing data, and wherein the memory controller includes error correction code (ECC) decoder configured to:

perform a first ECC decoding on the hard decision data; and perform a second ECC decoding on the soft decision data when the first ECC decoding fails.

18. A method of controlling an operation of a nonvolatile memory device comprising a memory block including a plurality of cell strings, each of the plurality of cell strings including a string selection transistor, a plurality of memory cells, and a ground selection transistor connected in series and disposed in a vertical direction between a plurality of bit-lines and a common source line, the method comprising:

latching a first sensing data and a second sensing data in a page buffer circuit by performing a first read operation on a selected word-line designated by an access address, from among a plurality of word-lines of the memory block, based on a read voltage set;

latching a third sensing data in the page buffer circuit by performing a second read operation on an aggressor word-line adjacent to the selected word-line, based on at least one group read voltage;

selecting the first sensing data or the second sensing data as a hard decision data based on a program state of the third sensing data; and generating a soft decision data by using the first sensing data and the second sensing data.

19. The method of claim 18, wherein generating the soft decision data includes performing one of an exclusive NOR operation and an exclusive OR operation on the first sensing data and the second sensing data.

20. The method of claim 18, further comprising selecting one of at least two word-lines adjacent to the selected word-line as the aggressor word-line based on a row address included in the selected word-line designated by the access address and programming progress information before performing the second read operation.

* * * * *